US011694023B2

(12) United States Patent
Dvorak

(10) Patent No.: US 11,694,023 B2
(45) Date of Patent: Jul. 4, 2023

(54) METHOD AND SYSTEM FOR IMPROVED SPREADSHEET ANALYTICAL FUNCTIONING

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 36 days.

(21) Appl. No.: 17/374,898

(22) Filed: Jul. 13, 2021

(65) Prior Publication Data

US 2022/0012416 A1 Jan. 13, 2022

Related U.S. Application Data

(60) Provisional application No. 63/051,280, filed on Jul. 13, 2020.

(51) Int. Cl.
*G06F 40/40* (2020.01)
*G06F 40/18* (2020.01)
*G06F 17/18* (2006.01)

(52) U.S. Cl.
CPC .............. *G06F 40/18* (2020.01); *G06F 17/18* (2013.01)

(58) Field of Classification Search
CPC ........................................................ G06F 40/18
See application file for complete search history.

(56) References Cited

U.S. PATENT DOCUMENTS

| | | | | |
|---|---|---|---|---|
| 6,626,959 | B1 * | 9/2003 | Moise | G06F 40/18 715/210 |
| 7,747,939 | B2 | 6/2010 | Thanu et al. | |
| 8,726,143 | B2 * | 5/2014 | Simkhay | G06F 40/18 715/219 |
| 9,037,959 | B2 | 5/2015 | Rapp et al. | |
| 9,430,469 | B2 | 8/2016 | Lam et al. | |
| 10,114,812 | B1 | 10/2018 | Ghaddar | |
| 10,466,867 | B2 | 11/2019 | Boucher et al. | |

(Continued)

OTHER PUBLICATIONS

Collie, R., & Singh, A. (2016). Power Pivot and Power BI: The Excel user's guide to DAX, Power Query, Power BI & Power Pivot in Excel 2010-2016. United States: Holy Macro! Books. ISBN: 978-1-61547-039-6 (Year:2016) (Year: 2016).*

(Continued)

*Primary Examiner* — Scott T Baderman
*Assistant Examiner* — Barbara M Level
(74) *Attorney, Agent, or Firm* — Haynes Beffel & Wolfeld, LLP; Ernest J. Beffel, Jr.

(57) ABSTRACT

The disclosed technology creates a family of spreadsheet functions (predefined formulas) which allows users to create programming loop equivalents in their regular spreadsheet cells combining familiar range or array evaluating functions (e.g., SUM, COUNT, MIN, MAX, etc.) with data filtering and output selection. The input data to these new functions can be sourced from multiple cells within the spreadsheet or a broad spectrum of numeric, date and text data not stored in a spreadsheet, including data not discretely defined. The technology disclosed can use as inputs cell ranges or Non-spreadsheet Cell (NSC) data formulas. The technology supports functions with predefined combinations and user specified combinations all capable of automating, millions of looped calculations.

24 Claims, 40 Drawing Sheets

(56) References Cited

U.S. PATENT DOCUMENTS

| | | | | |
|---|---|---|---|---|
| 10,545,953 | B2 * | 1/2020 | Becker | G06F 16/2379 |
| 10,628,634 | B1 | 4/2020 | Ghaddar | |
| 10,789,414 | B2 | 9/2020 | Schoedl | |
| 10,877,633 | B2 | 12/2020 | Boucher et al. | |
| 10,983,670 | B2 | 4/2021 | Boucher et al. | |
| 11,222,171 | B2 | 1/2022 | Zhang et al. | |
| 2003/0056181 | A1 | 3/2003 | Marathe | |
| 2006/0271841 | A1 | 11/2006 | Thanu et al. | |
| 2009/0319880 | A1 * | 12/2009 | Collie | G06F 40/18 715/219 |
| 2013/0145244 | A1 | 6/2013 | Rothschiller et al. | |
| 2013/0159832 | A1 * | 6/2013 | Ingargiola | G06Q 40/00 715/220 |
| 2015/0370433 | A1 | 12/2015 | Lam et al. | |
| 2017/0315683 | A1 | 11/2017 | Boucher et al. | |
| 2017/0315967 | A1 | 11/2017 | Boucher et al. | |
| 2017/0315979 | A1 | 11/2017 | Boucher et al. | |
| 2018/0239748 | A1 | 8/2018 | Zhang et al. | |
| 2018/0260374 | A1 * | 9/2018 | Sobhy Deraz | G06F 17/10 |
| 2019/0340219 | A1 | 11/2019 | Schoedl | |
| 2020/0004799 | A1 | 1/2020 | Gross et al. | |
| 2020/0004812 | A1 | 1/2020 | Gross et al. | |
| 2020/0081586 | A1 | 3/2020 | Boucher et al. | |
| 2020/0285694 | A1 | 9/2020 | Nield | |
| 2020/0302013 | A1 * | 9/2020 | Stegmaier | G06F 40/18 |
| 2021/0081405 | A1 * | 3/2021 | Zarras | G06F 16/248 |
| 2021/0286479 | A1 | 9/2021 | Boucher et al. | |
| 2021/0311595 | A1 | 10/2021 | Boucher et al. | |

OTHER PUBLICATIONS

Translating Relational Queries into Spreadsheets, Jacek Sroka, Adrian Panasiuk, Krzysztof Stencel, Jerzy Tyszkiewicz, IEEE Transactions on Knowledge and Data Engineering, vol. 27, No. 8, Aug. 2015, 13 pages (Year: 2015).*

Yundt, What's the difference between array and range in Excel?, Quora, dated Dec. 2, 2019, 4 pages.

* cited by examiner

FIG. 1 - Prior Art
Excel steps
1. Talk with IT to get the desired data
2. Get the data download csv from IT
3. Import the csv into Excel
4. Locate in Excel the desired data
5. Rearrange the data into the desired order of columns
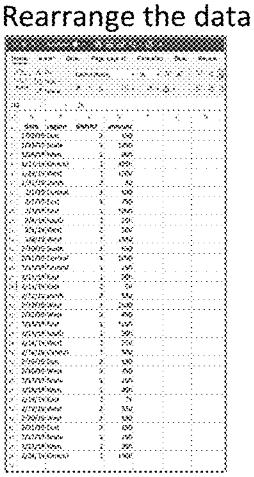
6. Delete rows not in the desired dates to leave only 2019 data
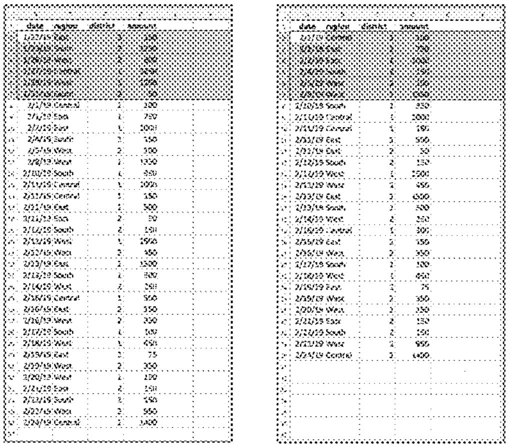
7. Sort the columns by region and district
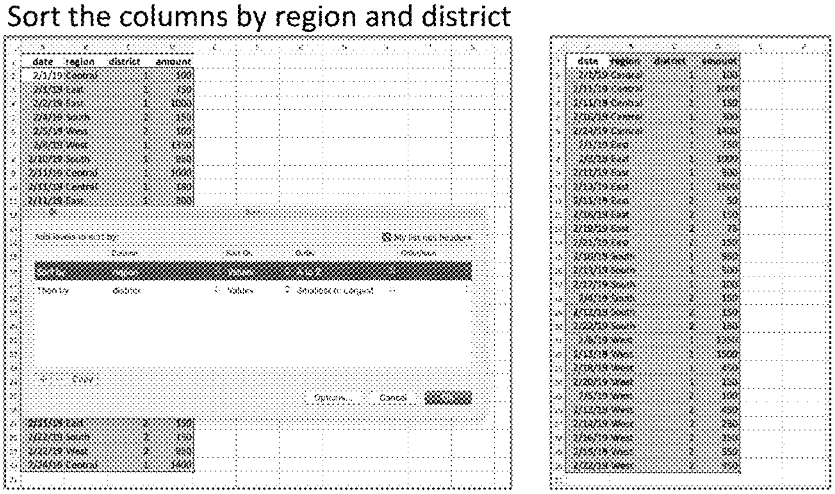

FIG. 2 - Prior Art

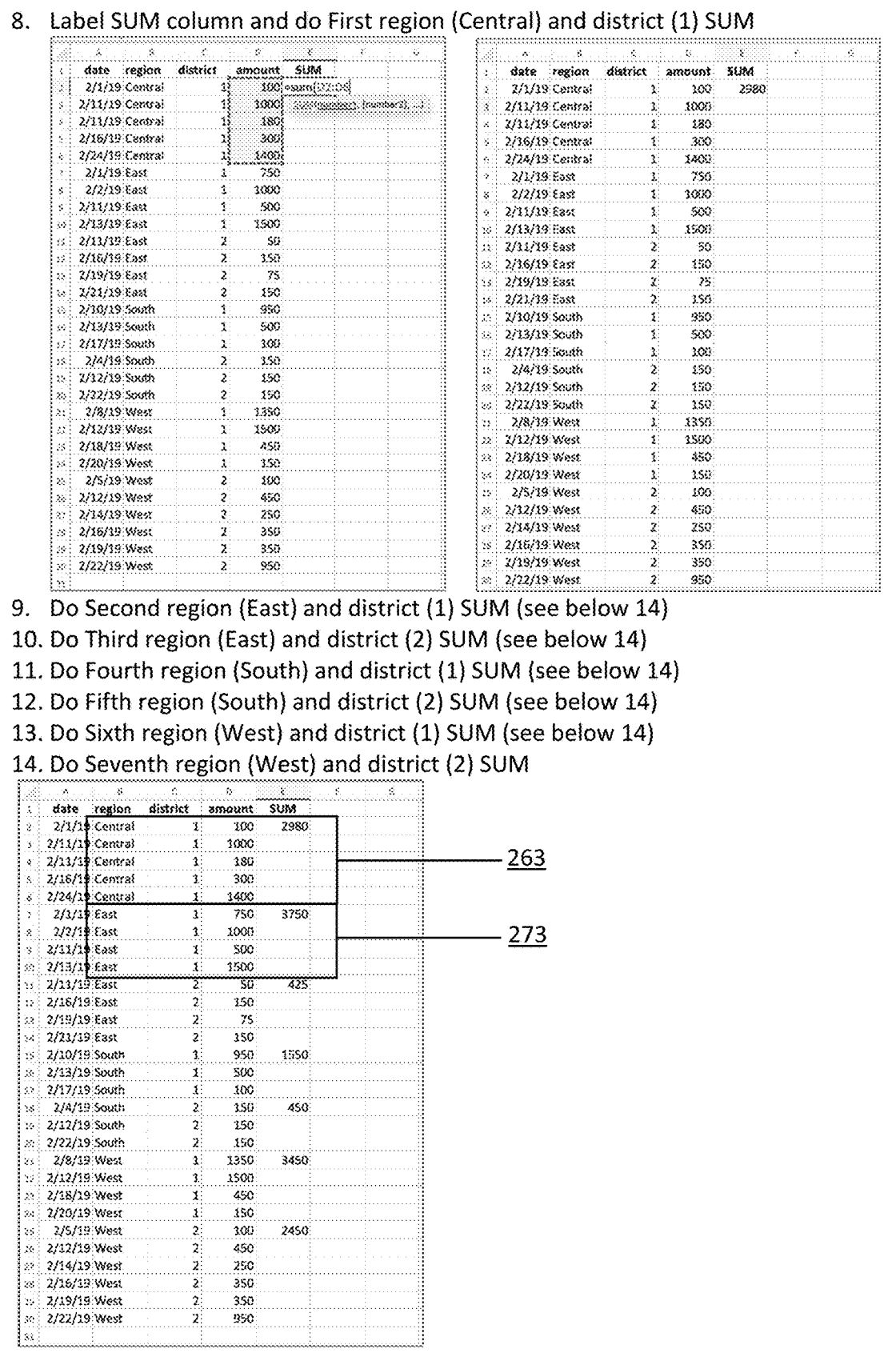

8. Label SUM column and do First region (Central) and district (1) SUM

| | A | B | C | D | E | F | G |
|---|---|---|---|---|---|---|---|
| 1 | date | region | district | amount | SUM | | |
| 2 | 2/1/19 | Central | 1 | 100 | =sum(D2:D6 | | |
| 3 | 2/11/19 | Central | 1 | 1000 | SUM(number1, [number2], ...) | | |
| 4 | 2/11/19 | Central | 1 | 180 | | | |
| 5 | 2/16/19 | Central | 1 | 300 | | | |
| 6 | 2/24/19 | Central | 1 | 1400 | | | |
| 7 | 2/1/19 | East | 1 | 750 | | | |
| 8 | 2/2/19 | East | 1 | 1000 | | | |
| 9 | 2/11/19 | East | 1 | 500 | | | |
| 10 | 2/13/19 | East | 1 | 1500 | | | |
| 11 | 2/11/19 | East | 2 | 50 | | | |
| 12 | 2/16/19 | East | 2 | 150 | | | |
| 13 | 2/19/19 | East | 2 | 75 | | | |
| 14 | 2/21/19 | East | 2 | 150 | | | |
| 15 | 2/10/19 | South | 1 | 950 | | | |
| 16 | 2/13/19 | South | 1 | 500 | | | |
| 17 | 2/17/19 | South | 1 | 100 | | | |
| 18 | 2/4/19 | South | 2 | 150 | | | |
| 19 | 2/12/19 | South | 2 | 150 | | | |
| 20 | 2/22/19 | South | 2 | 150 | | | |
| 21 | 2/8/19 | West | 1 | 1350 | | | |
| 22 | 2/12/19 | West | 1 | 1500 | | | |
| 23 | 2/18/19 | West | 1 | 450 | | | |
| 24 | 2/20/19 | West | 1 | 150 | | | |
| 25 | 2/5/19 | West | 2 | 100 | | | |
| 26 | 2/12/19 | West | 2 | 450 | | | |
| 27 | 2/14/19 | West | 2 | 250 | | | |
| 28 | 2/16/19 | West | 2 | 350 | | | |
| 29 | 2/19/19 | West | 2 | 350 | | | |
| 30 | 2/22/19 | West | 2 | 950 | | | |
| 31 | | | | | | | |

| | A | B | C | D | E | F | G |
|---|---|---|---|---|---|---|---|
| 1 | date | region | district | amount | SUM | | |
| 2 | 2/1/19 | Central | 1 | 100 | 2980 | | |
| 3 | 2/11/19 | Central | 1 | 1000 | | | |
| 4 | 2/11/19 | Central | 1 | 180 | | | |
| 5 | 2/16/19 | Central | 1 | 300 | | | |
| 6 | 2/24/19 | Central | 1 | 1400 | | | |
| 7 | 2/1/19 | East | 1 | 750 | | | |
| 8 | 2/2/19 | East | 1 | 1000 | | | |
| 9 | 2/11/19 | East | 1 | 500 | | | |
| 10 | 2/13/19 | East | 1 | 1500 | | | |
| 11 | 2/11/19 | East | 2 | 50 | | | |
| 12 | 2/16/19 | East | 2 | 150 | | | |
| 13 | 2/19/19 | East | 2 | 75 | | | |
| 14 | 2/21/19 | East | 2 | 150 | | | |
| 15 | 2/10/19 | South | 1 | 950 | | | |
| 16 | 2/13/19 | South | 1 | 500 | | | |
| 17 | 2/17/19 | South | 1 | 100 | | | |
| 18 | 2/4/19 | South | 2 | 150 | | | |
| 19 | 2/12/19 | South | 2 | 150 | | | |
| 20 | 2/22/19 | South | 2 | 150 | | | |
| 21 | 2/8/19 | West | 1 | 1350 | | | |
| 22 | 2/12/19 | West | 1 | 1500 | | | |
| 23 | 2/18/19 | West | 1 | 450 | | | |
| 24 | 2/20/19 | West | 1 | 150 | | | |
| 25 | 2/5/19 | West | 2 | 100 | | | |
| 26 | 2/12/19 | West | 2 | 450 | | | |
| 27 | 2/14/19 | West | 2 | 250 | | | |
| 28 | 2/16/19 | West | 2 | 350 | | | |
| 29 | 2/19/19 | West | 2 | 350 | | | |
| 30 | 2/22/19 | West | 2 | 950 | | | |

9. Do Second region (East) and district (1) SUM (see below 14)
10. Do Third region (East) and district (2) SUM (see below 14)
11. Do Fourth region (South) and district (1) SUM (see below 14)
12. Do Fifth region (South) and district (2) SUM (see below 14)
13. Do Sixth region (West) and district (1) SUM (see below 14)
14. Do Seventh region (West) and district (2) SUM

| | A | B | C | D | E | F | G |
|---|---|---|---|---|---|---|---|
| 1 | date | region | district | amount | SUM | | |
| 2 | 2/1/1 | Central | 1 | 100 | 2980 | | |
| 3 | 2/11/1 | Central | 1 | 1000 | | | |
| 4 | 2/11/1 | Central | 1 | 180 | | | |
| 5 | 2/16/1 | Central | 1 | 300 | | | |
| 6 | 2/24/1 | Central | 1 | 1400 | | | |
| 7 | 2/1/1 | East | 1 | 750 | 3750 | | |
| 8 | 2/2/1 | East | 1 | 1000 | | | |
| 9 | 2/11/1 | East | 1 | 500 | | | |
| 10 | 2/13/1 | East | 1 | 1500 | | | |
| 11 | 2/11/19 | East | 2 | 50 | 425 | | |
| 12 | 2/16/19 | East | 2 | 150 | | | |
| 13 | 2/19/19 | East | 2 | 75 | | | |
| 14 | 2/21/19 | East | 2 | 150 | | | |
| 15 | 2/10/19 | South | 1 | 950 | 1550 | | |
| 16 | 2/13/19 | South | 1 | 500 | | | |
| 17 | 2/17/19 | South | 1 | 100 | | | |
| 18 | 2/4/19 | South | 2 | 150 | 450 | | |
| 19 | 2/12/19 | South | 2 | 150 | | | |
| 20 | 2/22/19 | South | 2 | 150 | | | |
| 21 | 2/8/19 | West | 1 | 1350 | 3450 | | |
| 22 | 2/12/19 | West | 1 | 1500 | | | |
| 23 | 2/18/19 | West | 1 | 450 | | | |
| 24 | 2/20/19 | West | 1 | 150 | | | |
| 25 | 2/5/19 | West | 2 | 100 | 2450 | | |
| 26 | 2/12/19 | West | 2 | 450 | | | |
| 27 | 2/14/19 | West | 2 | 250 | | | |
| 28 | 2/16/19 | West | 2 | 350 | | | |
| 29 | 2/19/19 | West | 2 | 350 | | | |
| 30 | 2/22/19 | West | 2 | 950 | | | |
| 31 | | | | | | | |

Figure 3:
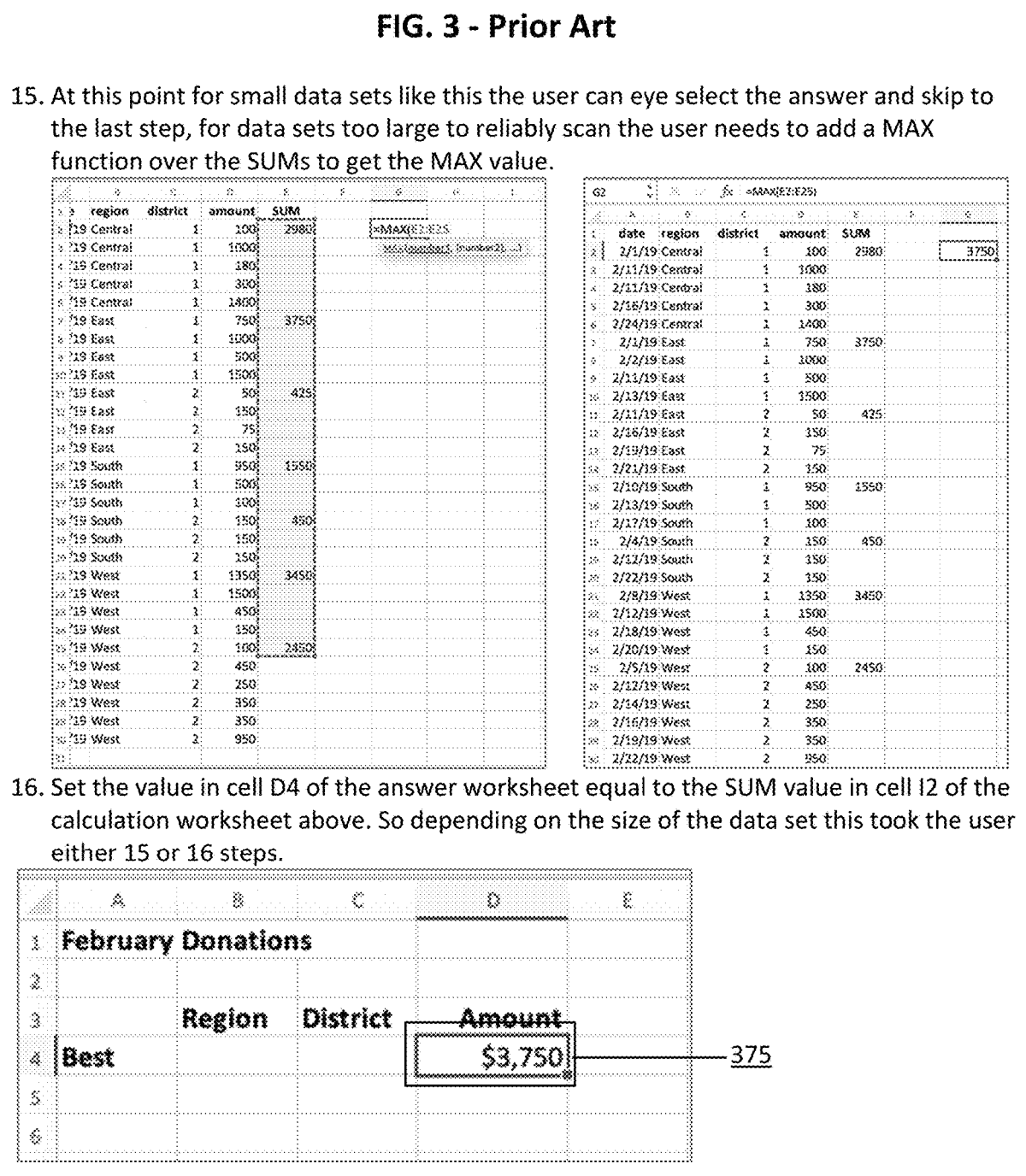

15. At this point for small data sets like this the user can eye select the answer and skip to the last step, for data sets too large to reliably scan the user needs to add a MAX function over the SUMs to get the MAX value.

| | region | district | amount | SUM | | |
|---|---|---|---|---|---|---|
| '19 | Central | 1 | 100 | 2980 | | =MAX(E2:E25 |
| '19 | Central | 1 | 1000 | | | |
| '19 | Central | 1 | 180 | | | |
| '19 | Central | 1 | 300 | | | |
| '19 | Central | 1 | 1400 | | | |
| '19 | East | 1 | 750 | 3750 | | |
| '19 | East | 1 | 1000 | | | |
| '19 | East | 1 | 500 | | | |
| '19 | East | 1 | 1500 | | | |
| '19 | East | 2 | 50 | 425 | | |
| '19 | East | 2 | 150 | | | |
| '19 | East | 2 | 75 | | | |
| '19 | East | 2 | 150 | | | |
| '19 | South | 1 | 950 | 1550 | | |
| '19 | South | 1 | 500 | | | |
| '19 | South | 1 | 100 | | | |
| '19 | South | 2 | 150 | 450 | | |
| '19 | South | 2 | 150 | | | |
| '19 | South | 2 | 150 | | | |
| '19 | West | 1 | 1350 | 3450 | | |
| '19 | West | 1 | 1500 | | | |
| '19 | West | 1 | 450 | | | |
| '19 | West | 1 | 150 | | | |
| '19 | West | 2 | 100 | 2450 | | |
| '19 | West | 2 | 450 | | | |
| '19 | West | 2 | 250 | | | |
| '19 | West | 2 | 350 | | | |
| '19 | West | 2 | 350 | | | |
| '19 | West | 2 | 950 | | | |

G2 fx =MAX(E2:E25)

| date | region | district | amount | SUM | | |
|---|---|---|---|---|---|---|
| 2/1/19 | Central | 1 | 100 | 2980 | | 3750 |
| 2/11/19 | Central | 1 | 1000 | | | |
| 2/11/19 | Central | 1 | 180 | | | |
| 2/16/19 | Central | 1 | 300 | | | |
| 2/24/19 | Central | 1 | 1400 | | | |
| 2/1/19 | East | 1 | 750 | 3750 | | |
| 2/2/19 | East | 1 | 1000 | | | |
| 2/11/19 | East | 1 | 500 | | | |
| 2/13/19 | East | 1 | 1500 | | | |
| 2/11/19 | East | 2 | 50 | 425 | | |
| 2/16/19 | East | 2 | 150 | | | |
| 2/19/19 | East | 2 | 75 | | | |
| 2/21/19 | East | 2 | 150 | | | |
| 2/10/19 | South | 1 | 950 | 1550 | | |
| 2/13/19 | South | 1 | 500 | | | |
| 2/17/19 | South | 1 | 100 | | | |
| 2/4/19 | South | 2 | 150 | 450 | | |
| 2/12/19 | South | 2 | 150 | | | |
| 2/22/19 | South | 2 | 150 | | | |
| 2/8/19 | West | 1 | 1350 | 3450 | | |
| 2/12/19 | West | 1 | 1500 | | | |
| 2/18/19 | West | 1 | 450 | | | |
| 2/20/19 | West | 1 | 150 | | | |
| 2/5/19 | West | 2 | 100 | 2450 | | |
| 2/12/19 | West | 2 | 450 | | | |
| 2/14/19 | West | 2 | 250 | | | |
| 2/16/19 | West | 2 | 350 | | | |
| 2/19/19 | West | 2 | 350 | | | |
| 2/22/19 | West | 2 | 950 | | | |

16. Set the value in cell D4 of the answer worksheet equal to the SUM value in cell I2 of the calculation worksheet above. So depending on the size of the data set this took the user either 15 or 16 steps.

| | A | B | C | D | E |
|---|---|---|---|---|---|
| 1 | **February Donations** | | | | |
| 2 | | | | | |
| 3 | | **Region** | **District** | **Amount** | |
| 4 | **Best** | | | $3,750 | |
| 5 | | | | | |
| 6 | | | | | |

Excel steps using a Pivot Table

1. Talk with IT to get the desired data
2. Get the data download csv from IT
3. Import the csv into Excel
4. Locate in Excel the desired data
5. Click insert Pivot Table
6. Select range of data to use in the Pivot table (shown below)

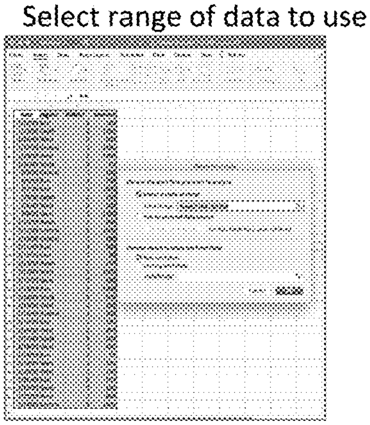

7. Choose where to put the Pivot table, in this example the existing sheet and then select where to put it and hit ok (shown below)

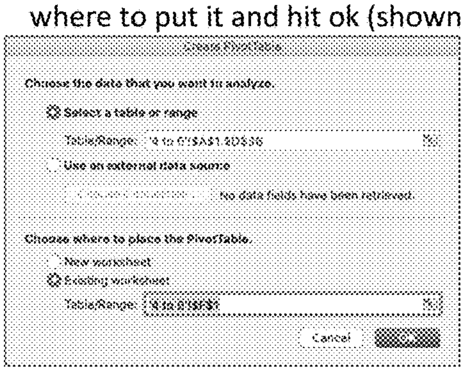

8. Put amount into the SUM Values (shown below 11.)
9. Put region into Rows (shown below 11.)
10. Put district into Rows (shown below 11.)
11. Put date into Filter (shown below)

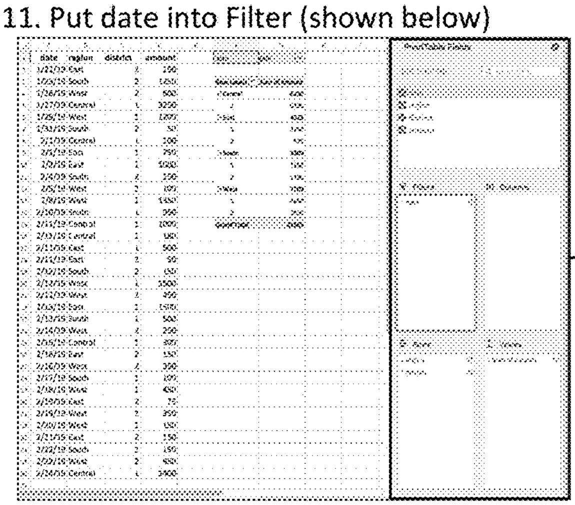

12. Deselect the unwanted dates to get the values for February 2019

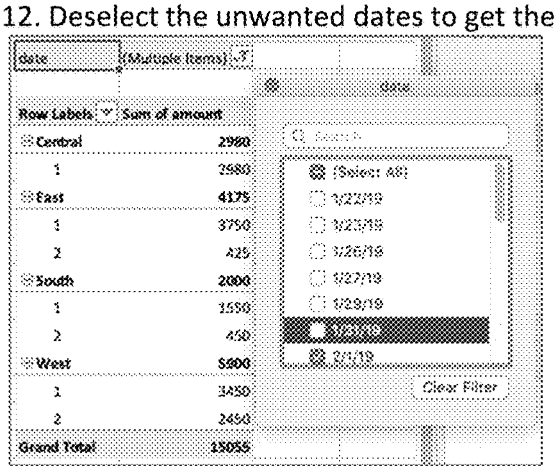

13. At this point with a small data set the user can scan and see the MAX value and skip to the last step. However, if there were enough values the user you can't easily scan for the MAX value then need to get rid of the region level totals as detailed below and then run a MAX function over the results. This is because they can't use the Pivot Table to sort because it only sorts within each region grouping not across all the district values.

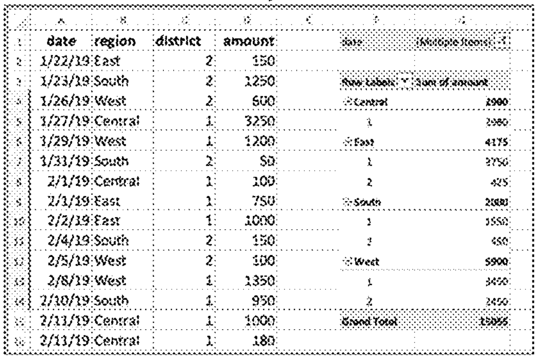

14. Click in the Pivot table to bring back up the Pivot and the special Pivot Ribbon options of the PivotTable Analyze and Design

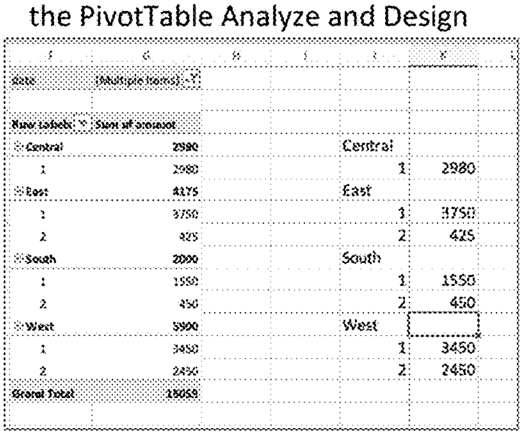

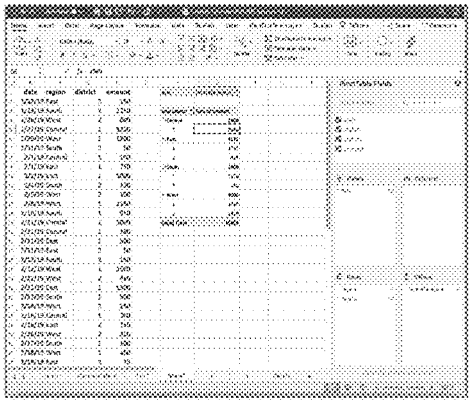

FIG. 6 - Prior Art

15. Click the Design ribbon, then click on the Subtotals button and from the dropdown select the 'Don't' Show Subtotals' option and hit return

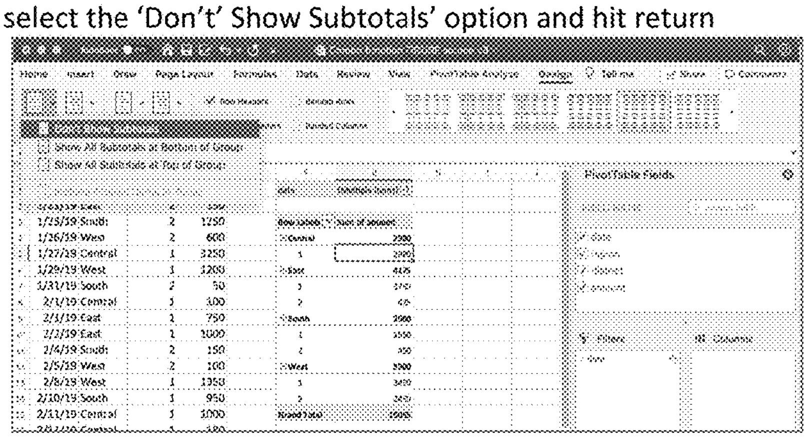

16. Now add a MAX function calculation highlighting the full range of the SUMs, in this example in cell I5

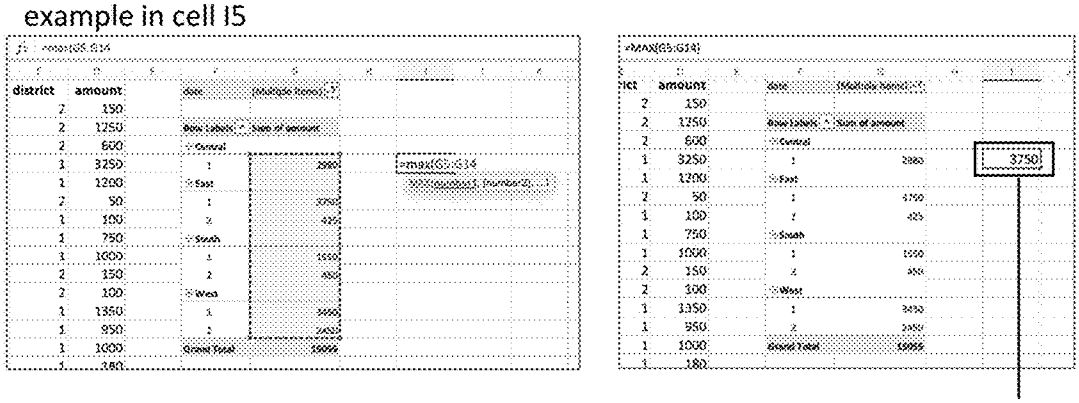

658

17. Set the value in cell D4 of the answer worksheet equal to the SUM value in cell I5 of the Pivot Table worksheet above. So, depending on the size of the data set this took the user either 14 or 17 steps. The advantage of this over the previous approach is that the number of steps for large data sets stays at seventeen rather than as with the previous example the number of steps increases directly with the number of SUMs.

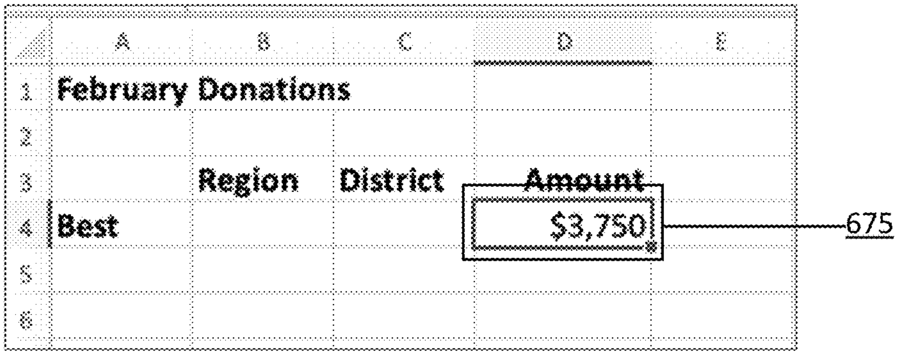

675

MAX_SUM(SUM input|Loop1, ...|Constraint1,...|Other output|Other rank)

MAX_SUM – Calculates maximum value of SUM input | from single or multi-Loop input(s) | all subject to constraints if desired | Output field if not SUM | Output rank # if not MAX

USAGE EXAMPLE

You type in cell D4:
`=MAX_SUM(amount{},[region{},district{}]`
`date{>='2/1/19'})` and hit enter or return to get the value shown in D4

|   | A | B | C | D |
|---|---|---|---|---|
| 1 | February Donations | | | |
| 2 | | | | |
| 3 | | Region | District | Amount |
| 4 | Best | | | $3,750 |
| 5 | | | | |

MECHANICS AUTOMATICALLY DONE BY SINGLE FORMULA ABOVE

① Retrieves all the data for the NSC formulaic data fields
② Constrains (filters) data to date values after and including 2/1/19
③ Sorts data by region and district values
④ Creates region and district combination LOOPs (deduped for visibility)
⑤ Do LOOP calcs of SUM(amount{})
⑥ Reorder to MAX the SUM giving descending order
⑦ Returns MAX SUM value to cell D4 formatted

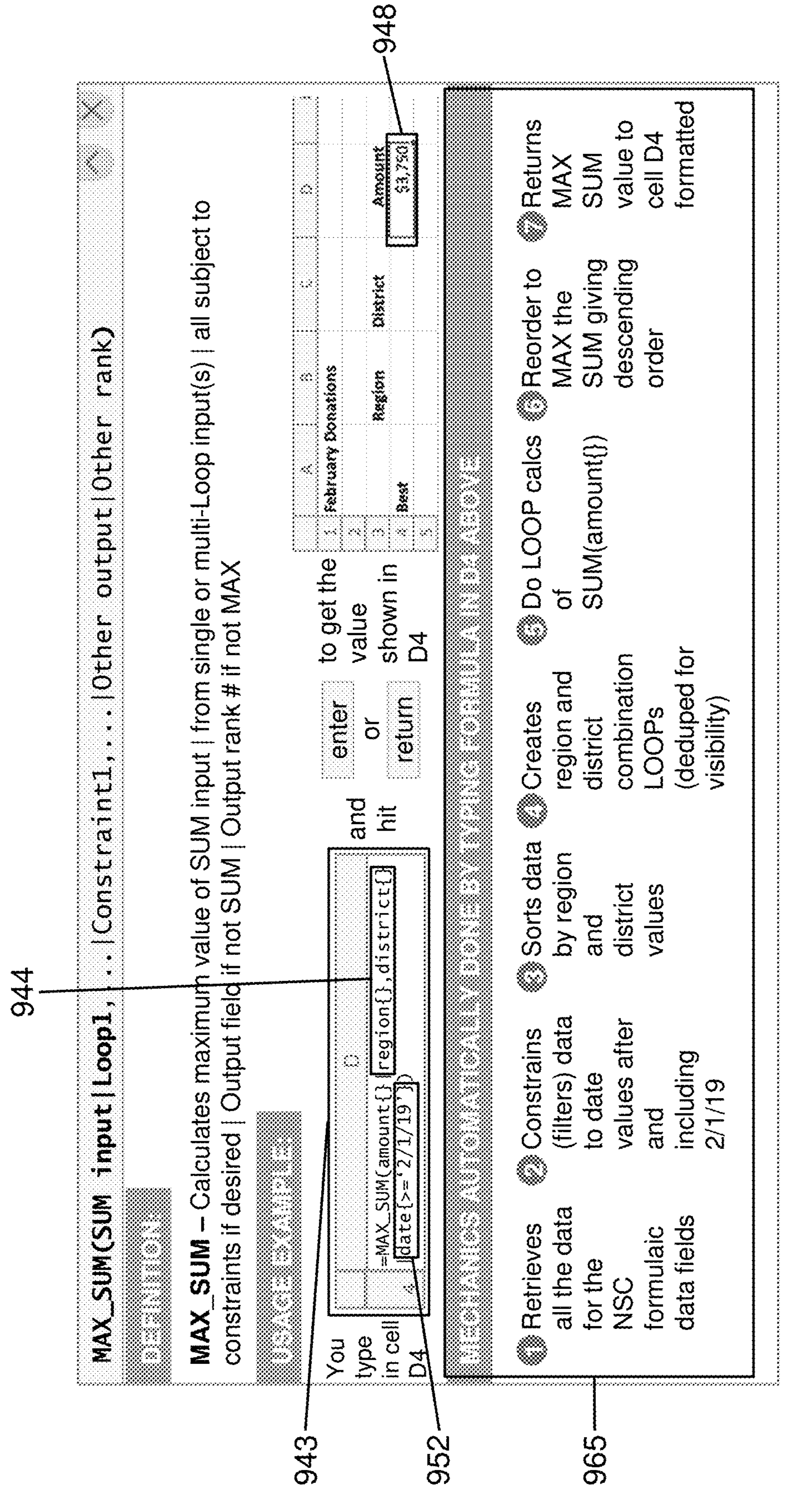

STEPS 1 TO 3

1 Retrieves all the data for the NSC formulaic data fields:

| date | region | district | amount |
|---|---|---|---|
| 1/22/19 | East | 2 | 150 |
| 1/23/19 | South | 2 | 1250 |
| 1/26/19 | West | 2 | 600 |
| 1/27/19 | Central | 1 | 3250 |
| 1/29/19 | West | 1 | 1200 |
| 1/31/19 | South | 2 | 50 |
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/11/19 | East | 1 | 500 |
| 2/11/19 | East | 2 | 50 |
| 2/12/19 | South | 2 | 150 |
| 2/12/19 | West | 1 | 1500 |
| 2/12/19 | West | 2 | 450 |
| 2/13/19 | East | 1 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

2 Constrains (filters) data to date values after and including 2/1/19

| date | region | district | amount |
|---|---|---|---|
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/11/19 | East | 1 | 500 |
| 2/11/19 | East | 2 | 50 |
| 2/12/19 | South | 2 | 150 |
| 2/12/19 | West | 1 | 1500 |
| 2/12/19 | West | 2 | 450 |
| 2/13/19 | East | 1 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

3 Sorts data by region and district values

| region | district | amount |
|---|---|---|
| Central | 1 | 100 |
| Central | 1 | 1000 |
| Central | 1 | 180 |
| Central | 1 | 300 |
| Central | 1 | 1400 |
| East | 1 | 750 |
| East | 1 | 1000 |
| East | 1 | 500 |
| East | 1 | 1500 |
| East | 2 | 50 |
| East | 2 | 150 |
| East | 2 | 75 |
| East | 2 | 150 |
| South | 1 | 950 |
| South | 1 | 500 |
| South | 1 | 100 |
| South | 2 | 150 |
| South | 2 | 150 |
| South | 2 | 150 |
| West | 1 | 1350 |
| West | 1 | 1500 |
| West | 1 | 450 |
| West | 1 | 150 |
| West | 2 | 100 |
| West | 2 | 450 |
| West | 2 | 250 |
| West | 2 | 350 |
| West | 2 | 350 |
| West | 2 | 950 |

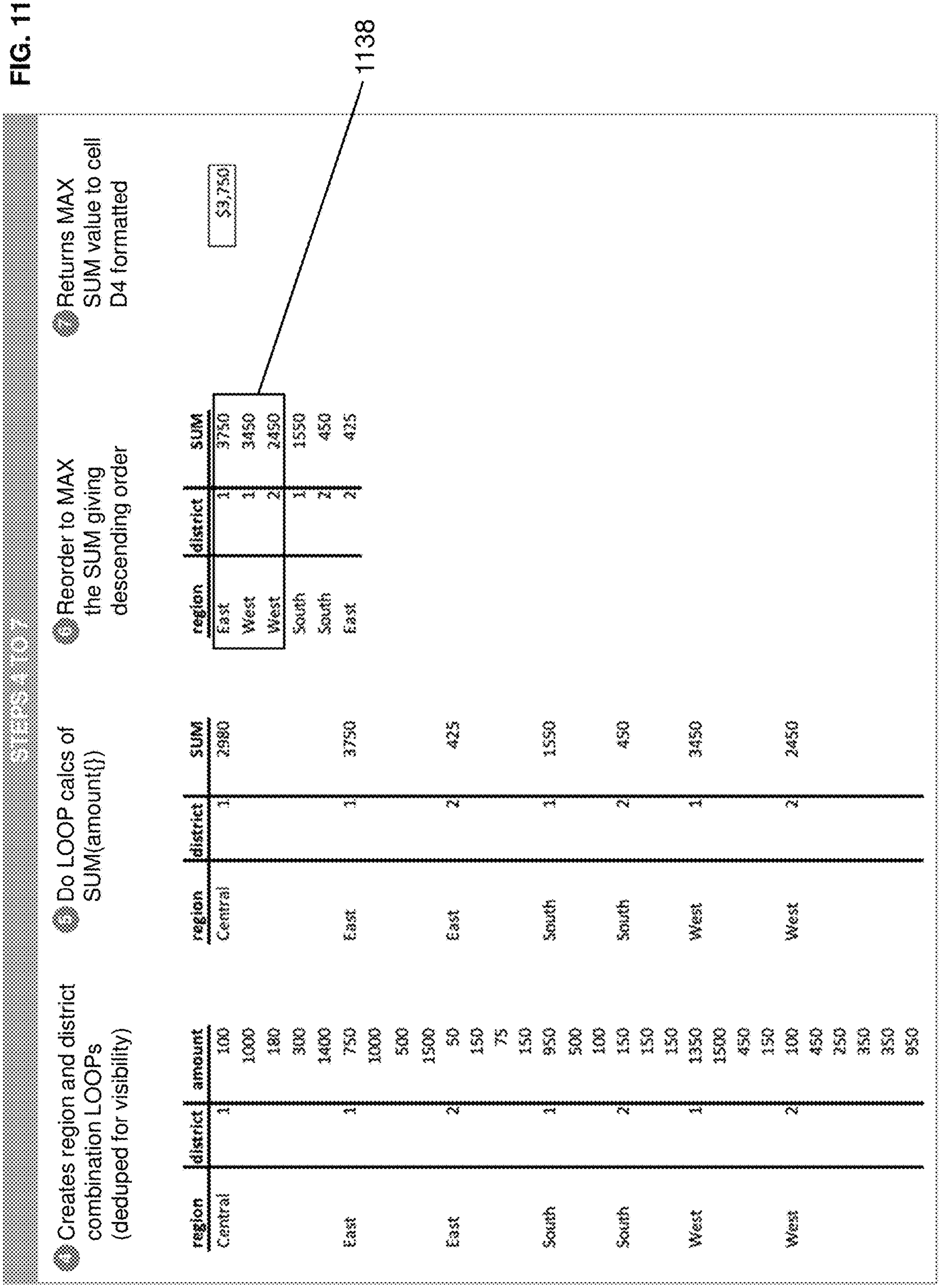

FIG. 11

- Creates region and district combination LOOPs (deduped for visibility)
- Do LOOP calcs of SUM(amount{})
- Reorder to MAX the SUM giving descending order
- Returns MAX SUM value to cell D4 formatted $3,750 — 1138

| region | district | amount |
|--------|----------|--------|
| Central | 1 | 100 |
|  |  | 1000 |
|  |  | 180 |
|  |  | 300 |
|  |  | 1400 |
| East | 1 | 750 |
|  |  | 1000 |
|  |  | 500 |
|  |  | 1500 |
| East | 2 | 50 |
|  |  | 150 |
|  |  | 75 |
|  |  | 150 |
| South | 1 | 950 |
|  |  | 500 |
|  |  | 100 |
| South | 2 | 150 |
|  |  | 150 |
|  |  | 150 |
| West | 1 | 1350 |
|  |  | 1500 |
|  |  | 450 |
|  |  | 150 |
| West | 2 | 100 |
|  |  | 450 |
|  |  | 250 |
|  |  | 350 |
|  |  | 350 |
|  |  | 950 |

| region | district | SUM |
|--------|----------|-----|
| Central | 1 | 2980 |
| East | 1 | 3750 |
| East | 2 | 425 |
| South | 1 | 1550 |
| South | 2 | 450 |
| West | 1 | 3450 |
| West | 2 | 2450 |

| region | district | SUM |
|--------|----------|-----|
| East | 1 | 3750 |
| West | 1 | 3450 |
| West | 2 | 2450 |
| South | 1 | 1550 |
| South | 2 | 450 |
| East | 2 | 425 |

| | A | B | C | D |
|---|---|---|---|---|
| 1 | February Donations | | | |
| 2 | | | | |
| 3 | | Region | District | Amount |
| 4 | Best | =MAX_SUM(amount{}\|region{},district{}\|date{>='2/1/19'}\|region{}) | =MAX_SUM(amount{}\|region{},district{}\|date{>='2/1/19'}\|district{}) | =MAX_SUM(amount{}\|region{},district{}\|date{>='2/1/19'}) |
| 5 | 2nd Best | =MAX_SUM(amount{}\|region{},district{}\|date{>='2/1/19'}\|region{}\|2) | =MAX_SUM(amount{}\|region{},district{}\|date{>='2/1/19'}\|district{}\|2) | =MAX_SUM(amount{}\|region{},district{}\|date{>='2/1/19'}\|2) |
| 6 | 3rd Best | =MAX_SUM(amount{}\|region{},district{}\|date{>='2/1/19'}\|region{}\|3) | =MAX_SUM(amount{}\|region{},district{}\|date{>='2/1/19'}\|district{}\|3) | =MAX_SUM(amount{}\|region{},district{}\|date{>='2/1/19'}\|3) |
| 7 | | | | |

1235

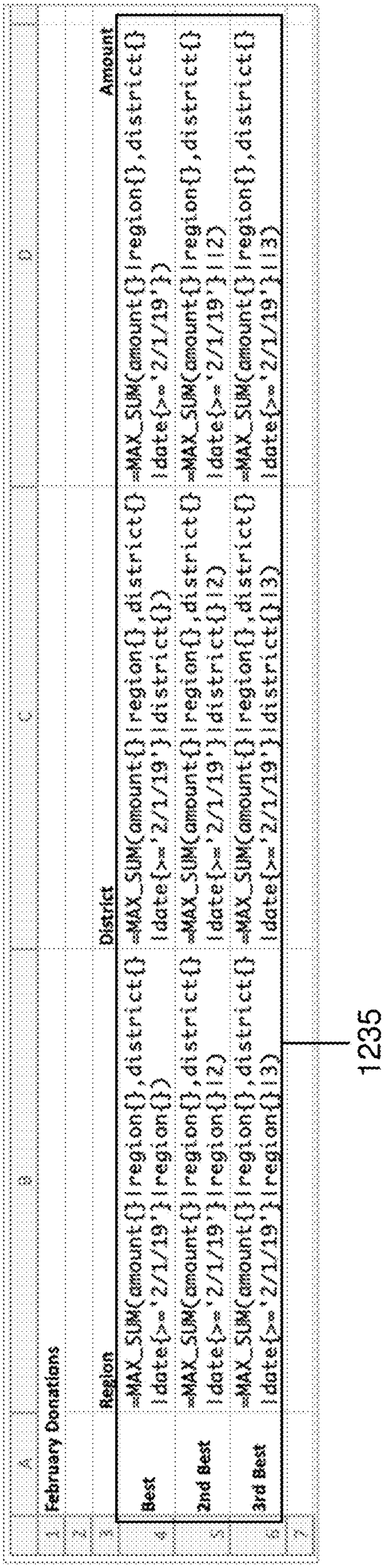

FIG. 12A

| | A | B | C | D |
|---|---|---|---|---|
| 1 | February Donations | | | |
| 2 | | | | |
| 3 | | Region | District | Amount |
| 4 | Best | East | 1 | $3,750 |
| 5 | 2nd Best | West | 1 | $3,450 |
| 6 | 3rd Best | West | 2 | $2,450 |
| 7 | | | | |

1275

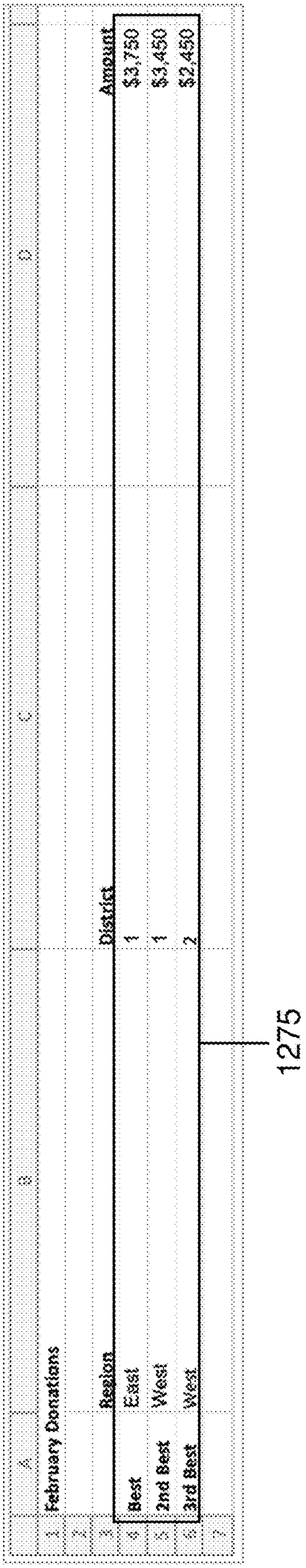

FIG. 12B

EXAMPLES OF MULTI-VALUE USING FUNCTIONS

| FUNCTION | VARIANTS | Other values | Rank etc | Use likelihood |
|---|---|---|---|---|
| MAX | all variants including DMAX | Yes | Rank | |
| MIN | all variants including DMIN | Yes | Rank | |
| MODE | all variants | Yes | Rank | |
| MEDIAN | | Yes | No | |
| LARGE | | Yes | No | |
| SMALL | | Yes | No | |
| AVEDEV | | No | No | |
| AVERAGE | all variants (e.g., A, IF and IFS) | No | No | |
| CONCAT | | No | No | Low |
| COUNT | all variants (e.g., A, BLANK, IF and IFS) | No | No | |
| COVAR | | No | No | Low |
| COVARIANCE | P and S variants | No | No | Low |
| GEOMEAN | | No | No | |
| HARMEAN | | No | No | |
| PERCENTILE | all variants | No | No | |
| PERCENTRANK | all variants | No | No | |
| QUARTILE | All variants | No | No | |
| RANK | all variants | No | No | Low |
| STDEV | all variants including DSTDEV and its variants | No | No | |
| SUM | All variants including DSUM | No | No | |
| UNIQUE | | No | No | |
| VAR | all variants including DVAR and its variants | No | No | |

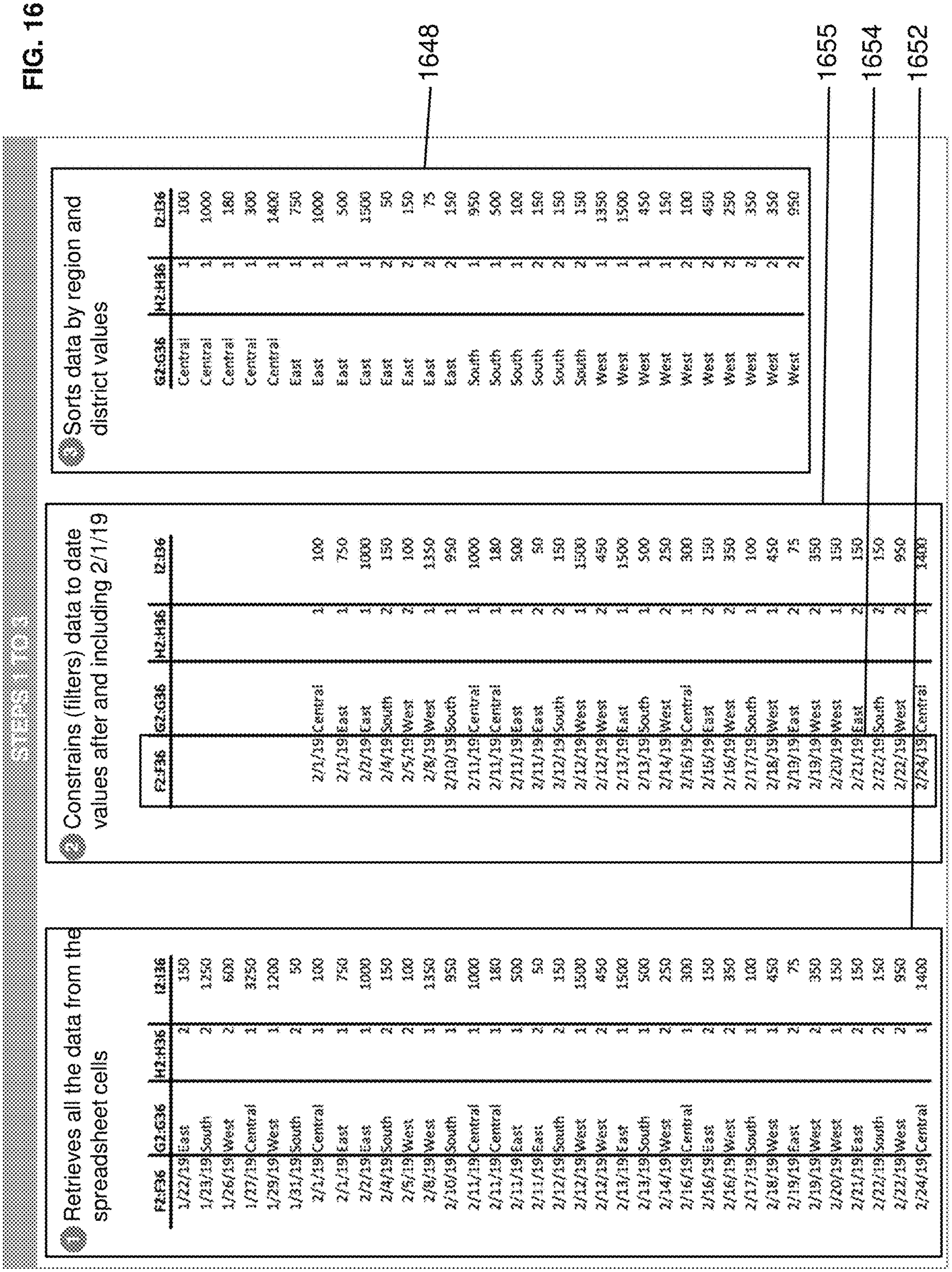

FIG. 16

| F2:F36 | G2:G36 | H2:H36 | I2:I36 |
|---|---|---|---|
| 1/22/19 | East | 2 | 150 |
| 1/23/19 | South | 2 | 1250 |
| 1/26/19 | West | 2 | 600 |
| 1/27/19 | Central | 1 | 3250 |
| 1/29/19 | West | 1 | 1200 |
| 1/31/19 | South | 2 | 50 |
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/12/19 | East | 1 | 500 |
| 2/11/19 | East | 3 | 50 |
| 2/12/19 | South | 2 | 150 |
| 2/12/19 | West | 1 | 1500 |
| 2/12/19 | West | 2 | 450 |
| 2/13/19 | East | 2 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

Retrieves all the data from the spreadsheet cells

| F2:F36 | G2:G36 | H2:H36 | I2:I36 |
|---|---|---|---|
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/12/19 | East | 1 | 500 |
| 2/11/19 | East | 3 | 50 |
| 2/12/19 | South | 2 | 150 |
| 2/12/19 | West | 1 | 1500 |
| 2/12/19 | West | 2 | 450 |
| 2/13/19 | East | 2 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

Constrains (filters) data to date values after and including 2/1/19

| G2:G36 | H2:H36 | I2:I36 |
|---|---|---|
| Central | 1 | 100 |
| Central | 1 | 1000 |
| Central | 1 | 180 |
| Central | 1 | 300 |
| Central | 1 | 1400 |
| East | 1 | 750 |
| East | 1 | 1000 |
| East | 1 | 500 |
| East | 3 | 50 |
| East | 2 | 1500 |
| East | 2 | 150 |
| East | 2 | 75 |
| East | 2 | 150 |
| South | 1 | 950 |
| South | 1 | 500 |
| South | 2 | 100 |
| South | 2 | 150 |
| South | 2 | 150 |
| West | 1 | 1350 |
| West | 1 | 1500 |
| West | 1 | 450 |
| West | 2 | 100 |
| West | 2 | 450 |
| West | 2 | 250 |
| West | 2 | 350 |
| West | 2 | 150 |
| West | 2 | 350 |
| West | 2 | 950 |

Sorts data by region and district values 1648
1655
1654
1652

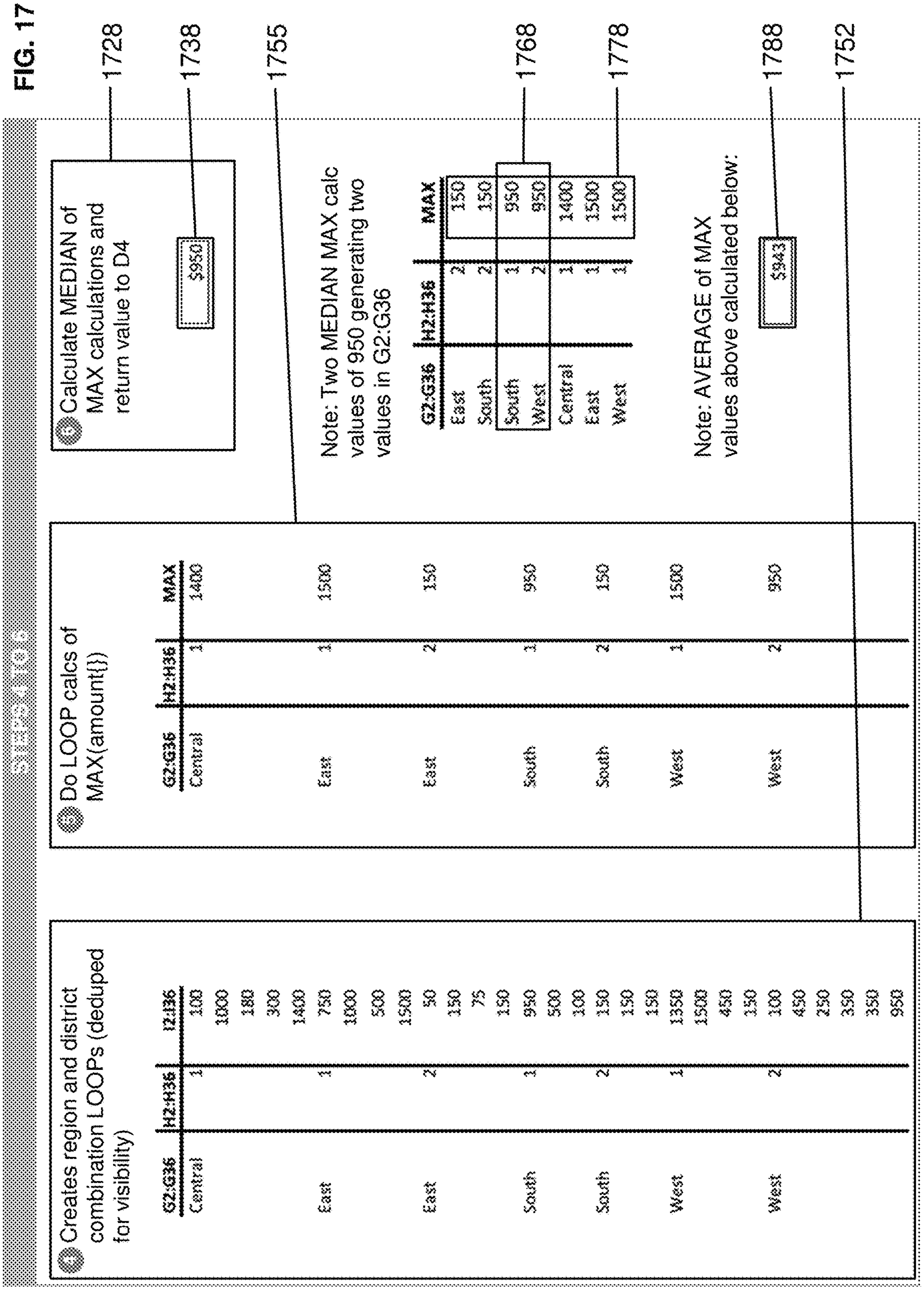

STEP 1720

◉ Creates region and district combination LOOPs (deduped for visibility)

| G2:G36 | H2:H36 | I2:I36 |
|---|---|---|
| Central | 1 | 100 |
| | | 1000 |
| | | 180 |
| | | 300 |
| | | 1400 |
| East | 1 | 750 |
| | | 1000 |
| | | 500 |
| | | 1500 |
| East | 2 | 50 |
| | | 150 |
| | | 75 |
| | | 150 |
| South | 1 | 950 |
| | | 500 |
| | | 100 |
| | | 150 |
| South | 2 | 150 |
| | | 150 |
| | | 150 |
| West | 1 | 1350 |
| | | 1500 |
| | | 450 |
| | | 150 |
| West | 2 | 100 |
| | | 450 |
| | | 250 |
| | | 350 |
| | | 350 |
| | | 950 |

◉ Do LOOP calcs of MAX(amount{})

| G2:G36 | H2:H36 | MAX |
|---|---|---|
| Central | 1 | 1400 |
| East | 1 | 1500 |
| East | 2 | 150 |
| South | 1 | 950 |
| South | 2 | 150 |
| West | 1 | 1500 |
| West | 2 | 950 |

◉ Calculate MEDIAN of MAX calculations and return value to D4

$950

Note: Two MEDIAN MAX calc values of 950 generating two values in G2:G36

| G2:G36 | H2:H36 | MAX |
|---|---|---|
| East | 2 | 150 |
| South | 2 | 150 |
| South | 1 | 950 |
| West | 2 | 950 |
| Central | 1 | 1400 |
| East | 1 | 1500 |
| West | 1 | 1500 |

Note: AVERAGE of MAX values above calculated below:

$943

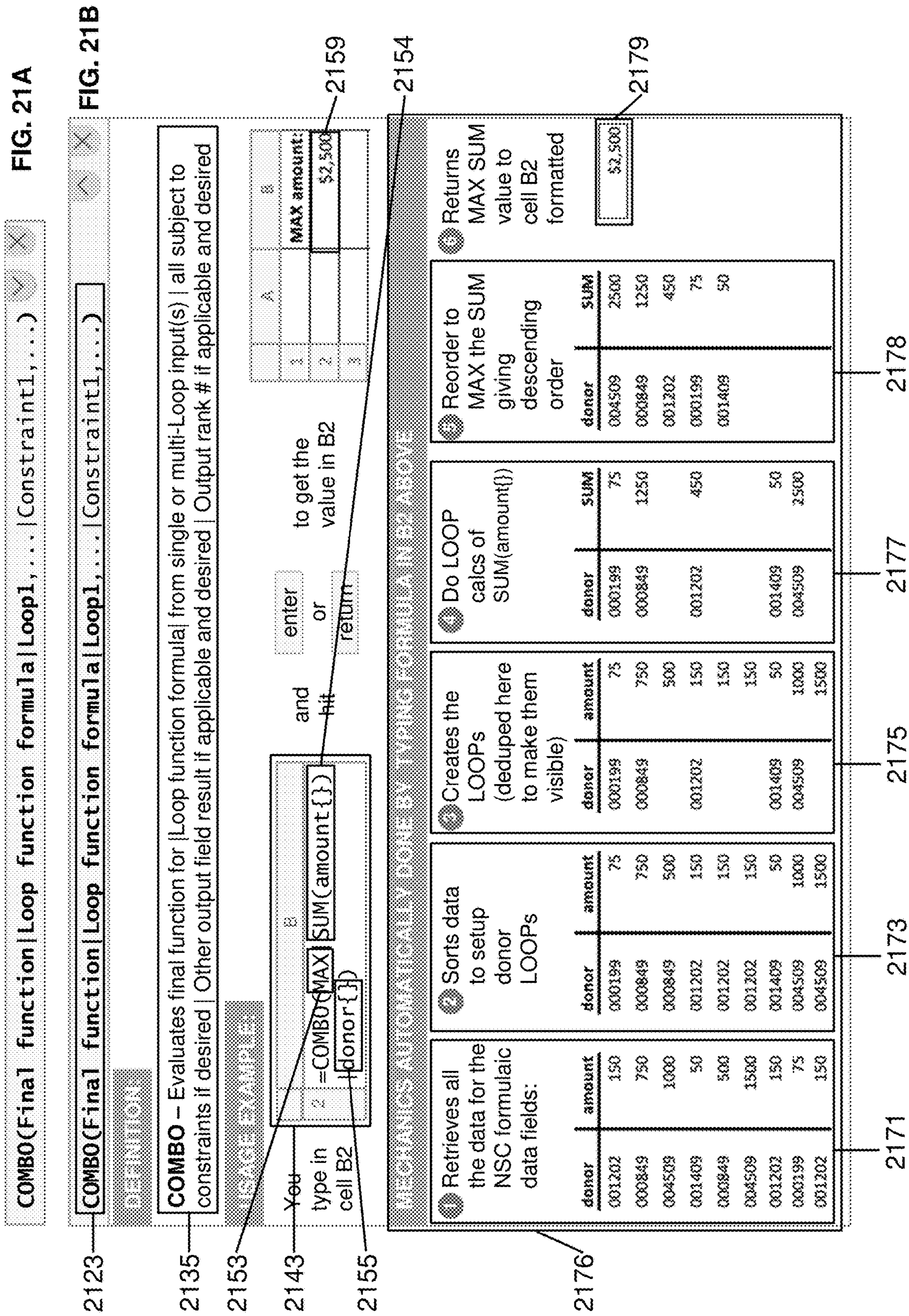
FIG. 21A
FIG. 21B
COMBO(Final function|Loop function formula|Loop1,...|Constraint1,...)
DEFINITION
COMBO – Evaluates final function for |Loop function formula| from single or multi-Loop input(s) | all subject to constraints if desired | Other output field result if applicable and desired | Output rank # if applicable and desired
USAGE EXAMPLE
You type in cell B2
=COMBO(MAX|SUM(amount{})|donor{})
and hit
enter or return
to get the value in B2
MAX amount:
$2,500
MECHANICS AUTOMATICALLY DONE BY TYPING FORMULA IN B2 ABOVE
1 Retrieves all the data for the NSC formulaic data fields:
2 Sorts data to setup donor LOOPs
3 Creates the LOOPs (deduped here to make them visible)
4 Do LOOP calcs of SUM(amount{})
5 Reorder to MAX the SUM giving descending order
6 Returns MAX SUM value to cell B2 formatted
donor
amount
SUM
2123
2135
2153
2143
2155
2176
2159
2154
2179
2171
2173
2175
2177
2178

FIG. 27

STEPS 1 TO 3

2752

1 Retrieves all the data for the NSC formulaic data fields:

| date | region | district | amount |
|---|---|---|---|
| 1/22/19 | East | 2 | 150 |
| 1/23/19 | South | 2 | 1250 |
| 1/26/19 | West | 2 | 600 |
| 1/27/19 | Central | 1 | 3250 |
| 1/29/19 | West | 1 | 1200 |
| 1/31/19 | South | 2 | 50 |
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/11/19 | East | 1 | 500 |
| 2/11/19 | East | 2 | 50 |
| 2/12/19 | South | 2 | 150 |
| 2/12/19 | West | 1 | 1500 |
| 2/12/19 | West | 2 | 450 |
| 2/13/19 | East | 1 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

2755

2 Constrains (filters) data to date values after and including 2/1/19

| date | region | district | amount |
|---|---|---|---|
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/11/19 | East | 1 | 500 |
| 2/11/19 | East | 2 | 50 |
| 2/12/19 | South | 2 | 150 |
| 2/12/19 | West | 1 | 1500 |
| 2/12/19 | West | 2 | 450 |
| 2/13/19 | East | 1 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

2748

3 Sorts data by region and district values

| region | district | amount |
|---|---|---|
| Central | 1 | 100 |
| Central | 1 | 1000 |
| Central | 1 | 180 |
| Central | 1 | 300 |
| Central | 1 | 1400 |
| East | 1 | 750 |
| East | 1 | 1000 |
| East | 1 | 500 |
| East | 1 | 1500 |
| East | 2 | 50 |
| East | 2 | 150 |
| East | 2 | 75 |
| East | 2 | 150 |
| South | 1 | 950 |
| South | 1 | 500 |
| South | 1 | 100 |
| South | 2 | 150 |
| South | 2 | 150 |
| South | 2 | 150 |
| West | 1 | 1350 |
| West | 1 | 1500 |
| West | 1 | 450 |
| West | 1 | 150 |
| West | 2 | 100 |
| West | 2 | 450 |
| West | 2 | 250 |
| West | 2 | 350 |
| West | 2 | 350 |
| West | 2 | 950 |

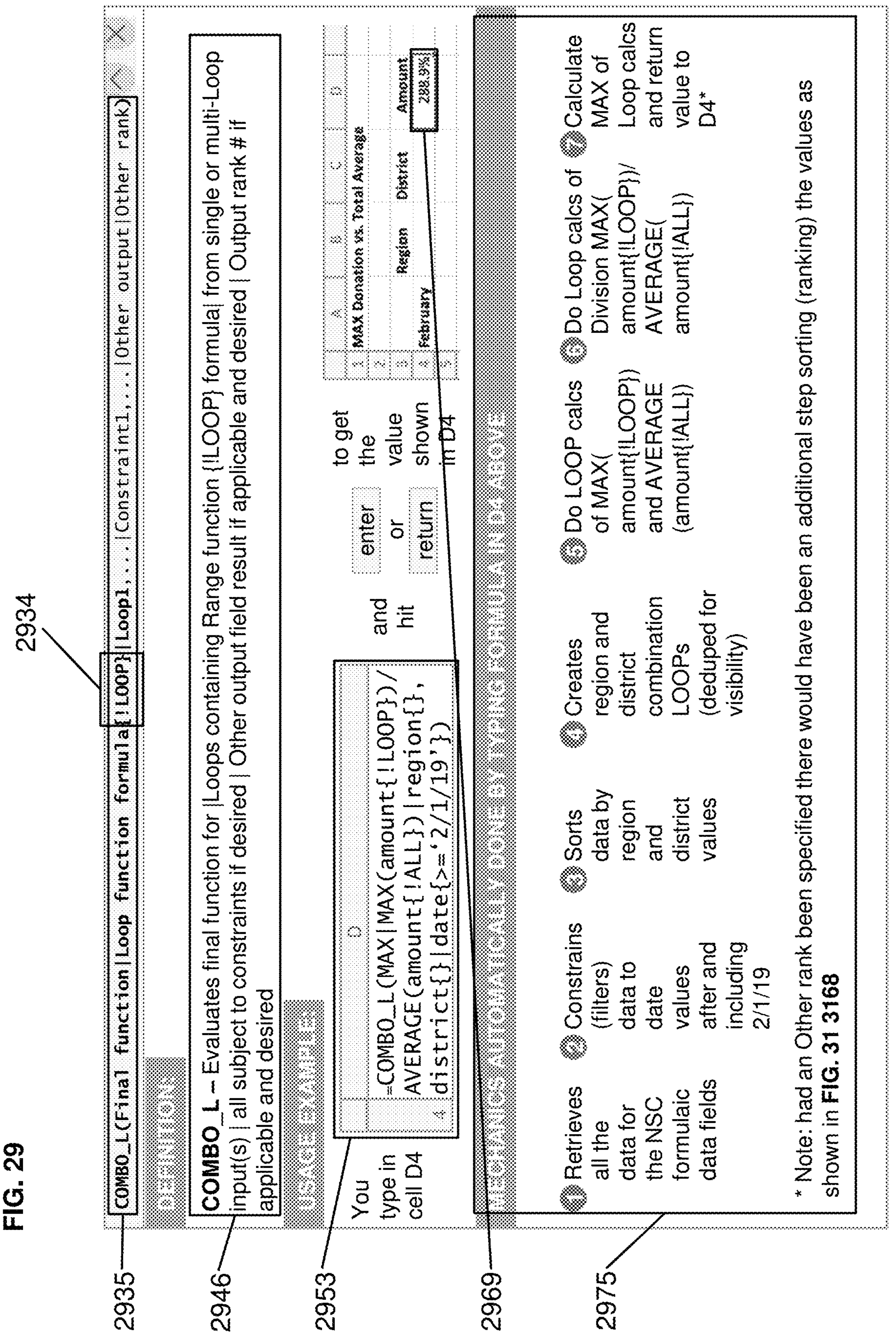

FIG. 29

2935 — `COMBO_L(Final function|Loop function|Loop function formula{!LOOP}|Loop1|...|Constraint1,...|Other output|Other rank)` 2934

2946 — COMBO_L – Evaluates final function for |Loops containing Range function {!LOOP} formula| from single or multi-Loop input(s) | all subject to constraints if desired | Other output field result if applicable and desired | Output rank # if applicable and desired 2953 — You type in cell D4 `=COMBO_L(MAX|MAX(amount{!LOOP})/AVERAGE(amount{!ALL})|region{},district{}|date{}>='2/1/19')` and hit enter or return to get the value shown in D4

|   | A | B | C | D |
|---|---|---|---|---|
| 1 | MAX Donation vs. Total Average | | | |
| 2 | | | | |
| 3 | | Region | District | Amount |
| 4 | February | | | 288.9% |
| 5 | | | | |

2969 — ○ Retrieves all the data for the NSC formulaic data fields  ○ Constrains (filters) data to date values after and including 2/1/19  ○ Sorts data by region and district values  ○ Creates region and district combination LOOPs (deduped for visibility)  ○ Do LOOP calcs of MAX(amount{!LOOP}) and AVERAGE(amount{!ALL})  ○ Do Loop calcs of Division MAX(amount{!LOOP})/AVERAGE(amount{!ALL})  ○ Calculate MAX of Loop calcs and return value to D4*

2975 — * Note: had an Other rank been specified there would have been an additional step sorting (ranking) the values as shown in FIG. 31 3168

FIG. 30

STEPS 1 TO 3

3052

1 Retrieves all the data for the NSC formulaic data fields:

| date | region | district | amount |
|---|---|---|---|
| 1/22/19 | East | 2 | 150 |
| 1/23/19 | South | 2 | 1250 |
| 1/26/19 | West | 2 | 600 |
| 1/27/19 | Central | 1 | 3250 |
| 1/29/19 | West | 1 | 1200 |
| 1/31/19 | South | 2 | 50 |
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/11/19 | East | 1 | 500 |
| 2/11/19 | East | 2 | 50 |
| 2/12/19 | South | 2 | 150 |
| 2/12/19 | West | 1 | 1500 |
| 2/12/19 | West | 2 | 450 |
| 2/13/19 | East | 1 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

3055

2 Constrains (filters) data to date values after and including 2/1/19

| date | region | district | amount |
|---|---|---|---|
| 2/1/19 | Central | 1 | 100 |
| 2/1/19 | East | 1 | 750 |
| 2/2/19 | East | 1 | 1000 |
| 2/4/19 | South | 2 | 150 |
| 2/5/19 | West | 2 | 100 |
| 2/8/19 | West | 1 | 1350 |
| 2/10/19 | South | 1 | 950 |
| 2/11/19 | Central | 1 | 1000 |
| 2/11/19 | Central | 1 | 180 |
| 2/11/19 | East | 1 | 500 |
| 2/11/19 | East | 2 | 50 |
| 2/12/19 | South | 2 | 150 |
| 2/12/19 | West | 1 | 1500 |
| 2/12/19 | West | 2 | 450 |
| 2/13/19 | East | 1 | 1500 |
| 2/13/19 | South | 1 | 500 |
| 2/14/19 | West | 2 | 250 |
| 2/16/19 | Central | 1 | 300 |
| 2/16/19 | East | 2 | 150 |
| 2/16/19 | West | 2 | 350 |
| 2/17/19 | South | 1 | 100 |
| 2/18/19 | West | 1 | 450 |
| 2/19/19 | East | 2 | 75 |
| 2/19/19 | West | 2 | 350 |
| 2/20/19 | West | 1 | 150 |
| 2/21/19 | East | 2 | 150 |
| 2/22/19 | South | 2 | 150 |
| 2/22/19 | West | 2 | 950 |
| 2/24/19 | Central | 1 | 1400 |

3048

3 Sorts data by region and district values

| region | district | amount |
|---|---|---|
| Central | 1 | 100 |
| Central | 1 | 1000 |
| Central | 1 | 180 |
| Central | 1 | 300 |
| Central | 1 | 1400 |
| East | 1 | 750 |
| East | 1 | 1000 |
| East | 1 | 500 |
| East | 1 | 1500 |
| East | 2 | 50 |
| East | 2 | 150 |
| East | 2 | 75 |
| East | 2 | 150 |
| South | 1 | 950 |
| South | 1 | 500 |
| South | 1 | 100 |
| South | 2 | 150 |
| South | 2 | 150 |
| South | 2 | 150 |
| West | 1 | 1350 |
| West | 1 | 1500 |
| West | 1 | 450 |
| West | 1 | 150 |
| West | 2 | 100 |
| West | 2 | 450 |
| West | 2 | 250 |
| West | 2 | 350 |
| West | 2 | 350 |
| West | 2 | 950 |

COMBO_L(Final function|Loop function formula{!LOOP}|Loop1,...|Constraint1,...|Other output|Other rank)

DEFINITION

COMBO_L – Evaluates final function for |Loops containing Range function {!LOOP} formula| from single or multi-Loop input(s) | all subject to constraints if desired | Other output field result if applicable and desired | Output rank # if applicable and desired

USAGE

You type in cell B4:
`=COMBO_L(MAX|MAX(amount{!LOOP})/AVERAGE(AMOUNT{!ALL})|region{},district{}|date{}>='2/1/19'|3)` and hit enter or return to get the value shown in B4

| | A | B | C |
|---|---|---|---|
| 1 | 3rd Ranked MAX Donation vs. Total Average | | |
| 2 | | | |
| 3 | | Region | District | Amount |
| 4 | February | South, West | | |

MECHANICS/MONIKERS POINTED TO BY THE FORMULA AND/OR ABOVE

- Retrieves all the data for the NSC formulaic data fields
- Constrains (filters) data to date values after and including 2/1/19
- Sorts data by region and district values
- Creates region and district combination LOOPs (deduped for visibility)
- Do LOOP calcs of MAX(amount{}) and AVERAGE (amount{})
- Do Loop calcs of MAX(amount{})/AVERAGE (amount{})
- Calculate MAX of Loop calcs and return Region value for 3rd RANK to B4

| region | district | Division |
|---|---|---|
| East | 1 | 2.889406 |
| West | 1 | 2.889406 |
| Central | 1 | 2.696778 |
| South | 1 | 1.829957 |
| West | 2 | 1.829957 |
| East | 2 | 0.288941 |
| South | 2 | 0.288941 |

Note: MAX ranked Division values for other output and other ranked values 3258, 3243, 3253, 3265, 3268, 3278, 3288

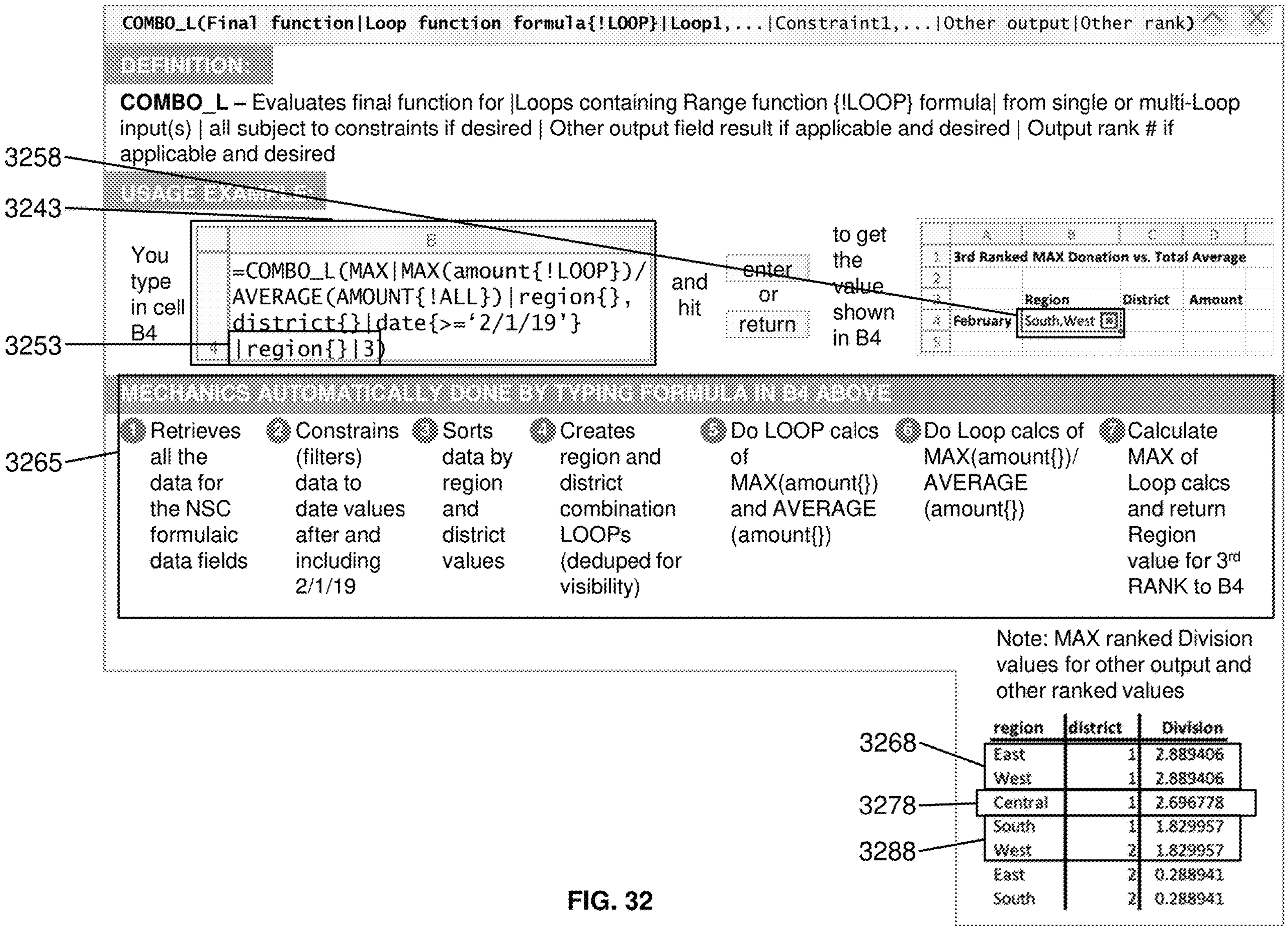

FIG. 32

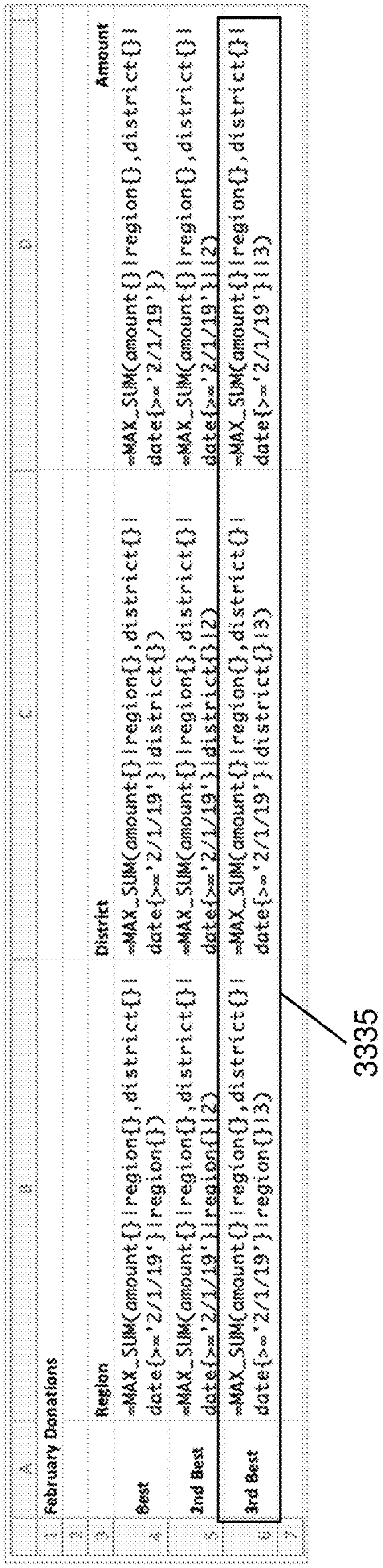

FIG. 33A

February Donations

| | Region | District | Amount |
|---|---|---|---|
| Best | =MAX_SUM(amount{}|region{})|region{} | =MAX_SUM(amount{}|region{},district{})|district{} | =MAX_SUM(amount{}|region{},district{})|date{>='2/1/19'}) |
| | date{>='2/1/19'}) | date{>='2/1/19'}|district{}) | |
| 2nd Best | =MAX_SUM(amount{}|region{})|region{}|2 | =MAX_SUM(amount{}|region{},district{})|district{}|2 | =MAX_SUM(amount{}|region{},district{})|date{>='2/1/19'})|2 |
| | date{>='2/1/19'}|region{}|2 | date{>='2/1/19'}|district{}|2 | |
| 3rd Best | =MAX_SUM(amount{}|region{})|region{}|3 | =MAX_SUM(amount{}|region{},district{})|district{}|3 | =MAX_SUM(amount{}|region{},district{})|date{>='2/1/19'})|3 |
| | date{>='2/1/19'}|region{}|3 | date{>='2/1/19'}|district{}|3 | |

3335

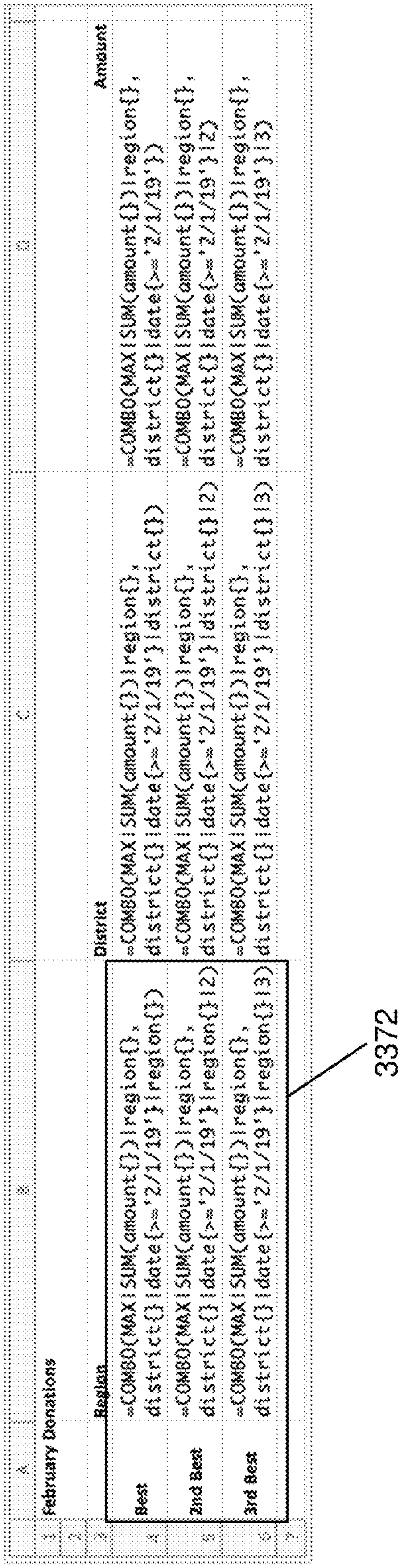

FIG. 33B

February Donations

| | Region | District | Amount |
|---|---|---|---|
| Best | =COMBO(MAX|SUM(amount{})|region{}, district{}|date{>='2/1/19'}|region{}) | =COMBO(MAX|SUM(amount{})|region{}, district{}|date{>='2/1/19'}|district{}) | =COMBO(MAX|SUM(amount{})|region{}, district{}|date{>='2/1/19'}) |
| 2nd Best | =COMBO(MAX|SUM(amount{})|region{}, district{}|date{>='2/1/19'}|region{}|2) | =COMBO(MAX|SUM(amount{})|region{}, district{}|date{>='2/1/19'}|district{}|2) | =COMBO(MAX|SUM(amount{})|region{}, district{}|date{>='2/1/19'})|2 |
| 3rd Best | =COMBO(MAX|SUM(amount{})|region{}, district{}|date{>='2/1/19'}|region{}|3) | =COMBO(MAX|SUM(amount{})|region{}, district{}|date{>='2/1/19'}|district{}|3) | =COMBO(MAX|SUM(amount{})|region{}, district{}|date{>='2/1/19'})|3 |

February MEDIAN Donations

| | Region | District | Amount |
|---|---|---|---|
| Median | =MEDIAN_MAX(I2:I36|G2:G36, H2:H36|F2:F36|>=2/1/19)) | | |

3424
3426

February MEDIAN Donations

| | Region | District | Amount |
|---|---|---|---|
| Median | | | $950 |

3447
3448

February MEDIAN Donations

| | Region | District | Amount |
|---|---|---|---|
| Median | =MEDIAN_MAX(I2:I36|G2:G36, H2:H36|F2:F36|>=2/1/19)|H2:H36) | =MEDIAN_MAX(I2:I36|G2:G36, H2:H36|F2:F36|>=2/1/19)|G2:G36) | |

3464

February MEDIAN Donations

| | Region | District | Amount |
|---|---|---|---|
| Median | South West | 1,2 | $950 |

3487

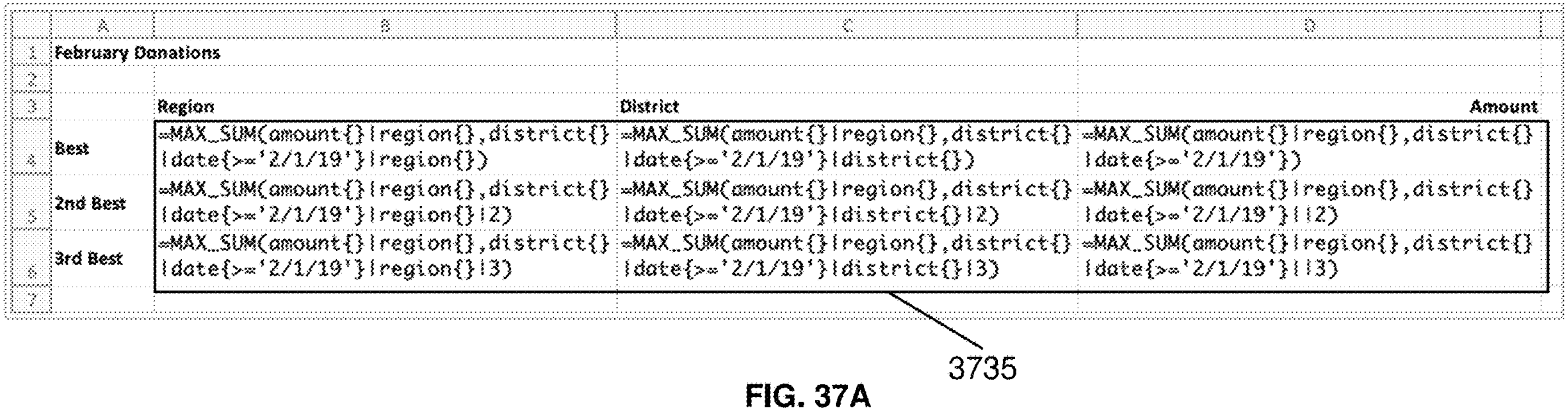

FIG. 37A

February Donations

| | Region | District | |
|---|---|---|---|
| Best | =MAX_SUM(amount{}\|region{},district{})\|date{>='2/1/19'}\|region{}) | =MAX_SUM(amount{}\|region{},district{})\|date{>='2/1/19'}\|district{}) | Amount |
| 2nd Best | =MAX_SUM(amount{}\|region{},district{})\|date{>='2/1/19'}\|region{}\|2) | =MAX_SUM(amount{}\|region{},district{})\|date{>='2/1/19'}\|2) | |
| 3rd Best | =MAX_SUM(amount{}\|region{},district{})\|date{>='2/1/19'}\|region{}\|3) | =MAX_SUM(amount{}\|region{},district{})\|date{>='2/1/19'}\|3) | |

3735

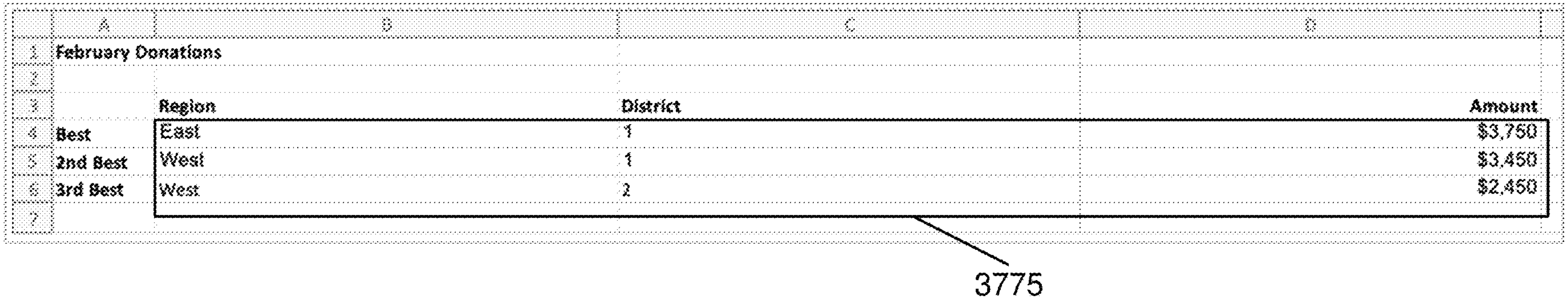

FIG. 37B

February Donations

| | Region | District | Amount |
|---|---|---|---|
| Best | East | 1 | $3,750 |
| 2nd Best | West | 1 | $3,450 |
| 3rd Best | West | 2 | $2,450 |

3775

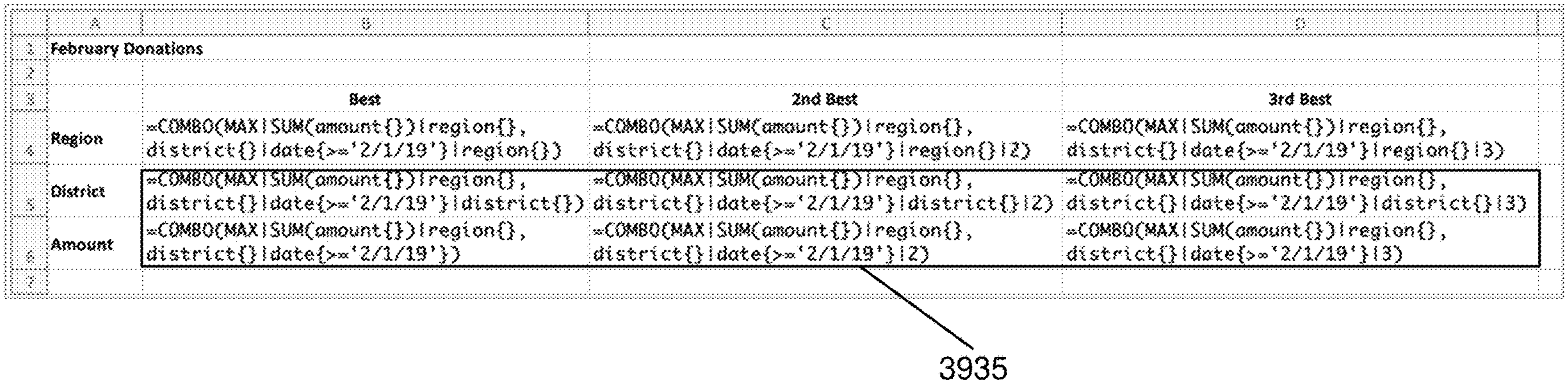

<table>
<tr><th></th><th>A</th><th>B</th><th>C</th><th>D</th></tr>
<tr><td>1</td><td>February Donations</td><td></td><td></td><td></td></tr>
<tr><td>2</td><td></td><td></td><td></td><td></td></tr>
<tr><td>3</td><td></td><td>Best</td><td>2nd Best</td><td>3rd Best</td></tr>
<tr><td>4</td><td>Region</td><td>=COMBO(MAX|SUM(amount{})|region{}, district{}|date{>='2/1/19'}|region{})</td><td>=COMBO(MAX|SUM(amount{})|region{}, district{}|date{>='2/1/19'}|region{}|2)</td><td>=COMBO(MAX|SUM(amount{})|region{}, district{}|date{>='2/1/19'}|region{}|3)</td></tr>
<tr><td>5</td><td>District</td><td>=COMBO(MAX|SUM(amount{})|region{}, district{}|date{>='2/1/19'}|district{})</td><td>=COMBO(MAX|SUM(amount{})|region{}, district{}|date{>='2/1/19'}|district{}|2)</td><td>=COMBO(MAX|SUM(amount{})|region{}, district{}|date{>='2/1/19'}|district{}|3)</td></tr>
<tr><td>6</td><td>Amount</td><td>=COMBO(MAX|SUM(amount{})|region{}, district{}|date{>='2/1/19'})</td><td>=COMBO(MAX|SUM(amount{})|region{}, district{}|date{>='2/1/19'}|2)</td><td>=COMBO(MAX|SUM(amount{})|region{}, district{}|date{>='2/1/19'}|3)</td></tr>
<tr><td>7</td><td></td><td></td><td></td><td></td></tr>
</table>

FIG. 39A

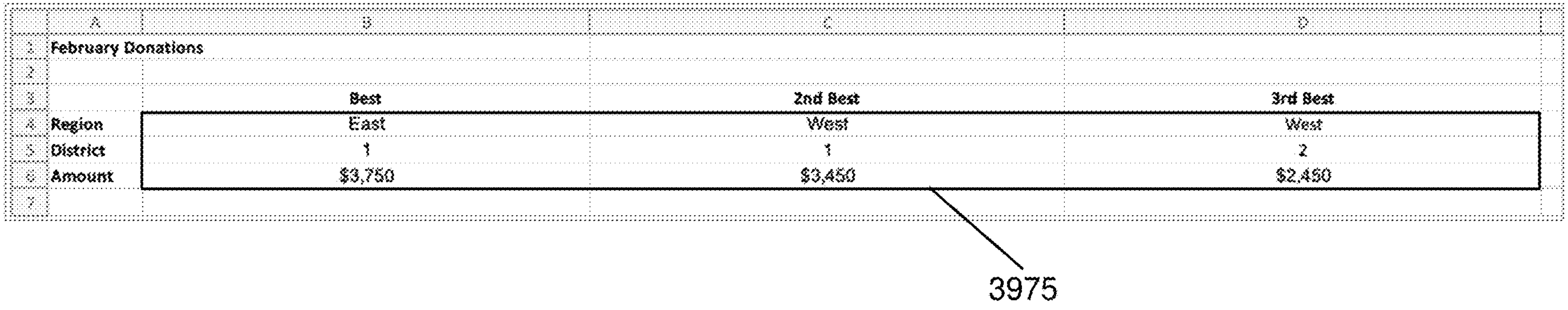

<table>
<tr><th></th><th>A</th><th>B</th><th>C</th><th>D</th></tr>
<tr><td>1</td><td>February Donations</td><td></td><td></td><td></td></tr>
<tr><td>2</td><td></td><td></td><td></td><td></td></tr>
<tr><td>3</td><td></td><td>Best</td><td>2nd Best</td><td>3rd Best</td></tr>
<tr><td>4</td><td>Region</td><td>East</td><td>West</td><td>West</td></tr>
<tr><td>5</td><td>District</td><td>1</td><td>1</td><td>2</td></tr>
<tr><td>6</td><td>Amount</td><td>$3,750</td><td>$3,450</td><td>$2,450</td></tr>
<tr><td>7</td><td></td><td></td><td></td><td></td></tr>
</table>

FIG. 39B

4000
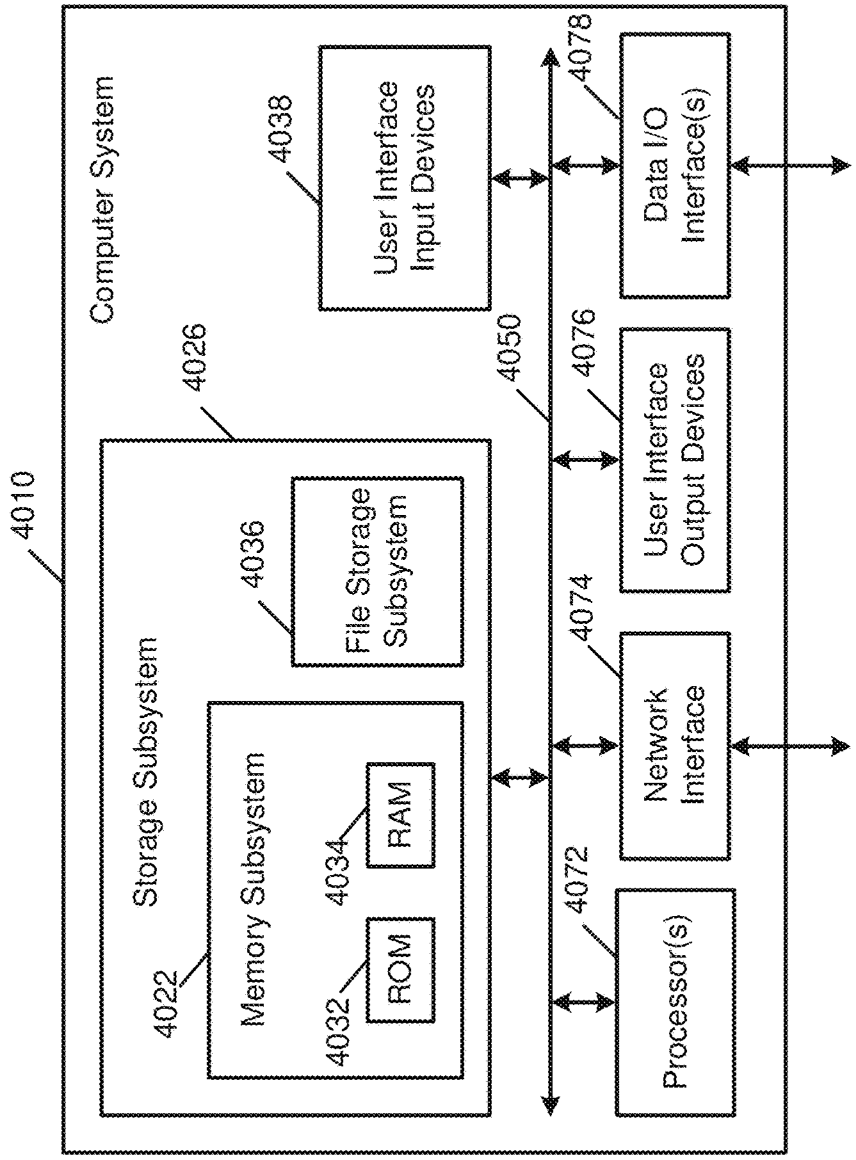
Fig. 40 Computer System

METHOD AND SYSTEM FOR IMPROVED SPREADSHEET ANALYTICAL FUNCTIONING

CROSS-REFERENCE

This applications claims priority to and the benefit of U.S. Application No. 63/051,280, titled "Method and System For Improved Spreadsheet Analytical Functioning" filed 13 Jul. 2020.

RELATED APPLICATIONS

This application is related to and incorporates by reference the following applications:

Contemporaneously filed U.S. Application Ser. No. 17/374,901, entitled, "Method and System for Improved Ordering of Output from Spreadsheet Analytical functions", which claims priority to U.S. Application No. 63/051,283, filed 13 Jul. 2020.

U.S. application Ser. No. 16/031,339, entitled "Methods and Systems for Providing Selective Multi-Way Replication and Atomization of Cell Blocks and Other Elements in Spreadsheets and Presentations", filed 10 Jul. 2018, which claims the benefit of U.S. Provisional Application No. 62/530,835, filed 10 Jul. 2017, U.S. application Ser. No. 16/031,379, entitled "Methods and Systems for Connecting a Spreadsheet to External Data Sources with Formulaic Specification of Data Retrieval", filed 10 Jul. 2018, which claims the benefit of U.S. Provisional Application No. 62/530,786, filed 10 Jul. 2017, U.S. application Ser. No. 16/031,759, entitled, "Methods and Systems for Connecting A Spreadsheet to External Data Sources with Temporal Replication of Cell Blocks", filed 10 Jul. 2018, which claims the benefit of U.S. Provisional Patent Application No. 62/530,794, filed on 10 Jul. 2017, and U.S. application Ser. No. 16/191,402, entitled, "Methods and Systems for Connecting A Spreadsheet to External Data Sources with Ordered Formulaic Specification of Data Retrieved" filed Nov. 14, 2018, which claims the benefit of U.S. Provisional Patent Application No. 62/586,719," filed on 15 Nov. 2017.

U.S. Application No. 63/044,990, entitled, "Methods and Systems for Constructing a Complex Formula in a Spreadsheet Cell", filed 26 Jun. 2020.

U.S. Application No. 63/044,989, entitled, "Methods and Systems for Presenting Drop-Down, Pop-Up or Other Presentation of a Multi-Value Data Set in a Spreadsheet Cell", 26 Jun. 2020.

BACKGROUND

Today's spreadsheets have a broad range of functions (predefined formulas), e.g., SUM, COUNT, MIN, and STDEV, designed to simplify analytics for users. However, the loop, a fundamental capability of most programming languages which allows users to execute one or more calculations repeatedly, is missing from spreadsheet functions. There are many situations where spreadsheet users today are forced to manually do repetitive analytics which could instead be highly automated by a family of new functions which execute looped calculations.

Consider a charity that would like to know what donor contributed the most over the last ten years. Instead of having to SUM over time each donors' total contributions, and then determine who gave the MAX amount across all those SUMs, imagine how easy it would be if instead there was a new function that combined an automated repetitive looped SUM calculation with a MAX function evaluation of the SUM results. Consider all the mix and match combinations of the basic SUM, COUNT, MIN, MAX, AVERAGE and MEDIAN functions. Then consider, for more advanced users, the mix and match possibilities adding in more statistical functions such as STDEV, PERCENTILE, or T.DIST. Combining functions using a new technology would start to bring the power of the spreadsheet embedded programming language (e.g., Visual Basic for Applications in Microsoft Excel and Apps Scripts in Google Sheets), which are practical for the very small percentage of users who know how use them, to the masses of users who do not program. Letting users simply create combination function formulas, combining familiar functions that are automatically looped, lets users effectively program their own little application without learning a programming language and writing code. And for those few advanced users who have learned the embedded programming language, it would present a much easier way of solving whole families of problems with a simple formula versus writing code within their spreadsheets.

Accordingly, there is a large opportunity to create a new family of functions that does looped combinations of familiar spreadsheet functions to solve problems involving repetitive calculations.

SUMMARY

The disclosed technology creates a family of spreadsheet functions (predefined formulas) which allow users to create programming loop equivalents in their regular spreadsheet cells combining familiar range or array evaluating functions (e.g., SUM, COUNT, MIN, MAX, etc.) with data filtering and output selection. The input data to these new functions can be sourced from multiple cells within the spreadsheet or a broad spectrum of numeric, date and text data not stored in a spreadsheet, including data not discretely defined. The technology disclosed can use as inputs cell ranges or Non-spreadsheet Cell (NSC) data formulas. The technology supports functions with predefined combinations and user specified combinations all capable of automating, millions of looped calculations. Some predefined combinations become part of the spreadsheet system definition and syntax. Other combinations begin with a function that accepts one, two or more user selected predefined functions to be combined.

One embodiment of our technology combines the equivalent of two of the existing range or array evaluating functions (e.g., SUM, COUNT, MIN, AVERAGE and STDEV) in predefined combinations to do the looped calculations. Another embodiment allows the user to specify what range or array evaluating functions to combine and allows the user to construct simple or complex formulas for the looped calculation. These user specified combinations support complex looped formulas and the loop equivalent calculations selectively applied to data fields in the looped calculations. Some of our predefined and user specified functions support outputting a related result. Those related results can be a user specified ranking of the result, a user specified other output or a combination of a user specified ranking and other output (e.g., the name of the second highest donor for the charity situation previously mentioned). Our multiple loop calculation capabilities have been patterned after, or use, the functions users are familiar with to eliminate barriers to usage.

To further reduce the barrier to usage for our user specified combination functions, we have added intelligent help hints. These hints dynamically adjust the syntax in the hint to match the differences in capabilities of the different functions inputted. As appropriate, our dynamic function syntax will adjust the availability of other outputs and ranking selections, so users know when those options are available.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 through FIG. 3 examples how a typically skilled spreadsheet user, who like many users does not know how to create a Pivot Table, might solve the charity volunteer's problem in their Microsoft Excel spreadsheet.

FIG. 4 through FIG. 6 examples how a Pivot table knowledgeable user could do the charity volunteer's calculation in Microsoft Excel.

FIG. 9 examples our technology solving the problem executed in Microsoft Excel in FIG. 1 through FIG. 3 and FIG. 4 through FIG. 6.

FIG. 10 and FIG. 11 example the mechanics automatically done by the predefined combination function in FIG. 9.

FIG. 12A and FIG. 12B examples the results of populating a number of cells with different outputs and ranks for a MAX_SUM function.

FIG. 13 examples the three different groupings for our combination functions as determined by the last function evaluated.

FIG. 14 through FIG. 17 examples, using in-cell formulaic data, one of our predefined combination functions (MEDIAN_MAX) which has other outputs but no other ranks.

FIG. 21A and FIG. 21B example our user defined combination function (e.g., COMBO) using our Non-spreadsheet Cell (NSC) formulaic data.

FIG. 22A through FIG. 23D example our dynamic hint modification for user defined combination functions.

FIG. 27 and FIG. 28 example the seven steps automatically done by the user defined combination function in FIG. 26.

FIG. 29 through FIG. 31 examples our user defined combination function (e.g., COMBO_L) which handles repetitive function calculations employing loop equivalent values and non-loop equivalent values.

FIG. 32 examples a third ranked other output for one of our user defined combination functions (e.g., COMBO_L) which handles repetitive function calculations employing loop equivalent values and non-loop equivalent values.

FIG. 33A and FIG. 33B example the formula differences in copying and pasting a combination function which has other outputs and other ranks (for both predefined and user defined combination functions).

FIG. 36A through FIG. 37B examples our special copy and paste for a predefined combination function which has other outputs and other ranks copying in a reverse column manner.

FIG. 38A through FIG. 39B examples our special copy and paste for a user defined combination function which has other outputs and other ranks copying in a reverse row manner.

FIG. 40 depicts an example computer system that can be used to implement aspects of the technology disclosed.

DETAILED DESCRIPTION

Figures 7A, 7B:
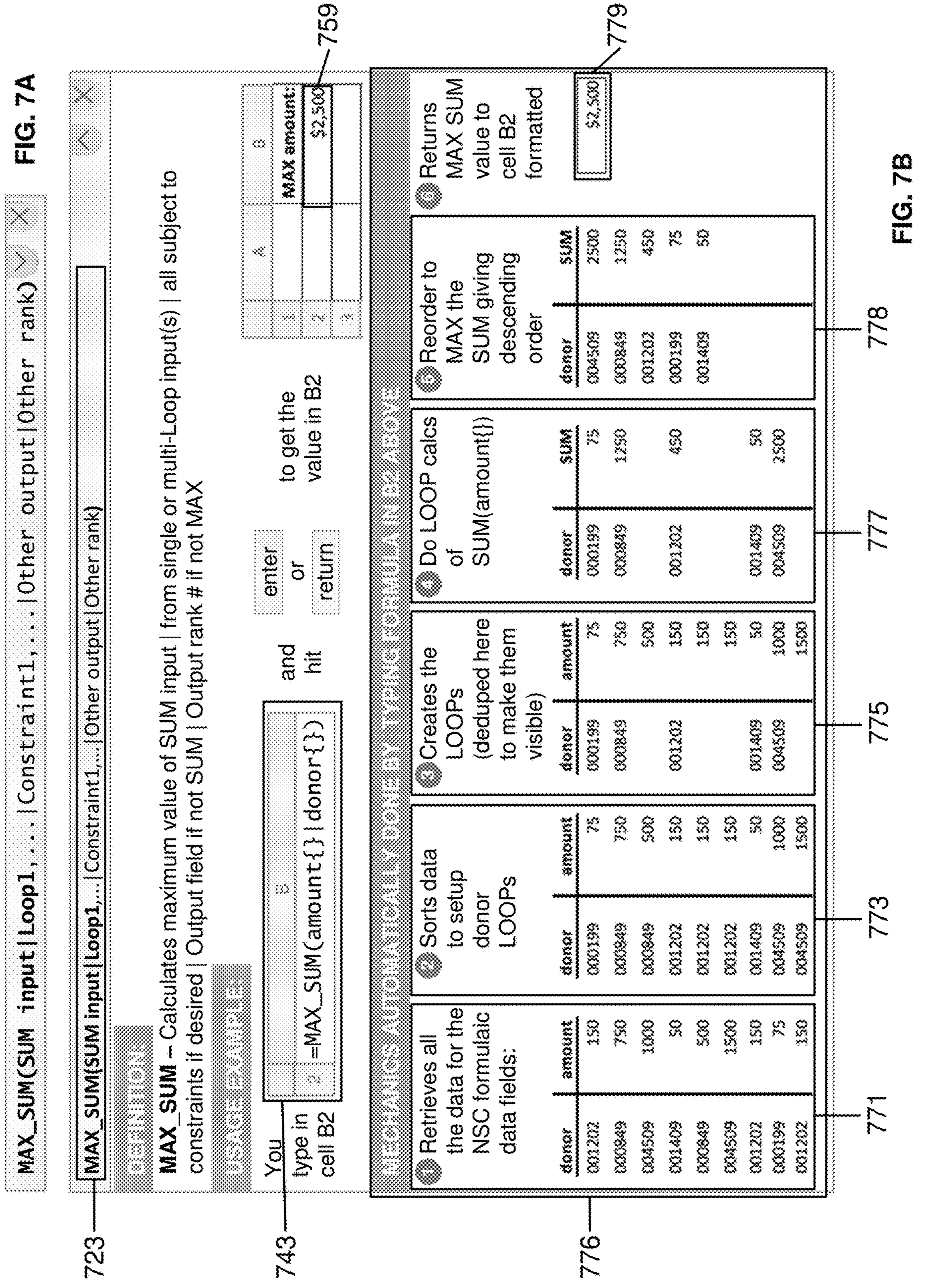
FIG. 7A and FIG. 7B examples our predefined combination function (MAX_SUM) capability and help prompts using our Non-spreadsheet Cell (NSC) formulaic data.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers, and others have increased the breadth of capabilities and usefulness of spreadsheets. Spreadsheet applications now access data across a wide variety of sources including relational, structured and semi-structured, open data protocol (OData), Web and Hadoop databases among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With all the added capabilities, spreadsheet applications have become substantially more complicated. The data manipulation and embedded programming language capabilities can be powerful but are complicated to learn and therefore they are used by a very small fraction of the spreadsheet application user base. There are other advanced capabilities including Pivot Tables, Power Pivot and Power Query that allow users to manipulate data in spreadsheet overlays and processes from which formulas and cells can be extracted by further capabilities such as Cube Functions (e.g., for Pivot Tables). These capabilities require users to learn interfaces that are very different from formulas embedded in cells, and to learn operations that function very separately from their regular cell activities. As such, only a fraction of users knows these capabilities. All this complexity has led to over a hundred books and thousands of online videos that have been published to help users understand the capabilities of Excel alone.

Spreadsheet providers like Microsoft Excel and Google Sheets cater to the specialized needs of users through many capabilities including vast numbers of spreadsheet functions (e.g., built in predefined formulas including SUM, COUNT and MIN). Microsoft Excel includes more than four hundred and fifty built-in functions and Google Sheets over four hundred. These built-in functions make operations desired by users dramatically simpler and are used by virtually every user.

The so-called formulaically defined non-spreadsheet cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The technology disclosed allows users to do predefined or user defined evaluations of looped calculations within their regular spreadsheet cells employing a new family of spreadsheet functions. In particular, it allows users to employ familiar range functions (e.g., SUM, COUNT, MIN, MAX and AVERAGE) or more advanced statistical functions (e.g., STDEV, PERCENTILE, or T.DIST) in the equivalent of programming loops for distinct or unique values of a data field to solve problems. These looped calculations are then evaluated by a second range or array function to arrive at the value returned to the spreadsheet cell. (For usage of range or array, see Yundt (2019) Quora thread and comments, What's the difference between array and range in Excel? <available at https://www.quora.com/Whats-the-difference-between-array-and-range-in-Excel>.) This combination of two functions and looped (repetitive) calculations give regular spreadsheet users multiple loop programming capabilities without the need to learn the embedded programming language (e.g., Visual Basic for Applications in Microsoft Excel and Apps Scripts in Google Sheets) and write code. The combination function is in a spreadsheet cell as a formula, rather than in a side panel as in prior art pivot tables.

Before we describe the capabilities of our new family of predefined and user defined combo functions, we will review the limitations of the current spreadsheets in solving these types of problems.

Current Spreadsheet Limitations

Because Microsoft Excel has the broadest capabilities of the available spreadsheets, we will example user activities with it. Google Sheets and many of the other available spreadsheets have subsets of the Functions and Pivot Tables table capabilities available within Microsoft Excel.

We will example a simple situation of a small charity volunteer who wants to know how much was donated in their best region and district in February 2019. Because districts get different numbers of donations this requires the equivalent of looped SUMs for donation total amount in each region district combination. We will first example this for a user who like a large fraction of spreadsheet users does not know Pivot Tables (a partial loop capability) and does not know how to program in the embedded programming language (VBA). Then we will then example how a user who knows Pivot tables but not the embedded programming language would solve the problem. In both cases we will see that the users' activities take many steps and require substantial additional work to replicate the calculations for the next month. Learning and writing VBA code is well beyond the capabilities of most spreadsheet users and not the simple process required by the regular users we are looking to support with our new family of functions.

FIG. 1 through FIG. 3 examples how a typically skilled spreadsheet user, who like many users does not know how to create a Pivot Table, might solve the charity volunteer's problem in their Excel spreadsheet. They example the sixteen steps taken by the user. Steps one to three, shown in FIG. 1, are about getting the data from their Information Technology (IT) organization and importing it into their Excel spreadsheet. That data includes data from December 2018 onward and so in steps four through six they put the data where they want it, date sort it and then filter out (eliminating) data before 2019. Then in step seven the user resorts the data by 'region; and 'district' to set up the equivalent of loop groupings of the data for distinct or unique values of the data field.

In FIG. 2 steps eight through fourteen the user SUMs the donation 'amount' for each of the 'region; and 'district' groupings (loop equivalents). This requires a step per grouping (loop) because, like many data sets, there are varying number of data points per each combination (e.g., 'Central 1' has five data point 263, while 'East 1' has four 273). Therefore, the user cannot apply one standard SUM and copy it down the list of combinations but instead has to match the length of the SUM to the number of data points for each 'region' and 'district' grouping (loop). In this application, we use loop equivalents to refer to the equivalent of iterating over values obtained from evaluating a cell range or array or over values obtained from evaluating non-cell data retrieved from an external source. Each value obtained from the evaluating, such as a group sum, is processed in a step or loop.

In FIG. 3 step fifteen, having completed all the SUMs, the user creates a MAX function formula evaluating all of the SUM values. In step sixteen, they then either copy or reference the MAX value into the cell where they want to display the value 375. This process required many steps and had their data set been larger becomes undoable (because there is one step required for each repetitive SUM). Also, should the desired date range change they have to almost start over redoing the work to get the new answer. Consider instead if the charity volunteer is at a much larger charity and has ten years of data with over 50 million rows of donations from over 4 million donors and wants to know how much was given by the biggest donor over the last ten years. That would involve over 4 million loops each requiring a step, which clearly is not doable and would force the user to ask someone else (e.g. IT) to do the calculations. Any or all of these scenarios beg for a much simpler way to solve these types of problems.

This example demonstrates a problem with existing electronic spreadsheets, which are not user friendly when the task involves looping or iteration over data. To solve the simple problem above, a user must master an extended sequence of complex and arbitrary operations. Complex menu systems and formula builders complicate the task, more than simplifying the task. The burden of automating such tasks leads users to the arcane, largely manual process described above. The extended sequence of steps makes it difficult to review and edit the resulting formula. This is particularly true when data is obtained from an outside source, instead of cells within the spreadsheet that a user can eyeball. Evaluation of data from outside sources further increases the complexity of building and debugging tasks that involve looping or iteration over data. This problem is more acute when the task is more complex, as in examples that follow.

FIG. 4 through FIG. 6 examples how a Pivot table knowledgeable user could do the charity volunteer's calculation. They example the seventeen steps taken by the user. FIG. 4 starts with the same four steps as the previous example of acquiring and locating the data. Steps five through eleven are setting up that data in Pivot Table 484. FIG. 5 then shows step twelve where the user deselects (filters) the unwanted data from 2018 to leave just the values in 2019. This has now executed the 'region; and 'district' groupings (loop equivalents) and the SUM evaluation of for each grouping. At this point in step thirteen for a small data set the user can visually select the desired value. Although for larger data sets or where the desired result is the fourth largest value, rather than the largest value, the user needs to sort the data. Unfortunately, there is no way to then sort within the Pivot Table across those different groupings (loops) and therefore to sort or MAX evaluate the different grouping SUM values requires a set of steps removing the subtotals. This is done in steps thirteen through fifteen continuing on in FIG. 6. At this point the user writes the MAX evaluation to get the value 658 and then in the final step seventeen the user copies or references the desired value to the cell of their choice 675. For a small data set like this, the Pivot Table approach takes the same or possibly slightly more steps but unlike the previous process it does not scale up in number of steps with the number of groupings until you hit the limits of the spreadsheet size. But seventeen steps and the requirement to know and understand Pivot Tables gives lots of room for improvement. And certainly, in the example of the larger charity, with the fifty million donations and over four million donors, the conventional spreadsheet is not the answer. So, let us now contrast the previous examples with our function approach to get the same outcome, where the only activity required by the user is to write the following formula using one of our new functions:

```
=MAX_SUM(region{          },district{          }
    |amount{ }|date{>='2/1/19'})
```

Realizing the MAX_SUM function will have spreadsheet prompts to help the user find the function and fill it in (examples to follow). Our approach replaces the multi-step complicated operations exampled with a familiar one for another function.

Before we disclose how our technology handles multiple loop operations with data constraints (filters), we will disclose how it works for a simple example that reveals what the function is automatically doing. Throughout the application, we refer to constraints, which are filters or specify filtering. The constraints sometimes can be implemented as data selection parameters of the user specified formulaic data description terms. Examples of data selection parameters used in the examples that vary the data selected at input are !JOIN and !ALL.

Predefined Combination Functions

FIG. 7A and FIG. 7B example one embodiment of the help prompts for a simple version of our predefined combination function 'MAX_SUM'. FIG. 7A examples our new function hint in the minimalistic style of Microsoft Excel. Our technology, as shown in FIG. 7B, also gives the user a more robust helpful hint of what the function does and examples its use in a fashion that improves on even Google Sheets. In this embodiment, the syntax 723 of the function is laid out and visible in both hint forms with the required inputs bolded. The user is therefore required to have one SUM input and at least one Loop input from a distinct or unique values of the data field. The function is named MAX_SUM where MAX is the final evaluation of the SUM input evaluated for each loop. The example formula 743 has only those bolded requirements in the syntax and when the user completes their one step process of writing the formula and hits ENTER (PC) or RETURN (Mac), they get the output 759 shown in cell 'B2'. This function formula has automatically done the six steps 776, which are illustratively exposed here so the user understands what is done by the technology disclosed.

In the example in FIG. 7B, the user has written the formula with our Non-spreadsheet Cell (NSC) formulaic data. The automatically done steps start with step one 771 retrieving the data from the external data using our Non-spreadsheet Cell (NSC) formulaic data fields and in step two 773 sorts the data by the 'donor' (Loop 1 input) value. Step three 775 visually prepares the five 'donor' value LOOPs and step four 777 does the SUM of the 'amount{ }' values for each value of 'donor' (i.e., donor loop). Step five 778 then orders the data based on the SUM values starting with the MAX value and then descending. This step may look unnecessary, but its value will become apparent when the output selected is not the MAX value (e.g., the second or third MAX value). Step six then returns the MAX value of the SUMs '$2,500' 779 to cell 'B2' 759 formatted as is the cell in dollars. All this was accomplished by that one simple formula 743 and had there been fifty million donations and four million donors the formula would be exactly the same and our technology would have executed four million loops.

Figure 8:
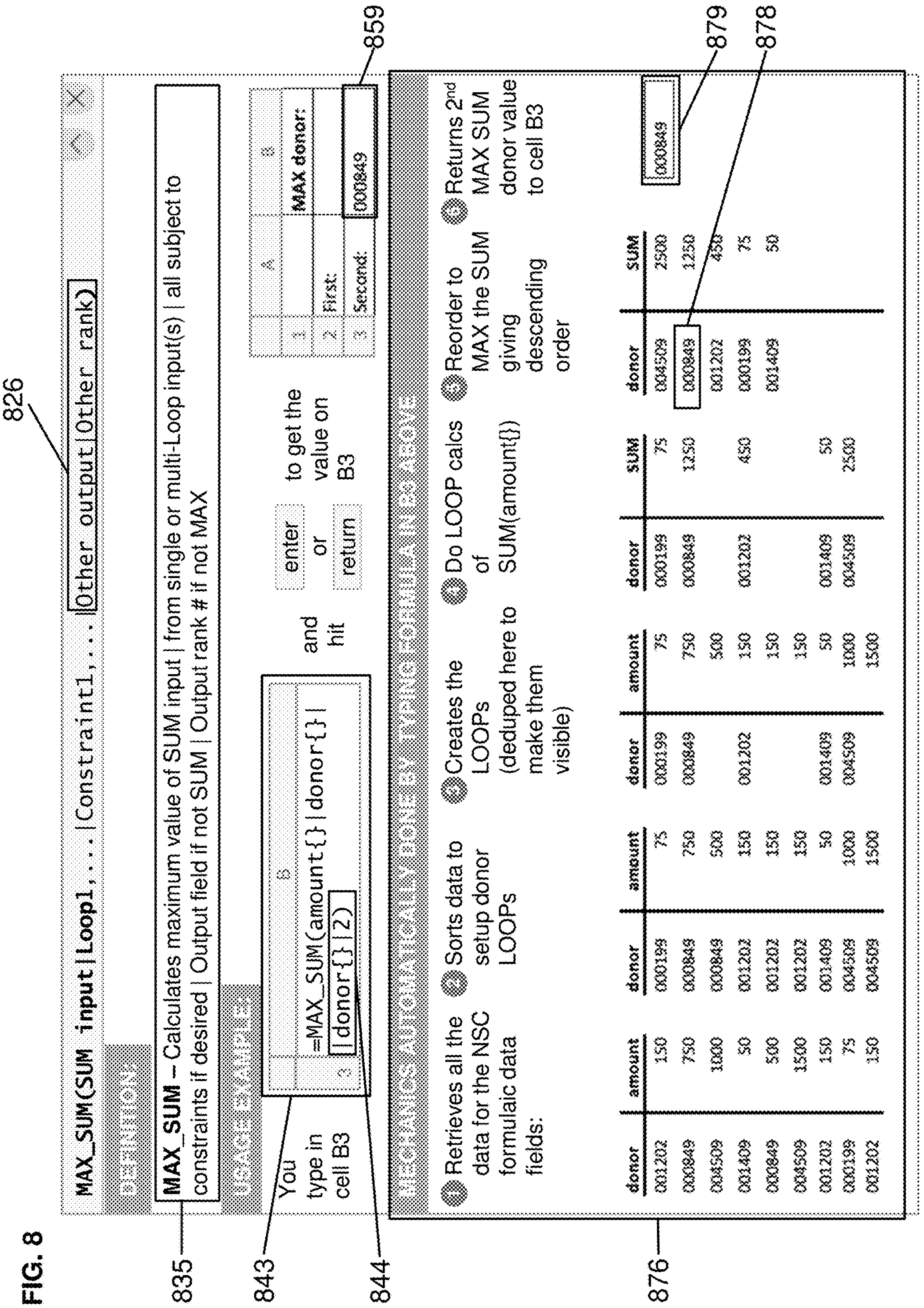
FIG. 8 examples our predefined combination function (MAX_SUM) other output and other rank output.
Figure 14:
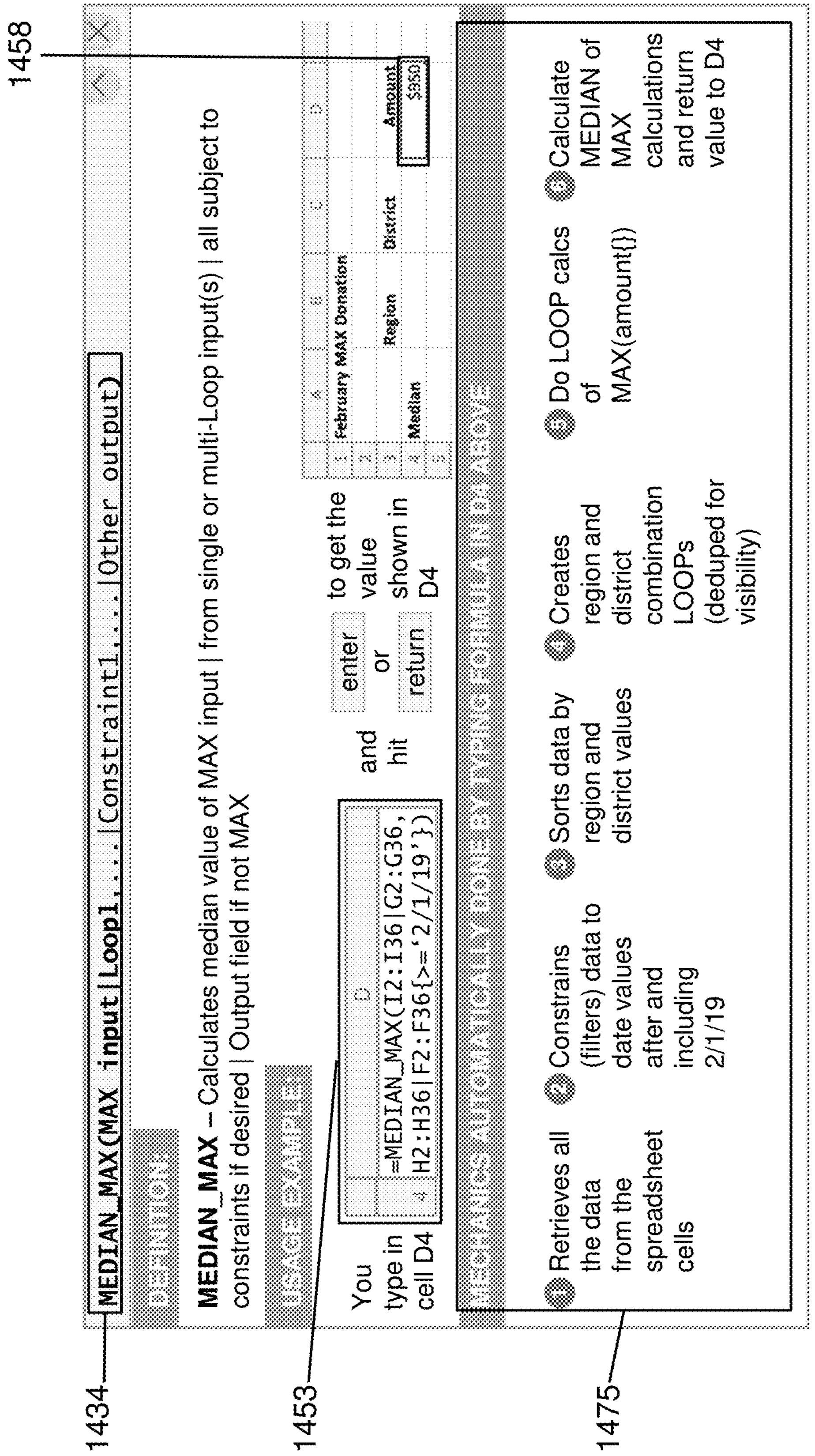
Figure 15:
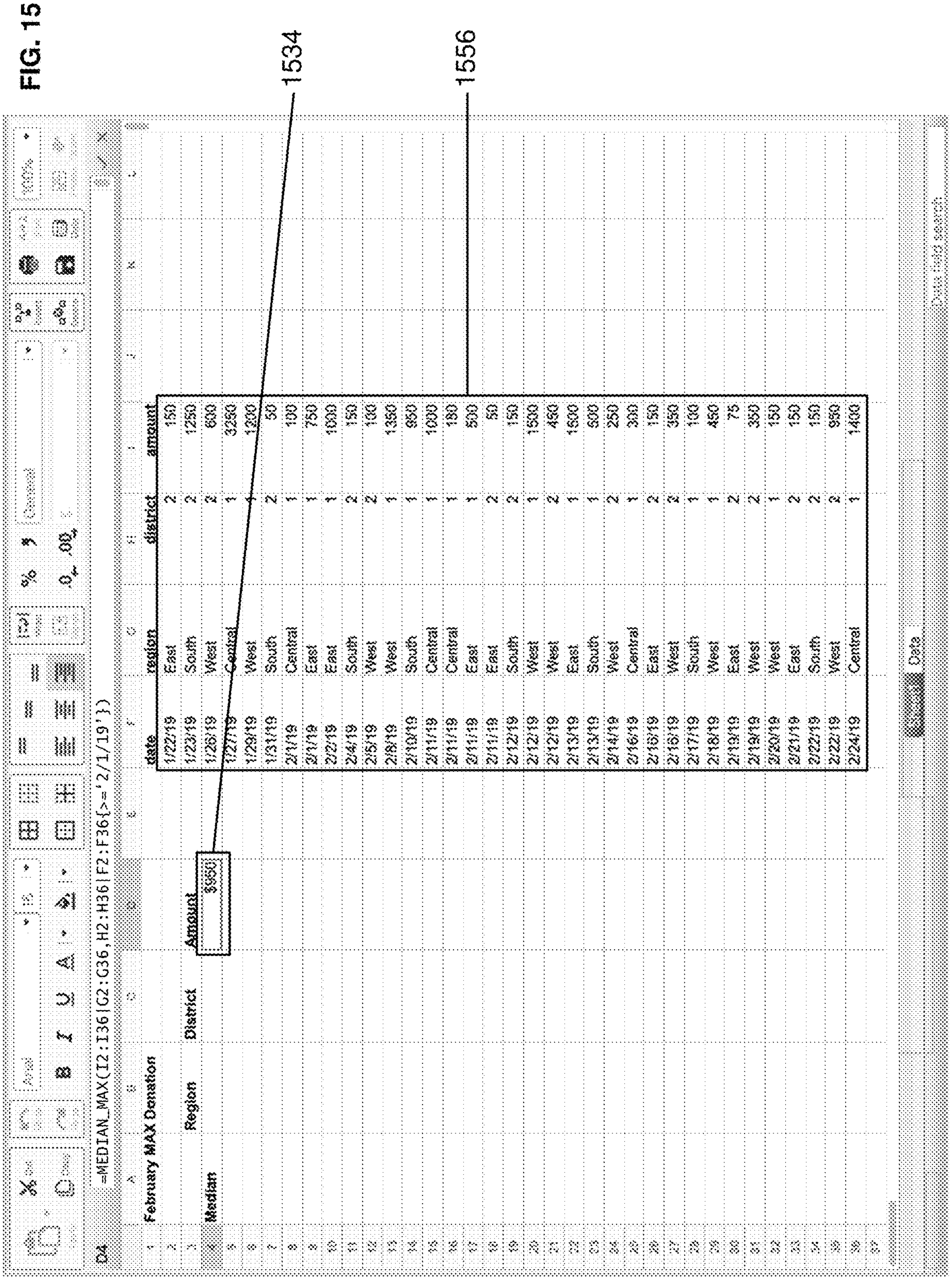

FIG. 8 examples that MAX_SUM setting when the output is not the SUM and the Rank is not the MAX. These options are identified in the function syntax 'Other output|Other rank' 826 and described in the last two sections of the function definition 835. They are specified by the '|donor{ }|2' 844 in the function formula written by the user in cell 'B3' 843. Where instead of solving for the MAX SUM value the user wants the donor value for second largest SUM of amount{ }—or in simpler terms the donor (number) for the second largest donor. This formula executes the same automatic steps 876 as those in FIG. 7B 776 up to the sixth step where instead of returning the MAX of the SUMs the app returns the 'donor' value '000849' 879 for the second SUM value 878 to cell 'B3' 859. This allows the user to easily get not only the MAX SUM but whatever loop value is related to that value (in this example only the one 'donor') and to get whatever rank is desired (in this example '2'). Thereby making it easy for users to get more information and easily organize it as they would like.

FIG. 9 examples our technology solving the problem executed in Excel in FIG. 1 through FIG. 6. Instead of the sixteen (FIG. 1 through FIG. 3) or seventeen (FIG. 4 through FIG. 6) steps required in Excel, our technology accomplishes the same outcome in one step of writing the formula 943. And as we will example later if the user wants to change the date constraint for the analysis it is as simple as inputting a new value with no replication of any steps. Also, as we have mentioned, the user will have a syntax and example help prompt to make filling out the function formula easy with no hunting for information or need to remember what to do and how to do it. Our technology automates the process so that more complicated compound loops, in this example 'region{ },district{ }' 944, and constraints (filters), in this example 'date{>='2/1/19'}' 952, are automatically handled with no added complexity for the user other than writing them into the formula 943. The result is then generated in the cell 'D4' 948 by the automatic steps 965, the detail of which is exampled in FIG. 10 and FIG. 11.

FIG. 12A and FIG. 12B examples the results of populating a number of cells with different outputs and ranks for a MAX_SUM function. FIG. 12A examples the formulas 1235 for the corresponding cells holding the values 1275 in FIG. 12B. The user has constructed a table of the 'Region', 'District' and calculated 'Amount' starting with the 'Best' donor, then the '2$^{nd}$ Best' and finally the '3$^{rd}$ Best. The values 1275 can be seen in the calculation in FIG. 11 1138. As we will discuss later, our technology supports a specialized version of copy and paste which makes it easy for users to generate as complete a set of output and ranked values as the user desires for those functions which have those variants or other variants. This then brings us to the different groupings of functions with different sets of capabilities.

FIG. 13 examples the three different groupings of multi-value evaluation functions (range or array processing functions) for purposes of our technology. Which grouping a combination function resides in is driven by the last function evaluated. So, in the MAX_SUM example it is the MAX that determines which grouping the combination function falls into. 'MAX', 'MIN' and 'MODE' 1323 are in the grouping which has both other values and other ranks—as was exampled in FIG. 12, As we will example next, 'MEDIAN', 'LARGE' and 'SMALL' 1343 have other values the user may want to display but do not have other rankings of the value. The largest group of functions 1374 has no other output or ranking options. This is best explained by an example of say the AVERAGE function evaluating a list of donors and their total donations—the AVERAGE is a mathematical value probably not matching any individual donor, so there is no related donor (number) and there are no other ranks (no second average and so on). Thus, for this group of functions there is only the one value output and no other outputs and ranks.

FIG. 14 through FIG. 17 examples our MEDIAN_MAX function which gives the user the option to output the MEDIAN value or the loop input or inputs for the MEDIAN value but as identified in FIG. 13 there is no rank option. This is because the MEDIAN value does not have rankings like the second largest median value as does MAX. That difference is reflected in the function syntax 1434 which includes the optional input of 'Other output' but has no input for rank. In this example the user writes the formula in cell 'D4' 1453 which automatically executes the six steps outlined in 1475 using the data in the spreadsheet cells shown in FIG. 15. Those six steps are detailed in FIG. 16 and FIG. 17. The first step 1652 retrieves all the data from the spreadsheet cells 1556 (in FIG. 15). The second step 1655 constrains (filters) the data to dates on or after '2/1/19' using the values in cells 'F2:F36' 1654. Step three 1648 then sorts the remaining data by the distinct or unique values 'region' and 'district' to set up the Loop equivalents in step five 1752 (in FIG. 17). Step six 1755 then does the MAX calculation for each loop and step seven 1728 then does the MEDIAN calculation of all the MAX calculated values before returning that value '$950' 1738 to cell 'D4' 1458 (in FIG. 14) in the calculation example and 'D4' 1534 in the actual spreadsheet (in FIG. 15). Our technology seamlessly handles these calculations using spreadsheet cell data or Non-spreadsheet Cell (NSC) data with our new functions using the exact same syntax 1434 for either data source. However, there is an added requirement for this grouping of functions 1343 (in FIG. 13) which can have more than one other output value in a cell as is exampled next. That capability, to hold more than one value in a single cell, uses a capability introduced in one of our referenced patent filings.

Figure 18:
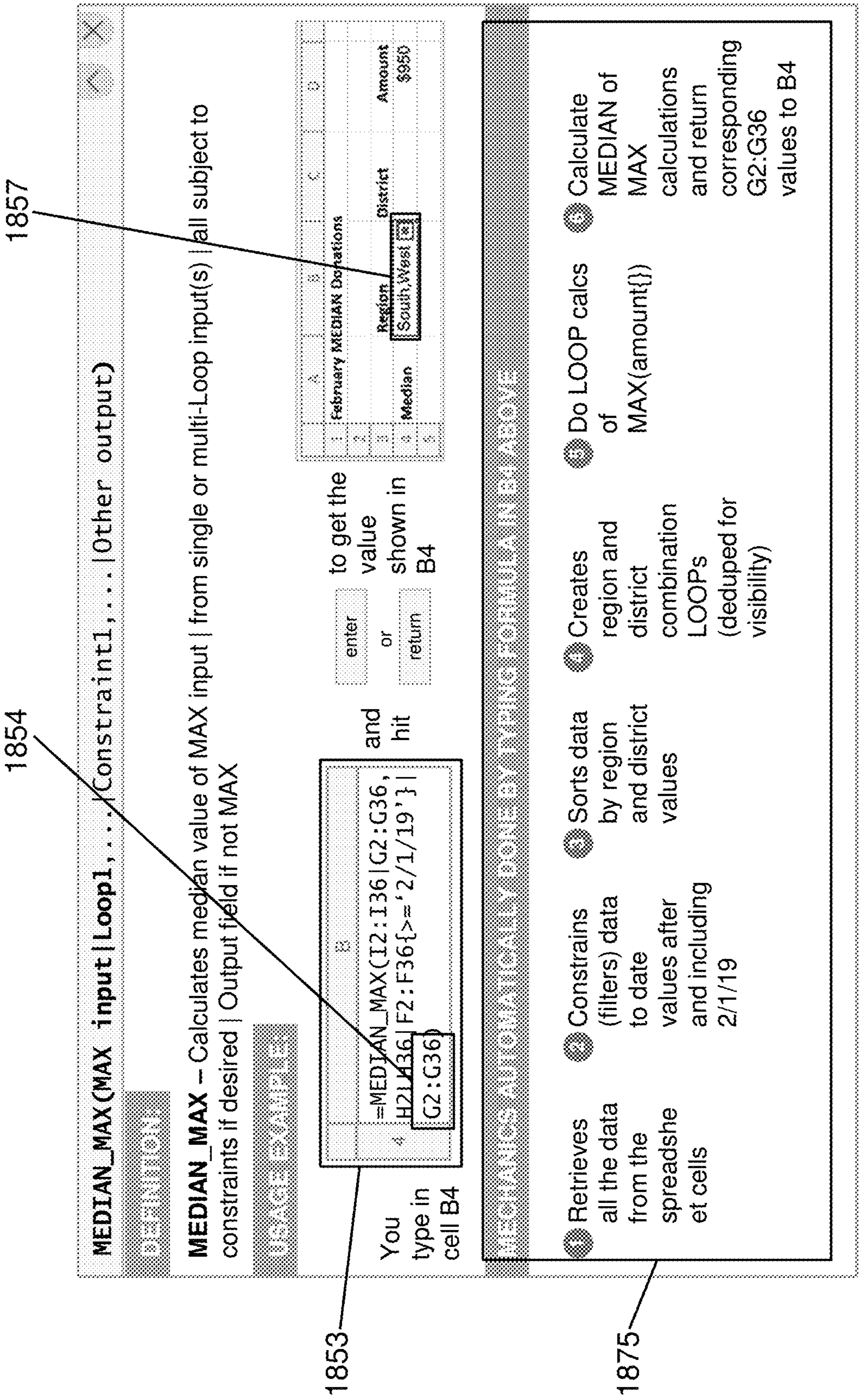
FIG. 18 examples our predefined combination MEDIAN MAX function outputting multiple other output values in a single cell.

FIG. 18 examples our MEDIAN MAX function outputting multiple other output values in a single spreadsheet cell. The user writes the formula in 'B4' 1853 specifying an 'Other Output' 'G2:G36' 1854. That automatically triggers the same steps 1875 as executed in FIG. 14 through FIG. 17 until the last step number six where instead of returning the MEDIAN value of the MAX calculations the function returns the corresponding value or in this example values in the cells 'G2:G36'. It so happens that instead of a single MEDIAN value with one corresponding other value there are two corresponding other values 1857. That is not a problem for our technology because we have a previously disclosed in another application technology for holding more than one value in a single spreadsheet cell. So, our technology outputs the two values 'South' and 'West' 1768 (shown in FIG. 17) to the cell 'B4' 1857 with a button that in this embodiment indicates there are multiple values in the cell and allows the user to open the cell to potentially get further information or in the case of all the values not being visible see all the values.

Figure 19A:
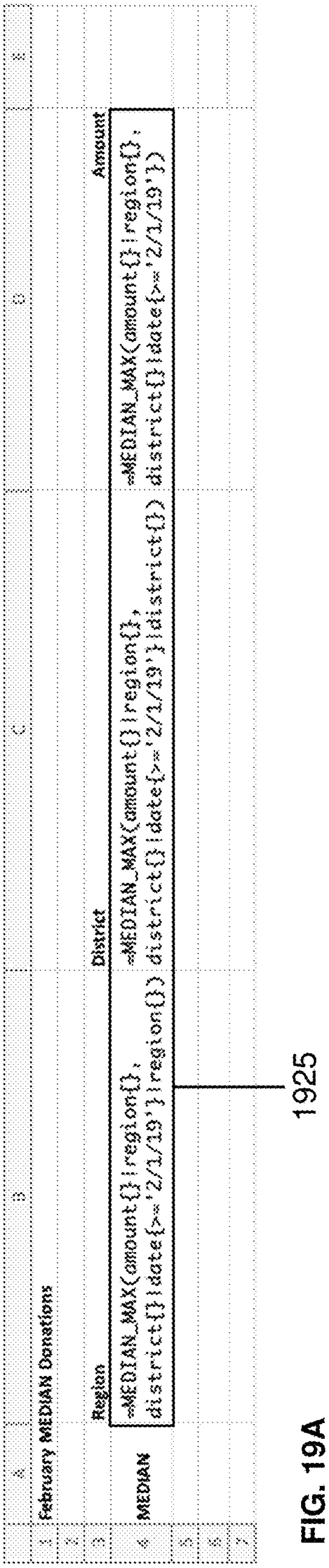
FIG. 19A through FIG. 19D further examples our combination function multiple value outputs and display types.
Figure 19B:
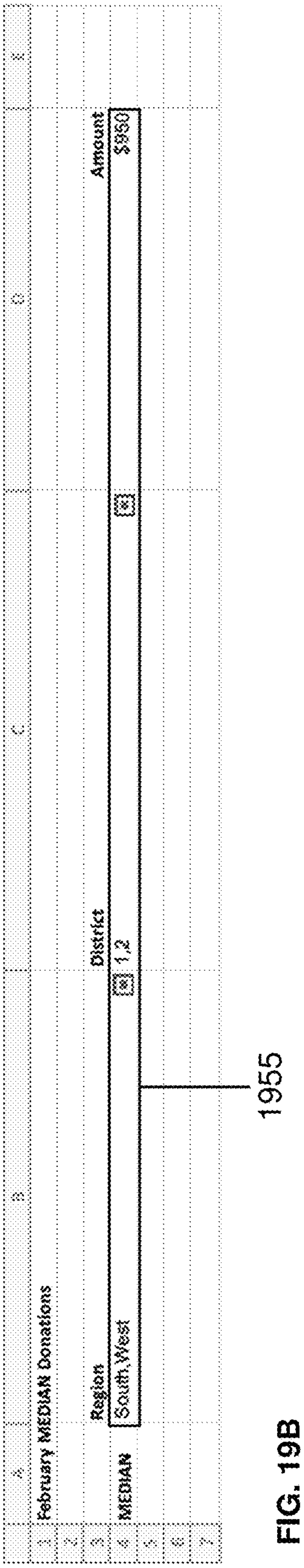
Figure 19C:
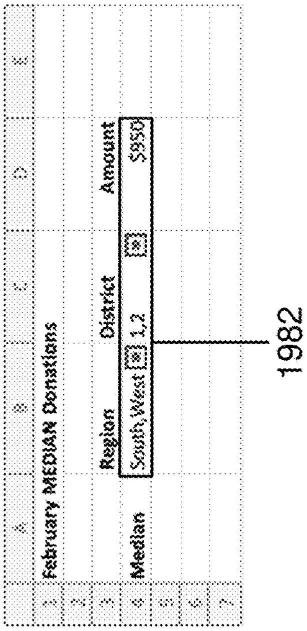

FIG. 19A through FIG. 19D further examples the different MEDIAN_MAX outputs and different multiple values in a cell drop-down. FIG. 19A examples the formulas 1925 for the range of different outputs for this example, namely the 'Region', 'District' and 'Amount' for the MEDIAN_MAX. FIG. 19B shows the resulting values 1955 for each of those formulas 1925 and FIG. 19C shows those results 1982 in a more normal cell width. Then FIG. 19D examples one embodiment of the multi-value drop-down 1985 triggered by clicking on the button 1986. This embodiment shows the values and would be useful in settings where there are more values than can be seen in the width of the cell. Other embodiments of these multiple cells can be in pop-ups or other visuals and use different buttons or other trigger modes. In this embodiment the square button indicates to the user that they cannot select a different value in the cell but to change the value must change the formula in the cell using previously disclosed technology. This allows users to calculate and display analytics in regular spreadsheet cells for combinations of outcomes that mix results and other results which vary in their respective number of values as shown in FIG. 19C 1982. It allows users to do complicated looped calculations yielding complicated mixes of outcomes by simply writing functional formulas, or as we will later show writing one functional formula and copy pasting it to get the other values.

Figure 20:
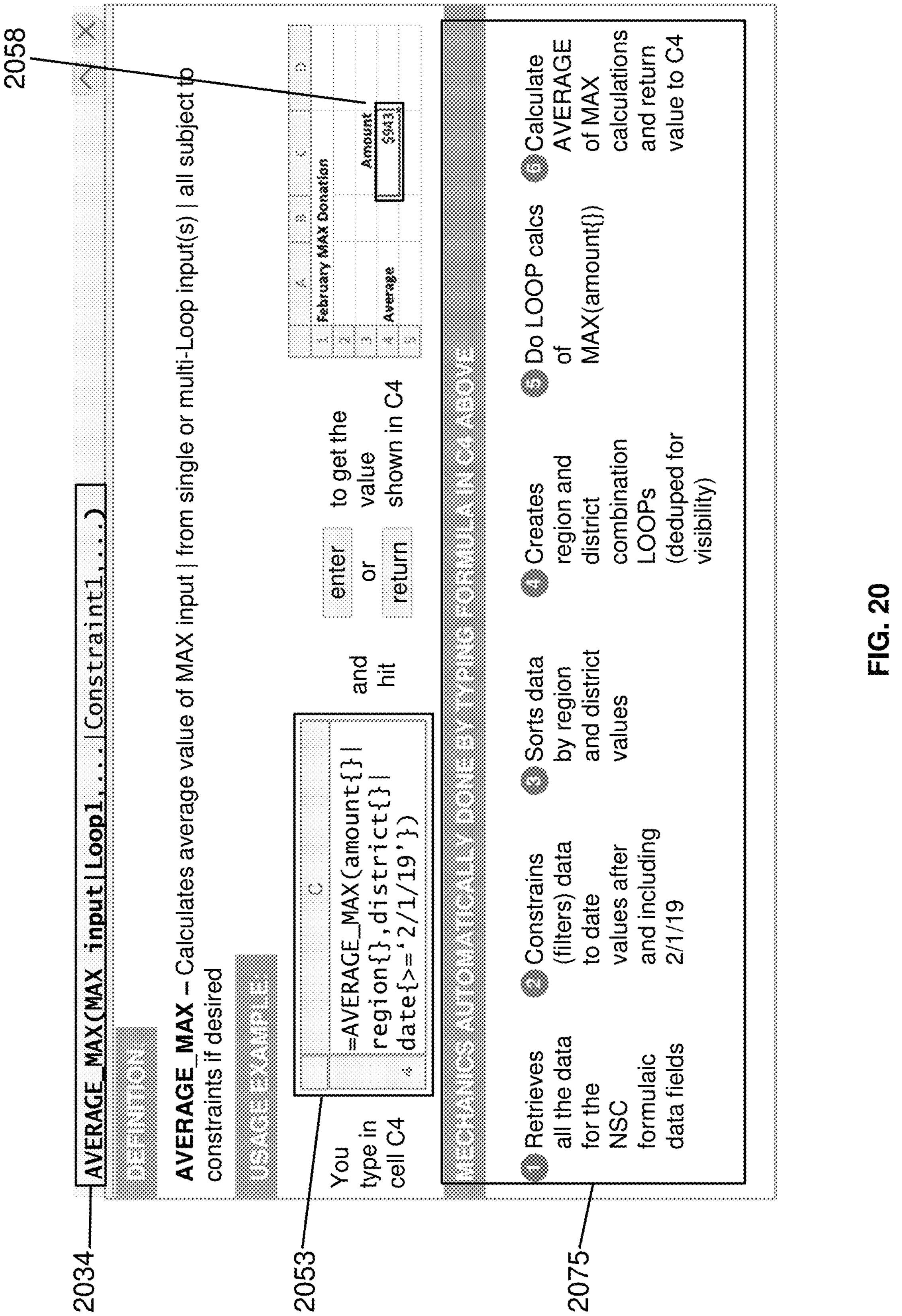
FIG. 20 examples one of our new predefined combination functions in the third and largest group of combination functions which has no other outputs or other ranks.

FIG. 20 examples one of our new functions in the third and largest group of functions 1374 in FIG. 13 for which there are no other value(s) or other rank option(s). These functions generate the single value as seen in the syntax 2034 of the 'AVERAGE MAX' function which has only the ability to constrain (filter) the values as an option (i.e., no other output or other rank options). In this example the formula written by the user in cell 'C4' 2053 automatically executes a similar set of six steps returning the AVERAGE of the loop calculated MAX values as shown in FIG. 17

1788. As you can see in FIG. 17 the average value '$943' 1788 does not match any of the MAX calculated loop values 1778 and therefore there is no possibility of another output and no possibility of doing rankings. However, as shown with all of these capabilities we have made what would have been a complicated set of activities in a conventional spreadsheet as simple as writing one functional formula in our technology. An advantage of a predefined combination function is the inputs are well defined and therefore easy for a user to follow the short version syntax prompt or the longer form syntax and example prompt (hint). The one negative that you can see on FIG. 13 is there is a very large number of possible combinations and many of those combinations will never be used by the average user. The solution to this is to give users the predefined combinations that they want and then give the more advanced users a capability to create the other combinations they desire through user specified combination functions.

User Specified Combination Functions

FIG. 21A and FIG. 21B example one embodiment of a user defined combination function where the user defines which two of the range or array handling (multi-value handling) functions they combine. FIG. 21A examples the helpful hint in the minimalistic style of Microsoft Excel giving the user only the syntax for the filling out the function. Our technology, as shown in FIG. 21B, also gives the user a more robust description of what the function does and examples its use more like what is found as an option in Google Sheets. In this embodiment, the syntax 2123 of the function is laid out and visible in both the short and long form prompts (hints) with the required inputs bolded. The longer form hint also lays out a 'Definition' of the function 2135 intended to help a user decide how to fill it out. The first input in the function as shown in the example in cell 'B2' 2143 is the final function to be evaluated, in this example 'MAX' 2153. The second input is the 'Loop function formula', in this example 'SUM(amount{ })' 2154. This is a SUM of the Non-spreadsheet cell (NSC) external data input values of the field 'amount'. And the final input is the Loop 1 value, in this example 'donor{ }' 2155. This is all the values of the NSC external data field 'donor'.

FIG. 21B then examples the six steps 2176 automatically executed by the formula in cell 'B2' 2143 to arrive at the value '$2,500' 2159. Step one 2171 retrieves the NSC data for both data fields 'donor' and 'amount'. Step two 2173 sorts the data to set up the 'donor' loops. Step three 2175 creates the loop equivalents ready for the SUM calculation for each loop in step four 2177. Step five 2178 reorders the calculations to MAX the SUM values from the highest MAX value to the lowest. Then in this example step six 2179 returns the MAX of the SUMs '$2,500' 2179 to cell 'B2' 2159. The steps are clearly the same as the predefined MAX_SUM function exampled in FIG. 7B once the user specifies the equivalent of the same formula. However, the big difference is in this function the user can mix and match any of the range or array handling functions (e.g., FIG. 13) and as we will demonstrate next, write more complicated formulas thus giving a user a much larger range of calculations that they can do.

Figure 22A:
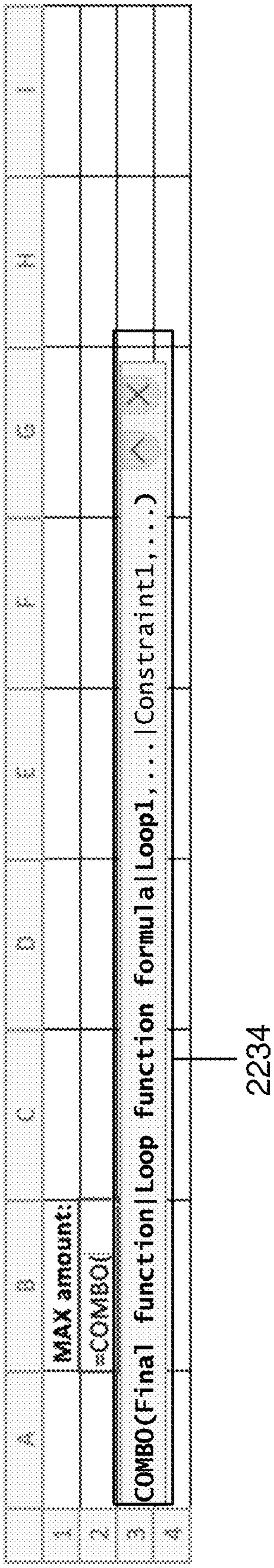
Figure 22B:
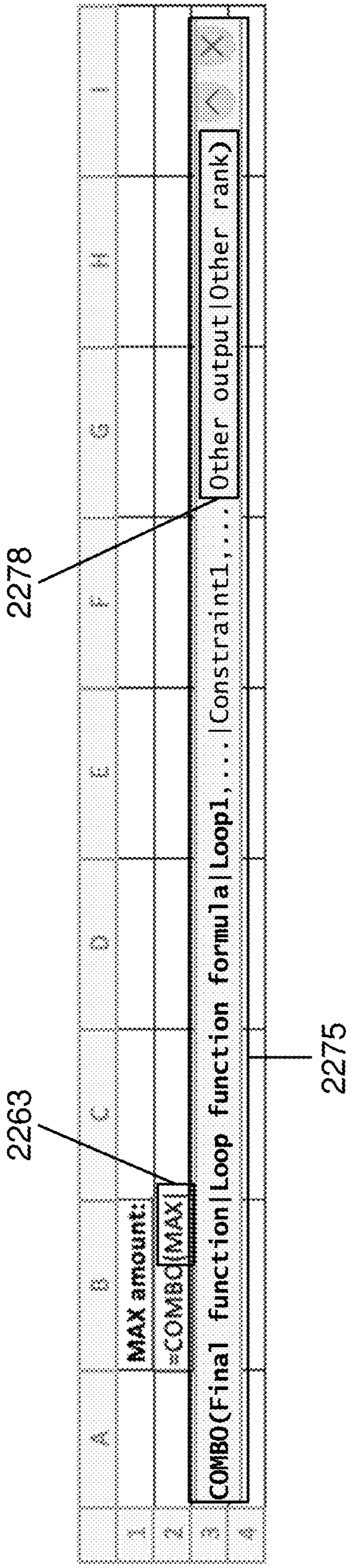

FIG. 22A and FIG. 22B example an additional capability of our technology to help simplify the building of our user defined combination function—namely, the dynamic modification of the helpful hint (prompt) as the user types the formula—or more specifically in this case changing the syntax after the user inputs the 'final function'. As we exampled in FIG. 13 there are three different groupings of functions driven by the nature of the final function. Those which have other outputs and ranks 1323, those that have other outputs 1343 and those that have neither 1374. Since the combination function inputted in FIG. 21A has a final function of 'MAX' it falls into the group having both another input and another rank and therefore to help the user realize this the functional syntax can change as shown in FIG. 22A and FIG. 22B. In this embodiment the syntax starts out as the least common denominator syntax 2234 shown in FIG. 22A. Once the user inputs the 'final function', in this example 'MAX' 2263 in FIG. 22B, the syntax changes to one applicable to that function. In this example the syntax 2275 adds the '|Other output|Other rank' 2278 elements which are applicable to 'MAX'.

Figures 23A, 23B, 23C, 23D:
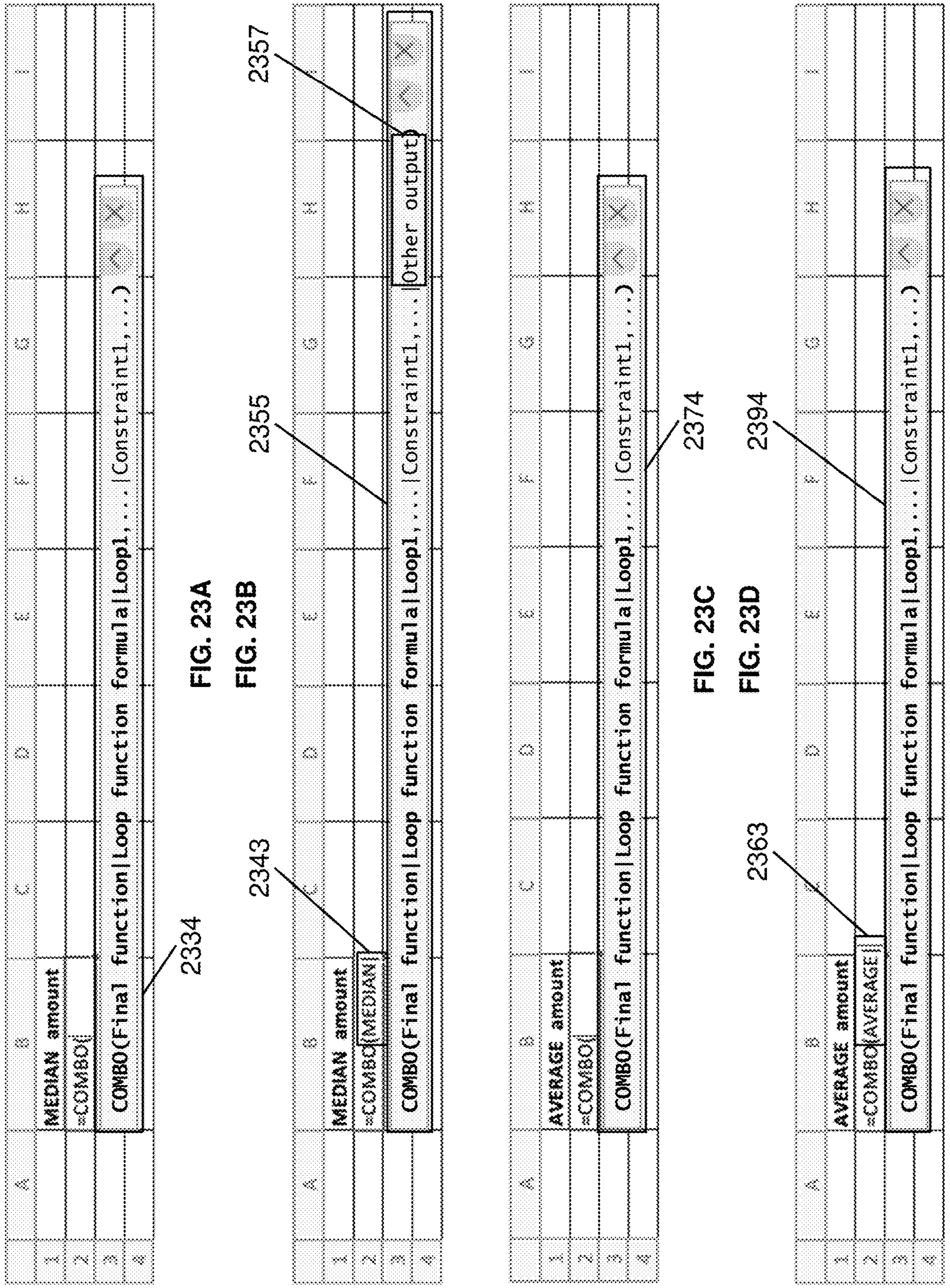

FIG. 23A through FIG. 23D examples the changing (or not changing) of the syntax as would happen for the other two groupings of functions 1343 and 1374 shown in FIG. 13. FIG. 23A examples the lowest common denominator starting syntax 2334 which then in FIG. 23B extends out 2355 adding the element '|Other output' 2357 once the function 'MEDIAN' 2343 is inputted. FIG. 23C examples the lowest common denominator starting syntax 2374 which does not change 2384 once the function 'AVERAGE' 2363 is inputted because 'AVERAGE' falls in the third and largest group of functions 1374 shown in FIG. 13 which has no other output or other rank. Therefore, our technology has automatically informed the user of the correct options for their user specified combination functions.

While FIG. 23A through FIG. 23D examples our dynamically adjusting hint starting with the lowest common denominator syntax (2334, 2374,2394), it could have as easily started with the complete syntax (2275) and removed the elements of the 'Other output' and/or 'Other rank' after the user inputted a function using less elements.

Figure 24:
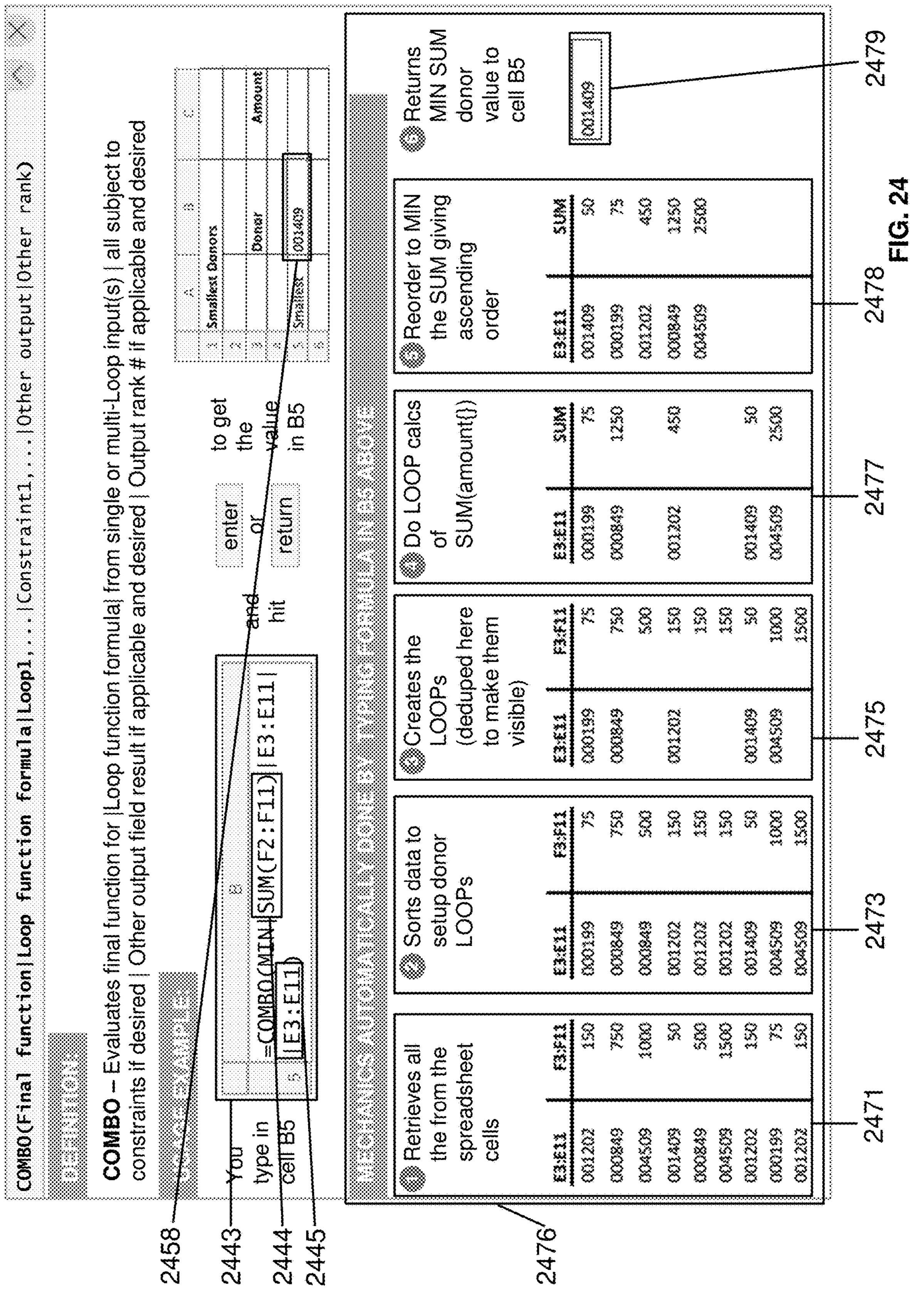
FIG. 24 and FIG. 25 examples our user defined combination function (e.g., COMBO) other output using cell data ranges.

FIG. 24 examples a user employing spreadsheet cell data for our user specified combination function and specifying an 'Other output'. The user wrote a COMBO function in cell 'B5' 2443, that included another output of '|E3:E11' 2445, which automatically executes the six steps 2476. Step one 2471 retrieves the data from the spreadsheet cells 2577 shown in FIG. 25. Step two 2473 sorts the data by the 'E3:E11' (Loop 1 input) values. Step three 2475 visually prepares the five 'E3:E11' value LOOPs and step four 2477 does the looped SUM of the 'F3:F11' values for each unique (distinct) value of 'E3:E11'. Step five 2478 then orders the data based on the SUM values starting with the MIN value which was specified by the user in the formula and given it is the MIN function sorts ascending. Step six then returns the user specified Other output 'E3:E11" MIN value 2479 to cell 'B5' 2458, 2577 (in FIG. 25).

Figure 26:
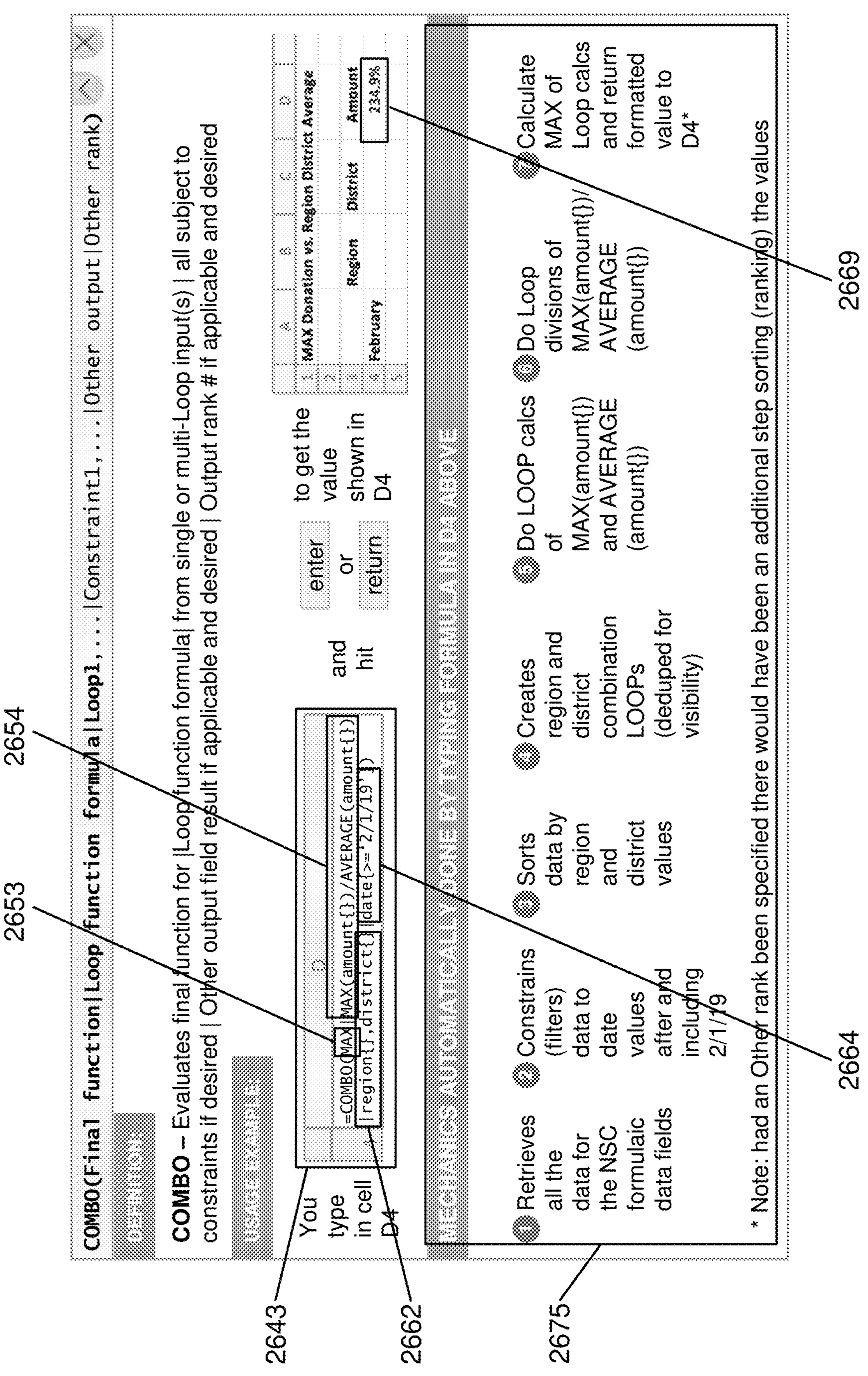
FIG. 26 examples a user defined combination function employing more than two functions and a constraint (filter).

FIG. 26 examples a user defined combination function employing more than two functions and a constraint (filter). The user writes a formula in cell 'D4' 2643 which specifies 'MAX' 2653 as the 'Final function' and 'MAX(amount{ })/AVERAGE(amount{ })' 2654 as the 'Loop formula function' thereby using two functions in that formula and three functions combined overall. The formula also uses a two-input loop of 'region{ },district{ }' 2662 and a constraint (filter) of 'date{>='2/1/19}' 2664. All of this is this is then automatically executed by the seven steps 2675 to return the value '234.9%' in cell 'D4' 2669.

Figure 28:
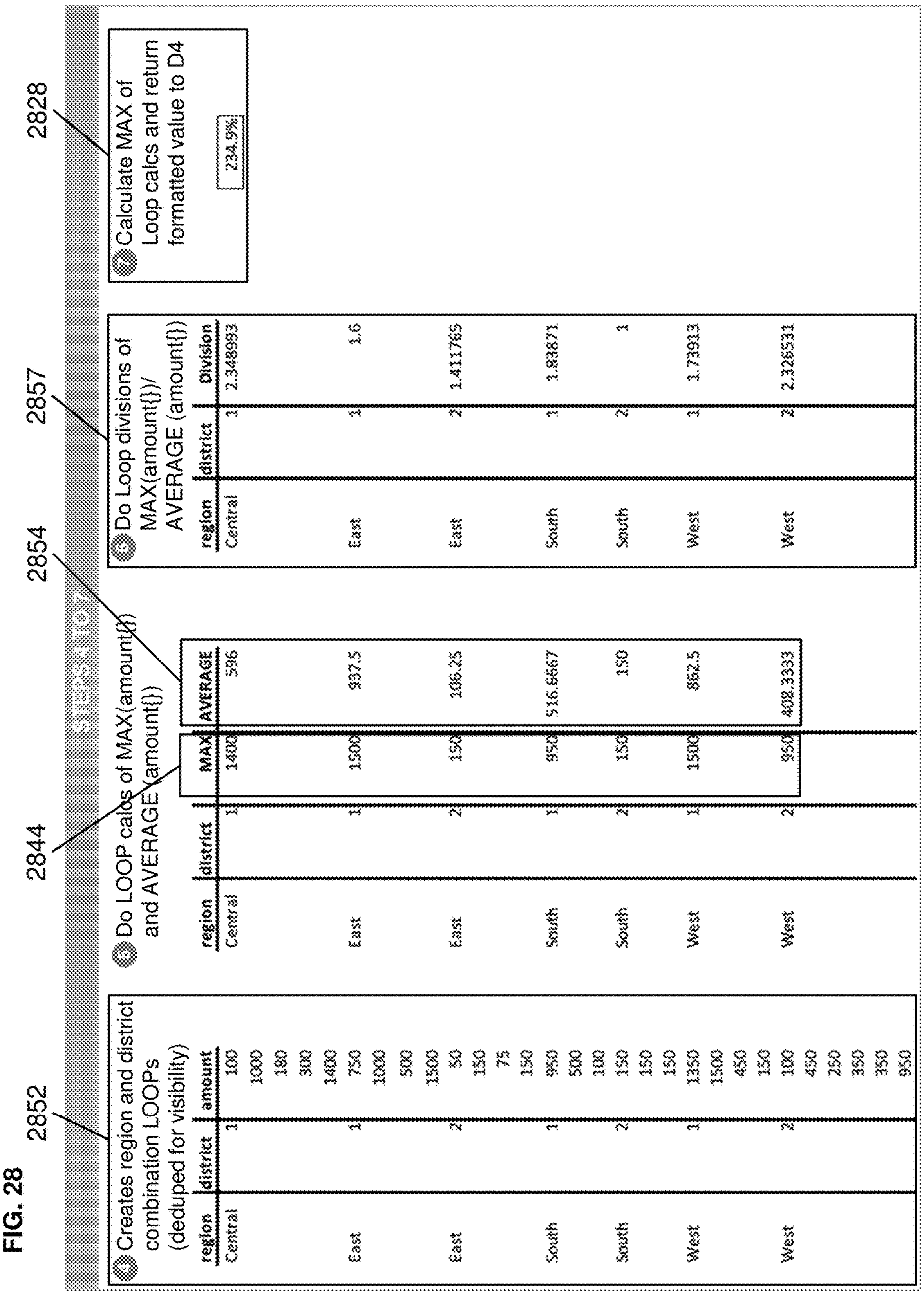

FIG. 27 and FIG. 28 example the seven steps 2675 starting with step one 2752 retrieving the Non-spreadsheet Cell (NSC) data, which could have instead come from cell data. Step two 2755 examples constraining the data in this situation to date values after and including 2/2/19. Step three 2748 sorts the remaining data and with step four 2852 creates the double loops for 'region' and 'district'. Step five does the loop calculations of the 'MAX(amount{ })' 2844 and the 'AVERAGE(amount{ })' 2854. Step six 2857 does the loop calculations dividing the results of the two different functions. Step seven 2828 then does the final function 'MAX' evaluation of the loop division calculations to arrive at the value '234.9%' which it formatted for the cell 'D4' 2669 (in FIG. 26). Our technology allows the more sophisticated user to create complicated loops with formula calculations involving many functions and algebraic operators which in large data sets could result in millions of calculations done by one formula.

Figure 31:
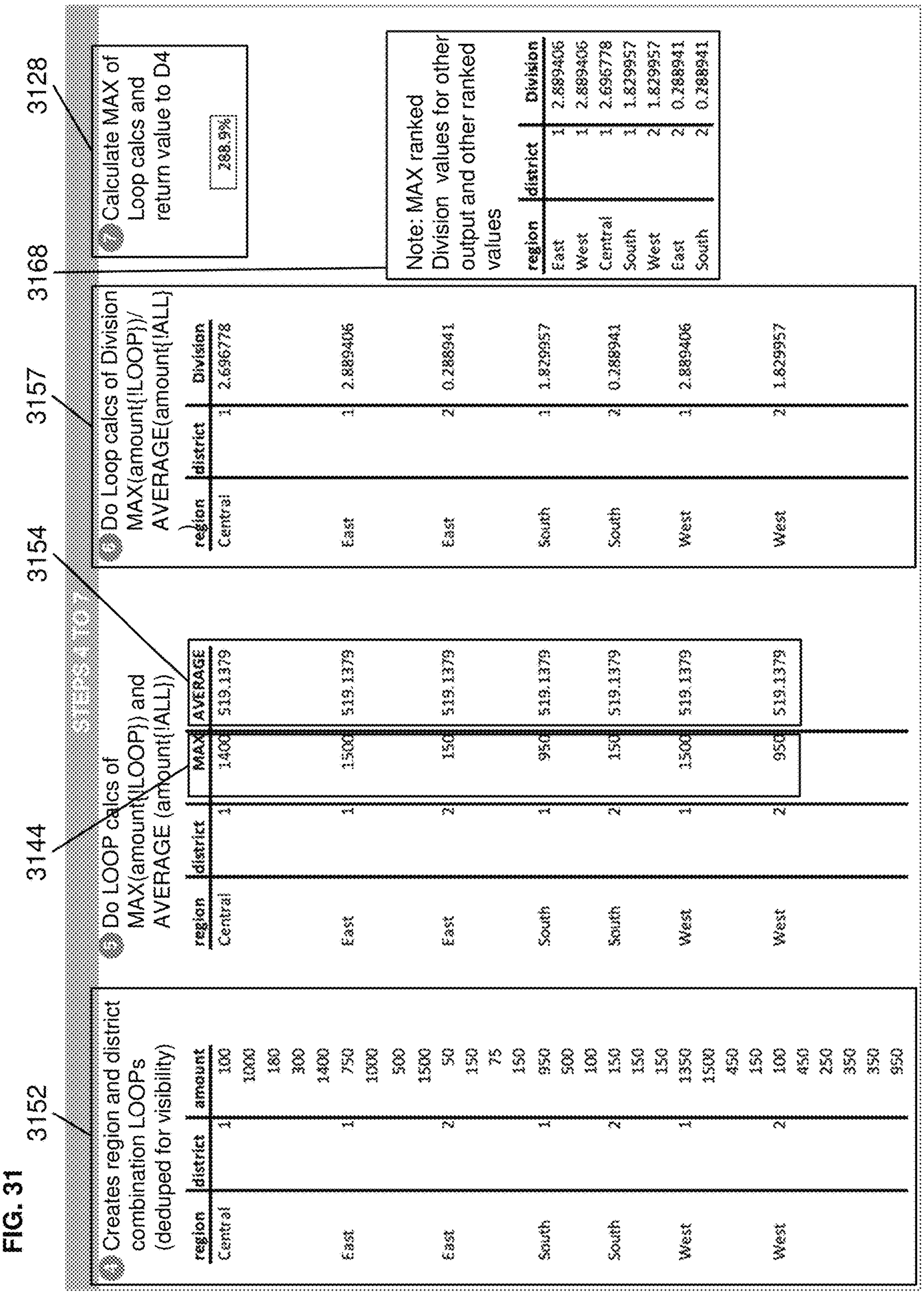

Our technology supports additional loop calculation capabilities for the more sophisticated users. In an embodiment we have named 'COMBO_L' we allow the user to mix calculations of loop values with calculations that are not done for the loop values. FIG. 29 through FIG. 31 examples one such calculation which parallels the calculations done in FIG. 26 through FIG. 28 except that one of the calculations is not for the loop values. In this embodiment we have slightly altered the function syntax 2935 to tell the user they must identify which data uses the loop values via a '{!LOOP}' 2934 identifier. This information is also reflected in the function definition 2946 and would be exampled in a simple help hint example, much simpler than what is exampled here. In this embodiment the user writes the formula in 'D4' 2953 where the 'MAX(amount{!LOOP})' will be evaluated for the loop values while the 'AVERAGE (amount{!ALL})' will be evaluated for all values of 'amount' not just the ones in the loop. The predefined functions, MAX and AVERAGE, are connected in the example formula by the divide by, "/" algebraic operator. This results in basically the same set of seven steps 2975 automatically triggered mechanics as was done in 2675 (in FIG. 26) except as we will examine a different AVERAGE calculation resulting in a different value '288.9%' 3128 (versus '234.9%' 2828) being returned to cell 'D4' 2969. Steps one 3052, two 3055, three 3048 and four 3152 (in FIG. 30 and FIG. 31) are identical to 2752, 2755, 2748 and 2852 (in FIG. 27 and FIG. 28). In step five the calculation of 'MAX(amount{!LOOP})' 3144 is the same as the calculation of 'MAX(amount{ })' 2844 (in FIG. 28) because both are using the loop values. However, the calculation of 'AVERAGE(amount{!ALL})' 3154 does not use the loop values but instead uses all of the values for the NSC data field 'amount' so all its loop calculations generate the same value of '519.1379' 3154 unlike the different values generated in the calculations done for 'AVERAGE(amount{ })' 2854 (in FIG. 28), because each of those calculations is done for the values in that specific loop resulting in values differing. As a result, 'MAX' value calculated in '288.9%' 3128 differs from that in '234.9%' 2828 (in FIG. 28) and the user has answered a different question where every region and district combination are compared to the overall average instead of compared to their own specific regional average amount of donations. This added capability allows users to easily answer a much broader set of questions.

It should also be noted that we opted to set the starting help syntax 2935 for "COMBO_L' as the complete syntax, rather than the lowest common denominator; as sophisticated users frequently like to see all the options which might be confusing to more basic users. As such the syntax will dynamically reduce depending upon the 'Final function' specified.

FIG. 32 examples a user taking advantage of the 'Other output' and 'Other rank' capabilities on the calculations done in FIG. 29 through FIG. 31. The 'COMBO_L' formula written in cell 'D4' 3243 is identical to that in FIG. 29 2953 except the addition of '|region{ }|3' 3253 in FIG. 32. This tells our technology that the user wants the region value outputted for the $3^{rd}$ ranked MAX value. The seven step calculations 3265 are automatically carried out as exampled in FIG. 30 and FIG. 31 with the addition shown in 3168 of MAX ranking the Division so the third rank result can be determined. Which is shown in 3268 first rank, 3278 second rank and 3288 third rank. This results in the additional wrinkle previously discussed of there being more than one value for the third ranking. As described before our technologies ability to place multiple values in a single cell is used to give the result in 'B4' 3258. Thus, our technology allows users to answer a broad range of questions and to get multiple value answers in a single cell, which is not possible in a conventional spreadsheet.

The set of questions that can be answered with our technology is further broadened by its ability to incorporate into the user specified combination function formula input cell values, constant values or formulaic data values not within looped values. Consider modifying the user inputted formula below from FIG. 29 2953 or FIG. 31 3143:

MAX(amount{!LOOP})/AVERAGE(amount{!ALL})

So that the user instead inputted the following formula:

(MAX(amount{!LOOP})+10+*H*5+SUM(annuity { })/AVERAGE(amount{!ALL})

Where the user has added a constant of '10', a cell value of 'H5' and 'SUM(annuity{ })' where 'annuity' does not vary with the two loop variables—'region' and 'district' and does not even need to be from the same table of data as the loop inputs. These capabilities substantially increase the breadth of loop calculations users can do with our technology.

Users can build even more complicated formulas in our 'COMBO' and 'COMBO_L' embodiments with more loop inputs created, many loop equivalents and with loop function formulas including terms using non range or array functions which are not being evaluated using loop values. New functions can be built to take advantage of these loop capabilities and solve problems that would otherwise require embedded software programming to accomplish the loop repetitive calculations supported by our family of combination functions. An additional capability that would be useful for users of the first two groupings of functions 1323 and 1343 in FIG. 13, is a specialized copy and paste capability so the user can easily fill out the outputs and rankings desired. It needs to be specialized because they are not just copying the same formula over a set of cells but the formula changes.

Combination Functions Copy Paste

FIG. 33A and FIG. 33B example the challenge of copying and pasting a combination function which has other outputs and, in this example, ranks. The formula itself changes as you move across columns as shown in FIG. 33A 3335. In cell 'B6' the 'Other input' value is 'region' while in 'C6' the value is 'district' and while in 'D6' there is no 'other input' value. This clearly requires a special version of copy paste taking into account the loop inputs of each combination function, whether predefined functions as in FIG. 33A or user defined functions as in FIG. 33B. The copy paste also varies vertically, in this example, by the ranking.

FIG. 34A through FIG. 34D examples an embodiment or our technology's special copy and paste for a predefined combination function which has other outputs but no other ranks using cell data. The formula 3426 was exampled in FIG. 14 1453 and all the potential outputs shown in FIG. 17 1768. One of the other outputs was exampled in FIG. 18

Figure 34A:
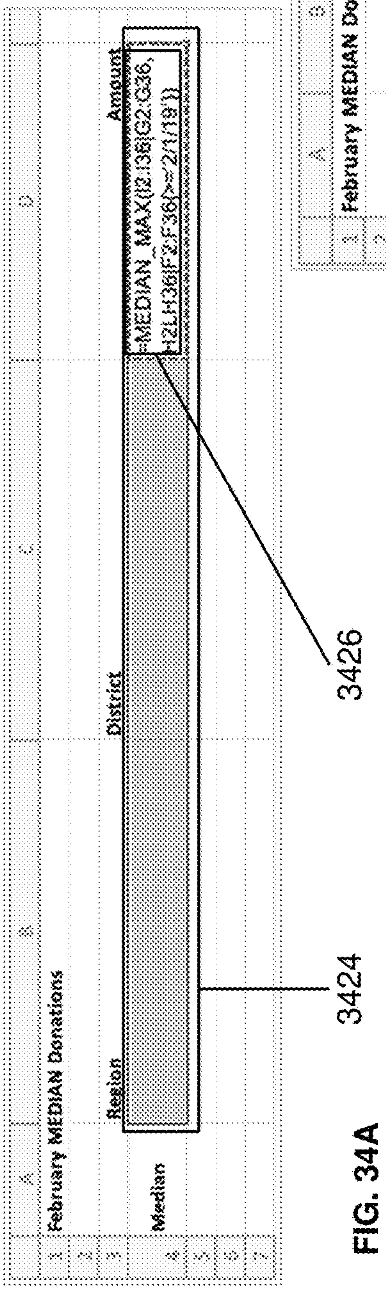
FIG. 34A through FIG. 34D examples our special copy and paste for a predefined combination function which has other outputs but no other ranks.
Figure 34B:
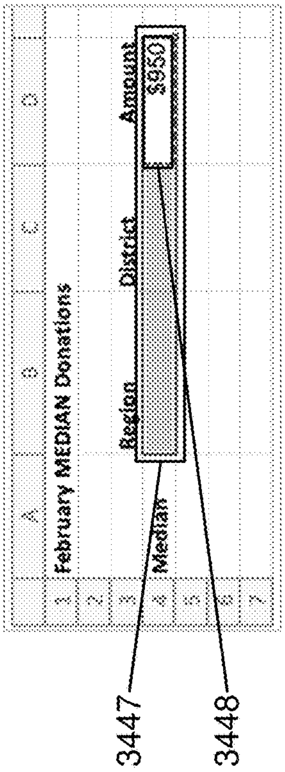
Figure 34C:
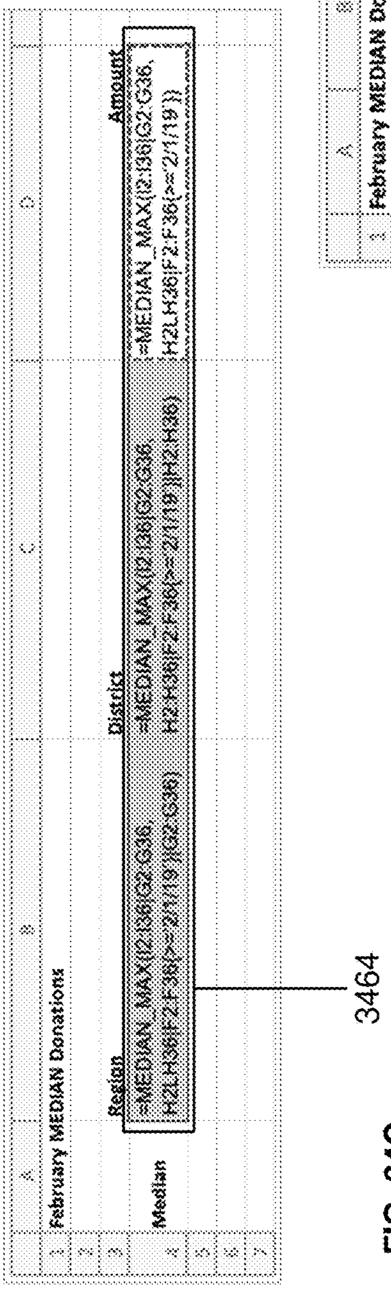
Figure 34D:
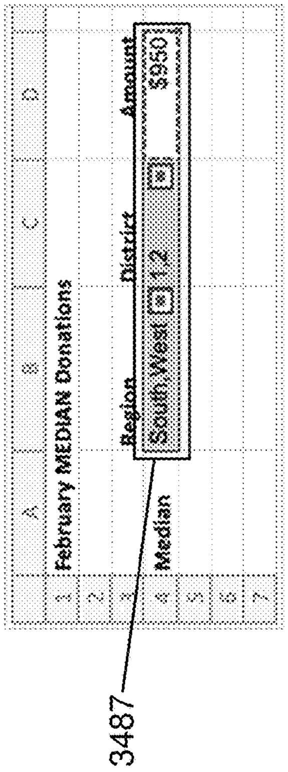

1857 from the formula shown in cell 'B4' 1853. FIG. 34A examples the formula 3426 being copied to the space 3424 (shown for example purposes) while FIG. 34B examples the corresponding value 3448 being copied to the same space 3447 (what you would typically see in the spreadsheet cells). FIG. 34C shows the result of the paste 3464 exampling the cell formulas while FIG. 34D examples the corresponding values 3487 which result from the copy-paste. As shown in the resulting formulas 3464 the special combination function column copy and paste transformed the formulas adding the other outputs in cells 'B4' and 'C4'. The copy paste did not change the cell references despite the lack of $ signs to limit such changes during pasting. And finally, the paste worked directionally going from the MEDIAN_MAX value of '950' to the Loop2 of the 'H2:H36' values that are '1,2' to the Loop1 of the 'G2:G36' values that are 'South,West' in the value outputs 3487. Thus, our technology has a highly specialized copy and paste capability with directionality and formula changing capabilities for combination functions.

Figure 35A:
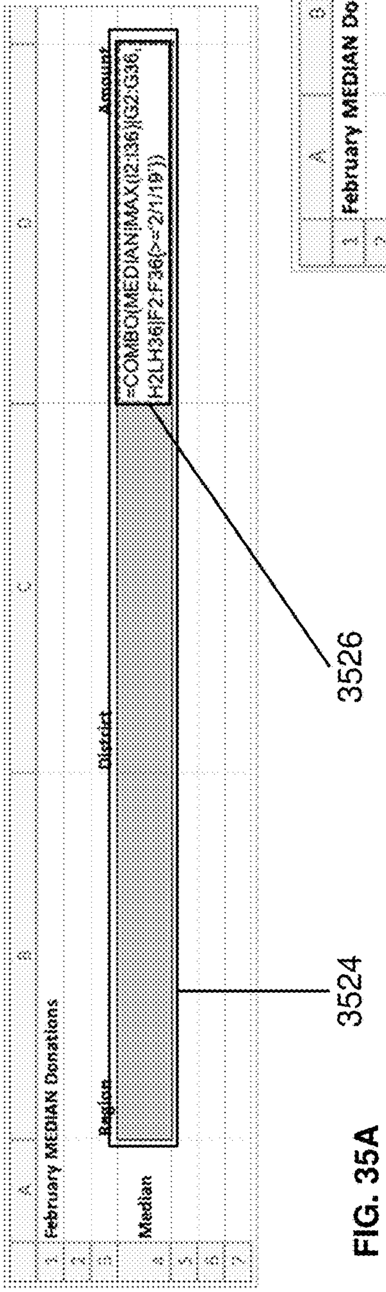
FIG. 35A through FIG. 35D examples our special copy and paste for a user defined combination function which has other outputs but no other ranks.
Figure 35B:
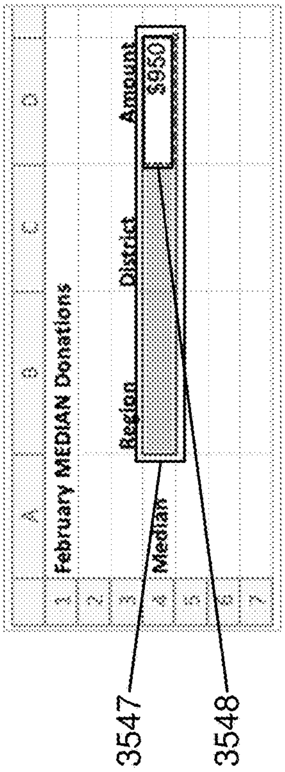
Figure 35C:
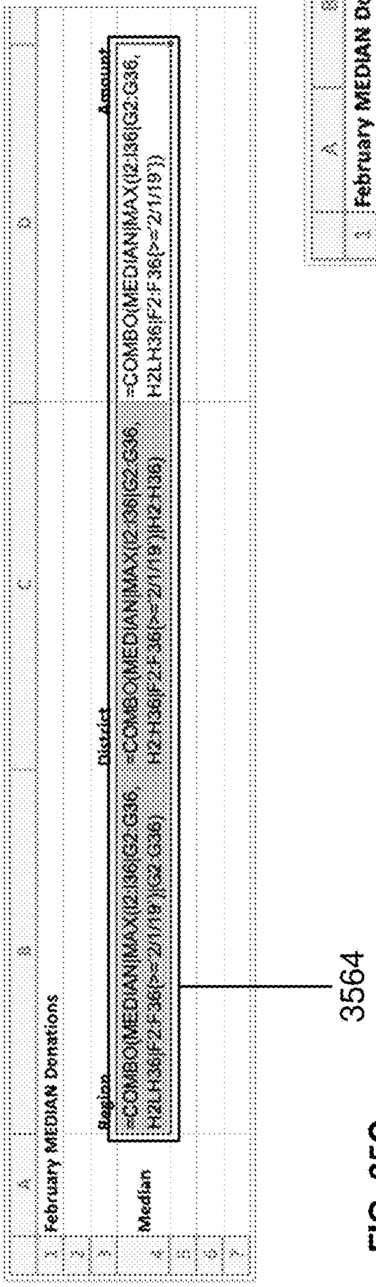
Figure 35D:
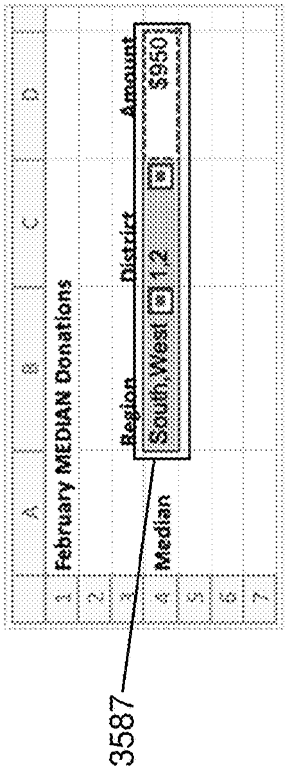
Figure 36A:
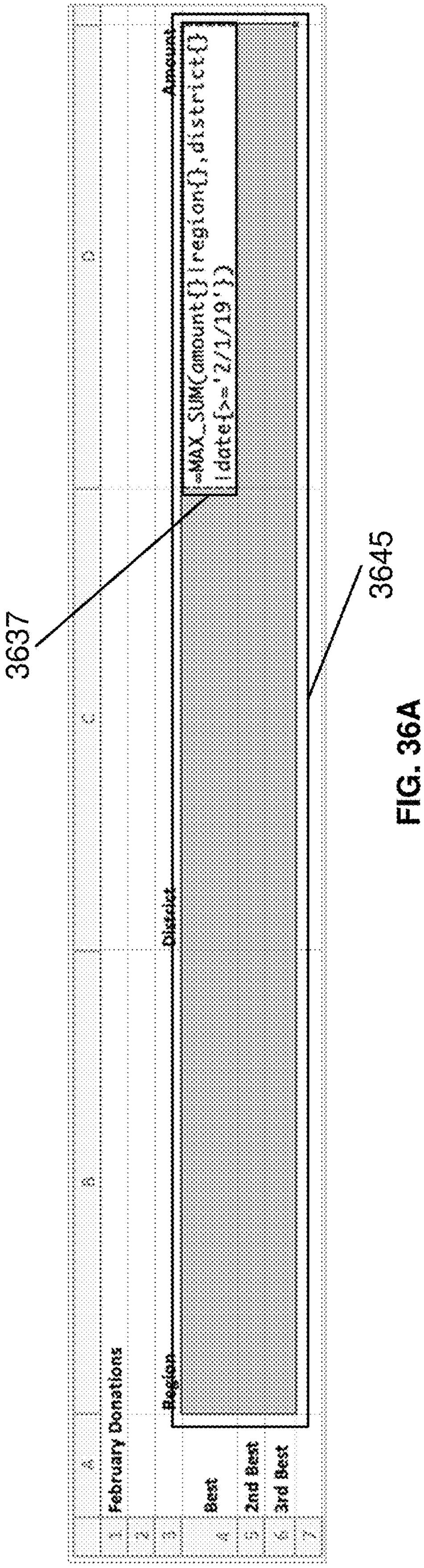
Figure 36B:
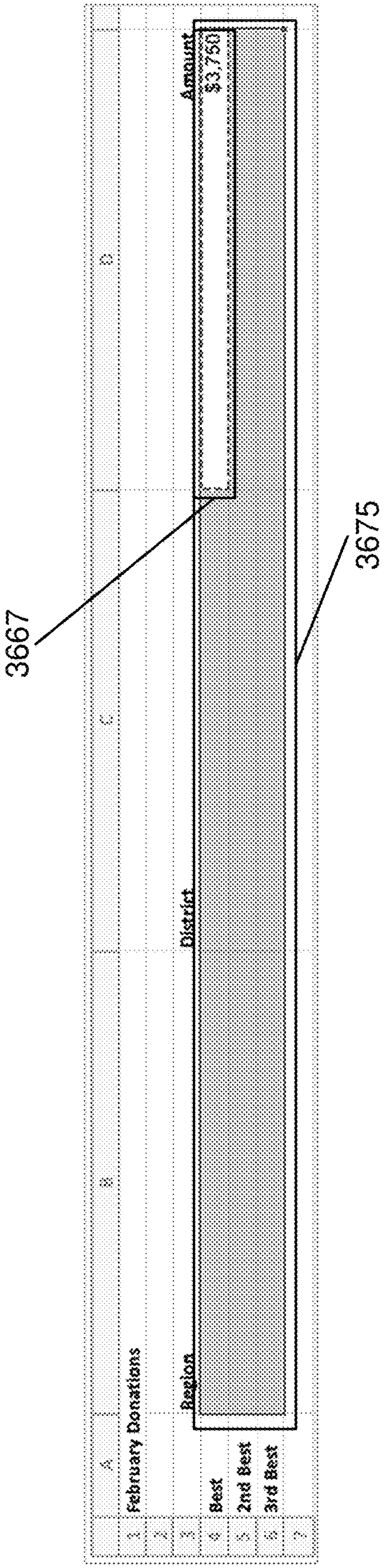
Figure 38A:
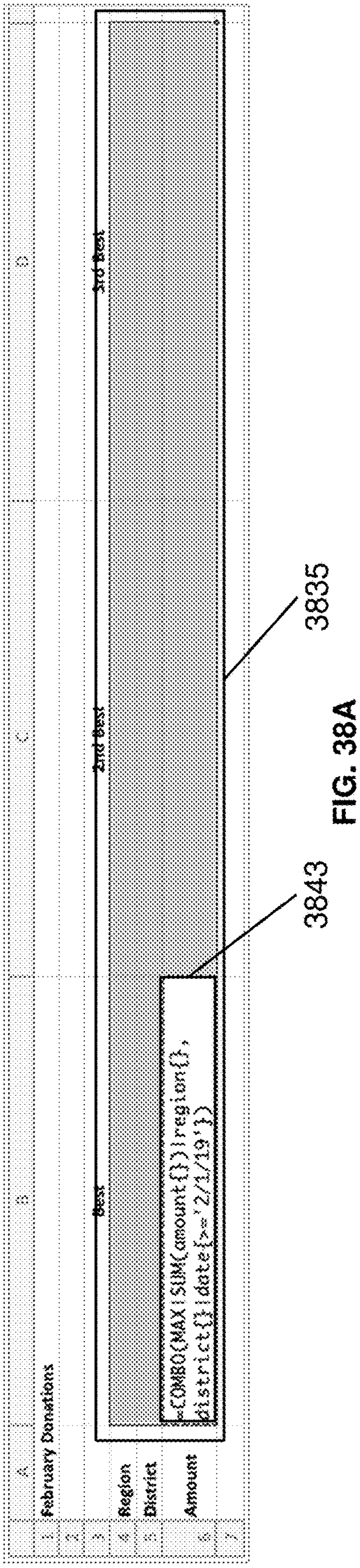
Figure 38B:
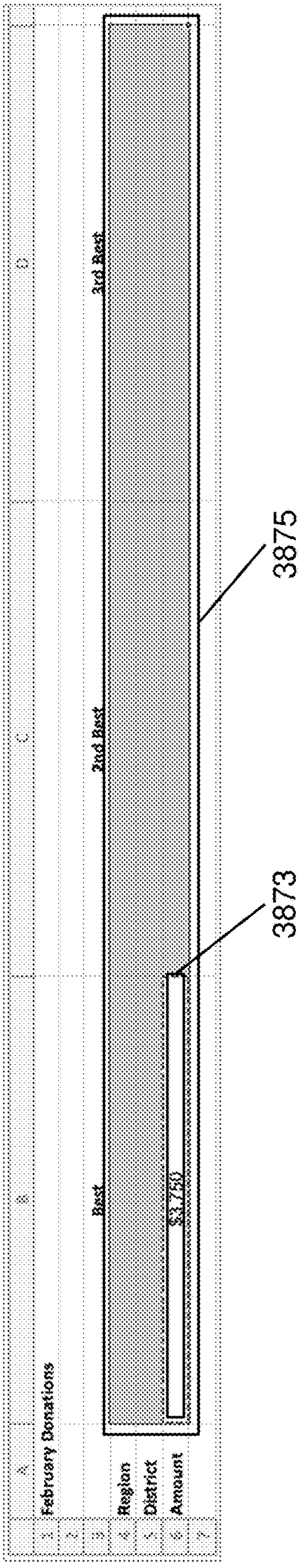

FIG. 35A through FIG. 35D examples an embodiment or our technology's special copy and paste for a user defined combination function which has other outputs but no other ranks, The formula 3526, is the user defined version of the formula 3426 in FIG. 34A. As such the calculations work the same way as those exampled in FIG. 14 through FIG. 17. FIG. 35A examples the formula 3526 being copied to the space 3524 (shown for example purposes) while FIG. 35B examples the corresponding value 3548 being copied to the same space 3547 (what you would typically see in the spreadsheet cells). FIG. 35C shows the result of the paste 3564 exampling the cell formulas while FIG. 35D examples the corresponding values 3587 which result from the copy-paste. As shown in the resulting formulas 3564 the combination function column copy and paste transformed the formulas adding the other outputs in cells 'B4' and 'C4'. Like before, the copy paste did not change the cell references despite the lack of $ signs to limit such changes during pasting. And finally, the paste worked directionally going from the MEDIAN of the MAX values of '950' to the Loop2 of the 'H2:H36' values that are '1,2' to the Loop1 of the 'G2:G36' values that are 'South,West' in the value outputs 3587. Thus, our technology works on both predefined and user defined combination functions.

FIG. 36A through FIG. 37B examples our special combination function copy and paste that varies horizontally by output and vertically by ranking using our NSC formulaic data. This embodiment we will call reverse column combo paste because it is configured to start in the upper right corner of the space with the final function value 3637, 3667 and paste left and down the number of ranks desired 3645, 3675 (in this example three) to give the formula results shown in FIG. 37A 3735 and the value results shown in FIG. 37B 3775. The technology has replicated the ranking for the MAX_SUM values in column 'D' while replicated it for the two different data inputs for the loop equivalents in columns 'B' and 'C' in 3735 and 3775. Because this is the most likely user layout of the information in the embodiment it would be the default combination function special paste mode, with other named alternatives available.

FIG. 38A through FIG. 39B examples the reverse ROW combo copy paste because it is configured to start in the lower left corner of the space with the final function value 3843, 3873 and paste the left and down the number of ranks desired 3835. 3875 (in this example three) to give the formula result in FIG. 39A 3935 and the value result FIG. 39B 3975.

An even more sophisticated embodiment of our combination function copy paste would recognize what variant of the formula was copied and the directions of the paste area and determine whether the user was doing a column or row version of the copy paste for combination functions which have both another output and rank. It would also be able to start with any of the formulas, meaning rank and/or other output and replicate the missing permutations. For functions falling in the second grouping 1343 in FIG. 13 which have only other values and no ranking then only one dimension of the copy paste will work. And final for the large group of functions 1374 in in FIG. 13 which have no other output or rank a copy paste of the formula would not change unless there was a reference to a cell that is incrementing in the process. Therefore, our combination function copy paste process needs to have an understanding of the final function involved, what was copied and the directionality of the paste space making it dramatically more sophisticated than current spreadsheet copy paste capabilities.

Computer System

FIG. 40 is a block diagram of an example computer system, according to one implementation. Computer system 4010 typically includes at least one processor 4014 which communicates with a number of peripheral devices via bus subsystem 4012. These peripheral devices may include a storage subsystem 4024 including, for example, memory devices and a file storage subsystem, user interface input devices 4022, user interface output devices 4020, and a network interface subsystem 4016. The input and output devices allow user interaction with computer system 4010. Network interface subsystem 4016 provides an interface to outside networks, including an interface to communication network 4085, and is coupled via communication network 4085 to corresponding interface devices in other computer systems or in the cloud and usable for cloud applications.

User interface input devices 4022 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 4010 or onto communication network 4085.

User interface output devices 4020 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 4010 to the user or to another machine or computer system.

Storage subsystem 4024 stores programming and data constructs that provide the functionality of some or all of the modules and methods described herein. These software modules are generally executed by processor 4014 alone or in combination with other processors.

Memory 4026 used in the storage subsystem can include a number of memories including a main random-access memory (RAM) 4030 for storage of instructions and data during program execution and a read only memory (ROM) 4032 in which fixed instructions are stored. A file storage subsystem 4028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 4028 in the storage subsystem 4024, or in other machines accessible by the processor.

Bus subsystem 4012 provides a mechanism for letting the various components and subsystems of computer system 4010 communicate with each other as intended. Although bus subsystem 4012 is shown schematically as a single bus, alternative implementations of the bus subsystem may use multiple busses.

Computer system 4010 can be of varying types including a workstation, server, computing cluster, blade server, server farm, or any other data processing system or computing device. Due to the ever-changing nature of computers and networks, the description of computer system 4010 depicted in FIG. 40 is intended only as one example. Many other configurations of computer system 4010 are possible having more or fewer components than the computer system depicted in FIG. 40.

Some Particular Implementations

Some particular implementations and features are described in the following discussion. In general, this section describes algorithms that can be embodied in computer-implemented methods, devices or computer readable media. The algorithms described below are database-like operations, which can be practiced as methods that improve the operations of spreadsheets by simplifying formulation of calculations, programming of the calculations to be executed and/or debugging the programmed calculations. The algorithms described above and below can fairly be described as steps for achieving the functions described. The algorithms can be embodied in systems configured for software to run on hardware, the software embodying these algorithms. The algorithms described above and below can fairly be described as means or modules for achieving the functions described. The algorithms can be practiced as article of manufacture, that is non-transitory computer readable media holding instructions either that carry out any of the methods described or that can be used to configure suitable hardware as any of the systems described.

For jurisdictions that support other classes of patentable subject matter, the algorithms can be embodied in programs, or in use of systems to produce spreadsheets with formulas achieving the useful results described. The algorithms also can be embodied in transitory signals that carry program information between users and systems or among systems.

One implementation of the technology disclosed combines two predefined range or array spreadsheet functions operating on loop and function formula inputs to arrive at one or more value populated into a spreadsheet cell. That allows users to solve looped repetitive problems by writing a single formula in a new family of spreadsheet.

One particular implementation starts with two predefined range or array evaluating functions (e.g., MAX and SUM, MEDIAN and MIN, or AVERAGE and COUNT) that received two or more user specified data field inputs. The predefined functions are from prior art spreadsheets. The MAX and SUM combination is exampled as MAX_SUM in FIG. 7A through FIG. 12B. The combination function is in a spreadsheet cell as a formula, rather than in a side panel as in prior art pivot tables. Each of those examples receives two or more data field inputs from user specified Non-spreadsheet Cell (NSC) formulaic data which is our previously filed proprietary method of accessing data external to spreadsheet cells. FIG. 14 through FIG. 17 examples the user specifying two or more data fields sourced from cell data ranges. In all of those in examples in FIG. 7A through FIG. 12A and FIG. 14 through FIG. 17 the user specified one or more data fields as Loop inputs used to create loop equivalents for distinct or unique values of the data field. In each of those examples the user also specified one data field as the function input that was evaluated for each loop equivalent (i.e., the SUM input in FIG. 7A through FIG. 12A and the MAX input in FIG. 14 through FIG. 17). Then in each example the results of the loop equivalent function calculations are evaluated by the other predefined function equivalent (i.e., MAX in FIG. 7A through FIG. 12A and MEDIAN in FIG. 14 through FIG. 17). Then that calculated output (in FIG. 7B, FIG. 9, FIG. 12A, FIG. 12B and FIG. 14) is outputted to the spreadsheet cell.

In another implementation constraints (filters) were applied to the data used to calculate the predefined combination function values as exampled in FIG. 9 through FIG. 12B, and FIG. 14 and FIG. 20. Thereby allowing users to easily change the data sets used in the calculations. The constraints can be implemented as data selection parameters of the user specified formulaic data description terms. Examples of data selection parameters used in the examples that vary the data selected at input are !JOIN and !ALL.

In an implementation of our technology users can specify a related result to replace the combination function result, as shown in FIG. 8, FIG. 12A and FIG. 12B. This applies to those functions that have other value or rank outputs as exampled in 1323 and 1343 in FIG. 13.

In an embodiment of these implementations the related result specified for output to the cell is a data field inputted to create the loop equivalents as exampled in FIG. 8, FIG. 12A and FIG. 12B, for distinct or unique values of the data field. For those functions which create other outputs (exampled in FIGS. 13 1323 and 1343) this allows users to output useful information other than but related to the calculated value. These other outputs sometimes are labels from a first field of a record (or row in a vertical, row-major table) related to values calculated over a second field of the record.

In another embodiment of these implementations the outputted value is altered by a user specified ranking of the result. For those functions which create other rankings (exampled in FIG. 13 1323) this allows the user to output values such as the second or third ranked value (exampled in FIG. 12A and FIG. 12B) or the ranking of a specified data field used to create the loop equivalents related to the ranked value (exampled in FIG. 8, FIG. 12A and FIG. 12B).

Figure 19D:
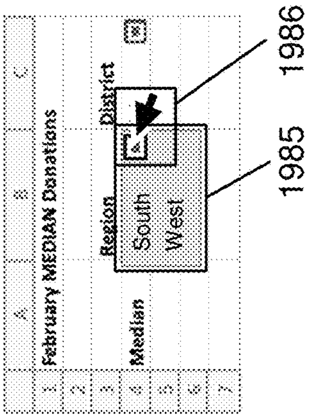

Another capability of these implementations is the ability to output more than one value into the single cell as exampled in FIG. 18 through FIG. 19D. This draws on one of our previous patent filings supporting populating and displaying more than one value within a single spreadsheet cell. In this instance it is displayed in a manner not allowing the user to select values but requiring the user to change the formula to change the values.

Another implementation of our technology allows the user to mix and match the combinations of range or array evaluating functions in our combination function. Because there is a large and potentially growing number of function combinations it allows user to create their own as well as it allows users to go beyond combining two such functions to support loop equivalent evaluations involving multiple functions and algebraic operators.

Figure 25:
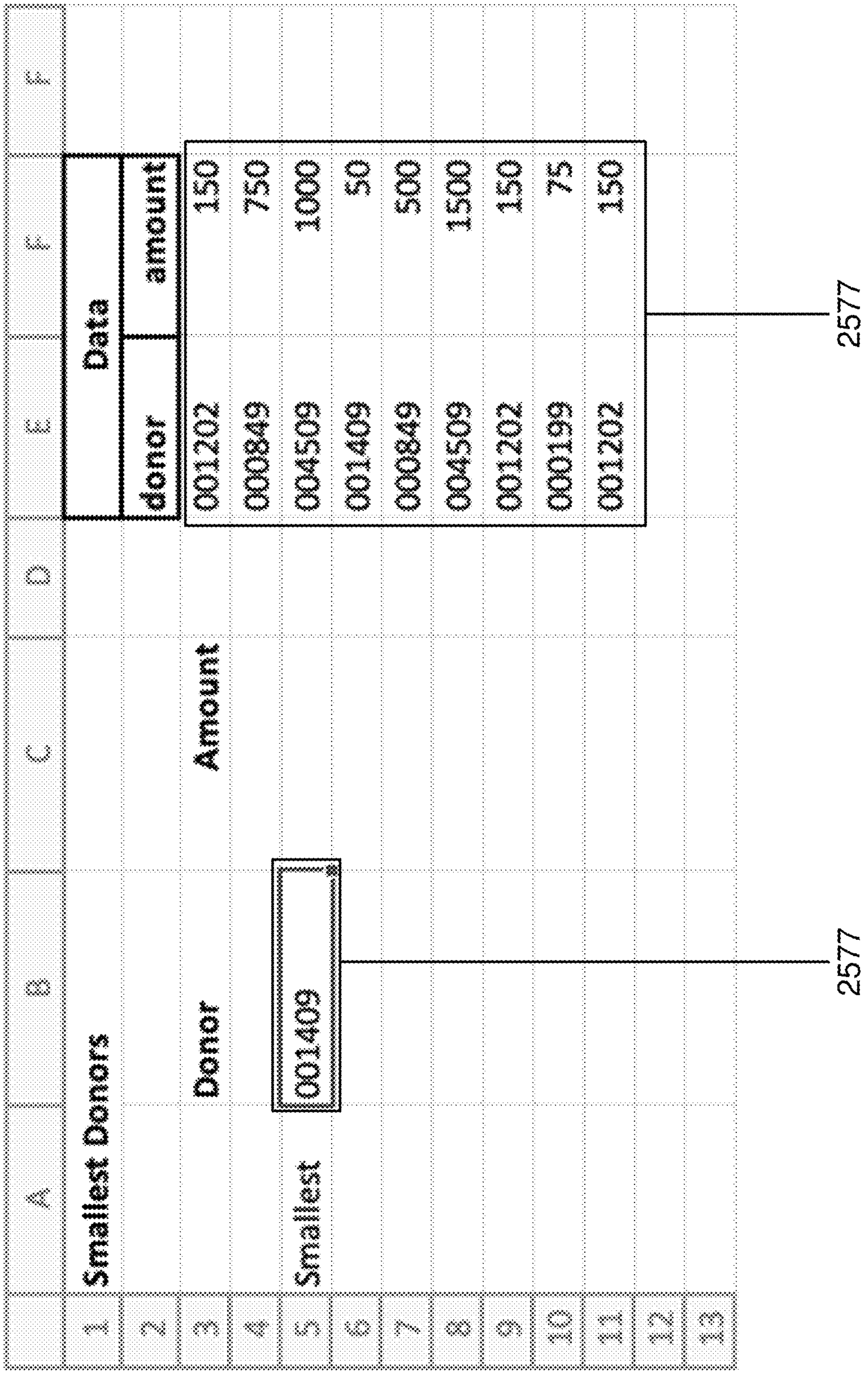

One particular implementation of this user specified combination function receives two or more user specified data field inputs from external data using our Non-spreadsheet Cell (NSC) formulaic data (see FIG. 21B) or spreadsheet cells (see FIG. 24 and FIG. 25). In this embodiment the user defines at least one data field to create loop equivalent (e.g., donor{ } 2155 in FIG. 21B and 'E3:E11' 2445 in FIG. 24), for distinct or unique values of the data field. Each of those loop equivalents then evaluate the user specified formula containing at least one function and data field input (e.g., 'SUM(amount{ })' 2154 in FIG. 21B and 'SUM(F3:F11)' 2444 in FIG. 24). Then the embodiment evaluates the loop equivalent function formula results using the user specified final function input (e.g., 'MAX' in FIG. 21B and 'MIN' in FIG. 24) to generate the cell output (e.g., 2159 in FIG. 21B and 2458 in FIG. 24).

In another implementation constraints or filters were applied to the data used to calculate the user specified combination function values as exampled in FIG. 24 through FIG. 26. Thereby allowing users to easily change the data sets used in the calculations.

Another embodiment of these implementations accommodates a user specified functional formula evaluated for each loop that contains more than one user specified function and related data field(s) connected by an algebraic operator as exampled in FIG. 26 'MAX(amount{ })/AVERAGE(amount{ })' 2654.

An additional implementation accommodates loop equivalent calculations being selectively applied to the data fields within the functional formula as exampled in FIG. 29 'MAX(amount{!LOOP})/AVERAGE(amount{!ALL})' where the data field and function with the '!LOOP' gets evaluated for the loop values and the data field and the function with the '!ALL' uses all the values not just the ones available in the loop. In this example, two predefined functions, MAX and AVERAGE, are connected by the divide by, "/" algebraic operator.

Thereby expanding the range of calculations that users can do employing our combination function technology and employing different non-loop value evaluations.

An additional capability of our technology allows incorporating into the formula input cell values, constant values or formulaic data values not within looped values. As previously described taking the formula used in:

MAX(amount{!LOOP})/AVERAGE(amount{!ALL})

And changing the user inputted formula to the following:

(MAX(amount{!LOOP})+10+*H*5+SUM(annuity { })/AVERAGE(amount{!ALL})

Where the user has added a constant of '10', a cell value of 'H5' and SUM(annuity { }) where 'annuity' is not one of the loop variables of 'region' and 'district'.

In an implementation of our technology users can specify a related result to replace the combination function result as shown in FIG. 24, FIG. 25 and FIG. 32, FIG. 37A and FIG. 37B. In FIG. 24, the other output for 2458 cell B5 is the donor number 2479 found in the left hand column of 2478, which will correspond to an amount in the right column and be filled into cell C5 by a formula not shown. In this example, a label associated with a calculated value can be output from a COMBO function, for instance, so that the label and the value are output to neighboring cells. This applies to those functions that have other outputs as exampled in 1323 and 1343 in FIG. 13. In an example, the related result (Other output) specified for output to the cell is a data field inputted to create the loop equivalents as exampled in FIG. 24, FIG. 25, FIG. 37A and FIG. 37B, for distinct or unique values of the data field.

In another implementation, the outputted value is altered by a user specified ranking of the result. For those functions which create other rankings (exampled in FIG. 13 1323) this allows the user to output values such as the second or third ranked value (formulas exampled in FIG. 37A and values in FIG. 37B) or the ranking of a specified data field used to create the loop equivalents related to the ranked value (formula and value exampled in FIG. 32, formulas exampled in FIG. 37A and values in FIG. 37B).

Another implementation of our technology is the dynamic altering of the helpful syntax based on the function specified by the user to evaluate the loop equivalents (final evaluation) in our user specified combination functions as exampled in FIG. 22A through FIG. 23D. Where the starting syntax can either be the lowest common denominator or the complete possible set and dynamically change to add or remove syntax elements depending upon the function specified by the user to evaluate the loop equivalents.

Another capability of these implementations is the ability to output more than one value into the single cell as exampled in FIG. 32. This draws on one of our previous patent filings supporting populating and displaying more than one value within a single spreadsheet cell. In this instance it is displayed in a manner not allowing the user to select values but requiring the user to change the formula to change the values.

Another implementation of our technology, which is a subject of a clause, supports the copying and pasting of a combination function which has differing numbers of formula terms across the pasted cell values. Our technology does the special copy and paste for our combination functions utilizing at least two spreadsheet range or array evaluating functions, using two or more data field inputs from user specified Non-spreadsheet Cell (NSC) formulaic data description terms or data cell ranges, with at least one data field input used to create loop equivalents, using one or more user defined data fields that is evaluated for each loop equivalent by one or more functions, the results of which are evaluated by using one of the functions, and outputs to the cells the selected combination function result and/or some or all of its related output results, as exampled in FIG. 34A through FIG. 39B.

Another implementation of our technology where the two range or array evaluation functions are predefined, as exampled in FIG. 34A through FIG. 34D, FIG. 36A and FIG. 36B. And an implementation of our technology where the range or array evaluation functions are user defined, as exampled in FIG. 35A through FIG. 35D and FIG. 38A through FIG. 39B. An implementation of our technology where constraints (filters) are applied to the data sets and replicated in the copying and pasting, as exampled in FIG. 34A through FIG. 39B. FIG. 34A through FIG. 35D exampling implementations using cell data and FIG. 36A through FIG. 39B exampling implementations using our NSC formulaic data description terms.

A further implementation of our technology expands the special combination copy and paste to handle those functions that have other outputs, see 1323 and 1343 in FIG. 13 for examples of the functions involved and see FIG. 34A through FIG. 35D for examples of the copying and pasting. Where the paste outputs are related results, each of the two data fields used to create the loop equivalents for distinct or unique values of the data fields. This allows the user to see the loop values that generated the final result.

A further implementation of our technology expands the special combination copy and paste to handle the smaller set of functions that that have both another output and other ranks, see 1323 in FIG. 13 for examples of the functions involved and see FIG. 36A through FIG. 39B for examples of the copying and pasting This allows the user to generate a two-dimensional copy paste differing by what is outputted and its rank.

A more sophisticated implementation or our technology starts by ascertaining the copied cell output and if applicable ranking formula and automatically adjusts its incrementing of the paste to start from the copied cell. Thereby allowing a user to start with any cell in an area like 3735 in FIG. 37A and generate the other cells in the area.

Our technology also handles copying and pasting cells which contain more than one value in an individual cell, as exampled in FIG. 34A through FIG. 35D. Thereby allowing users to handle situations without similar solutions in a conventional spreadsheet.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following clauses and claims.

I claim:

1. A method of evaluating data in a spreadsheet using a combination function, including:

accessing from the spreadsheet the combination function entered in a first spreadsheet cell, wherein the combination function combines first and second functions;

receiving in a parameter list of the combination function at least first and second data fields;

applying the first function to groups of items in the first data field having distinct values to generate first function outputs from data in the second data field, wherein there are more values in the first data field than there are distinct values and there are two or more groups; and applying the second function to the first function outputs to generate a combined function output.

2. The method of claim 1, wherein the first and second functions are specified in a name assigned to the combination function.

3. The method of claim 1, wherein the first and second functions are user specified in the parameter list of the combination function.

4. The method of claim 3, further including receiving as the first function in the parameter list an algebraic combination of at least two built-in spreadsheet functions.

5. The method of claim 3, further including receiving in the parameter list a user specified algebraic operator that specifies application of the second function to the first function and producing the combined function output using the user specified algebraic operator.

6. The method of claim 3, further including causing display of a hint for user entry of the combination function, wherein a hint syntax for completion of the combination function dynamically adapts to the user specification in the parameter list of the first and second functions.

7. The method of claim 1, further including receiving in the parameter list user specified formulaic data description terms to define accessing a non-cell source or a data cell range for the first and second data fields.

8. The method of claim 7, further including receiving one or more constraints to the user specified formulaic data description terms to filter values selected for the first and/or second data fields.

9. The method of claim 1, further including receiving a user specification to cause display a value of the first data field based on the applying of the second function to the first function outputs.

10. The method of claim 1, further including receiving a user specification to rank order results in the generated combined function output and a specified rank, which can be other than the first rank.

11. The method of any of claim 1, further including in the parameter list two or more categorical values from in the first data field and outputting labels for the two or more categorical values in a single cell field based on the applying of the second function to the first function outputs.

12. The method in claim 1, further including using one or more data values specified in the parameter list that are not derived from the first or second data field to calculate the combined function output.

13. A non-transitory computer readable medium holding instructions that, when executed on hardware, configure the hardware to implement actions, including:

accessing from the spreadsheet the combination function entered in a first spreadsheet cell, wherein the combination function combines first and second functions;

receiving in a parameter list of the combination function at least first and second data fields;

applying the first function to groups of items in the first data field having distinct values to generate first function outputs from data in the second data field, wherein there are more values in the first data field than there are distinct values and there are two or more groups; and applying the second function to the first function outputs to generate a combined function output.

14. The computer readable medium of claim 13, wherein the first and second functions are specified in a name assigned to the combination function.

15. The computer readable medium of claim 13, wherein the first and second functions are user specified in the parameter list of the combination function.

16. The computer readable medium of claim 15, further including receiving as the first function in the parameter list an algebraic combination of at least two built-in spreadsheet functions.

17. The computer readable medium of claim 15, further including receiving in the parameter list a user specified algebraic operator that specifies application of the second function to the first function and producing the combined function output using the user specified algebraic operator.

18. The computer readable medium of claim 15, further including causing display of a hint for user entry of the combination function, wherein a hint syntax for completion of the combination function dynamically adapts to the user specification in the parameter list of the first and second functions.

19. The computer readable medium of claim 13, further including receiving in the parameter list user specified formulaic data description terms to define accessing a non-cell source or a data cell range for the first and second data fields.

20. The computer readable medium of claim 19, further including receiving one or more constraints to the user specified formulaic data description terms to filter values selected for the first and/or second data fields.

21. The computer readable medium of claim 13, further including receiving a user specification to cause display a value of the first data field based on the applying of the second function to the first function outputs.

22. The computer readable medium of claim 13, further including receiving a user specification to rank order results in the generated combined function output and a specified rank, which can be other than the first rank.

23. The computer readable medium of any of claim 13, further including in the parameter list two or more categorical values from in the first data field and outputting labels for the two or more categorical values in a single cell field based on the applying of the second function to the first function outputs.

24. The method in claim 13, further including using one or more data values specified in the parameter list that are not derived from the first or second data field to calculate the combined function output.

* * * * *